(12) United States Patent
Hashida et al.

(10) Patent No.: US 7,264,093 B2
(45) Date of Patent: Sep. 4, 2007

(54) COMBINED SERVICE AND PARKING BRAKE APPARATUS

(75) Inventors: Koichi Hashida, Kariya (JP); Hideaki Higashimura, Kariya (JP); Daizo Oba, Kariya (JP); Masahiko Kamiya, Kariya (JP); Moriharu Sakai, Kariya (JP); Takashi Murayama, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 196 days.

(21) Appl. No.: 11/121,964

(22) Filed: May 5, 2005

(65) Prior Publication Data

US 2005/0252732 A1    Nov. 17, 2005

(30) Foreign Application Priority Data

May 17, 2004 (JP) ............................ 2004-146394
Jun. 17, 2004 (JP) ............................ 2004-180163
Jun. 21, 2004 (JP) ............................ 2004-182072

(51) Int. Cl.
    *F16D 55/08*    (2006.01)
(52) U.S. Cl. .................. 188/72.8; 188/71.9; 188/106 P
(58) Field of Classification Search .............. 188/72.2, 188/71.9, 72.7, 72.8, 106 P, 196 V, 196 L
    See application file for complete search history.

(56) References Cited

U.S. PATENT DOCUMENTS 3,653,470 A * 4/1972 Travis ....................... 188/71.9
4,691,809 A * 9/1987 Le Marchand et al. .... 188/71.9
5,350,042 A * 9/1994 Thiel .......................... 188/71.9
6,311,808 B1   11/2001 Halasy-Wimmer et al.
6,659,236 B1 * 12/2003 Clark et al. ............... 188/79.52
7,134,533 B2 * 11/2006 Hashida .................... 188/72.8
2004/0112689 A1 * 6/2004 Nakayama et al. ........ 188/71.9
2004/0245055 A1 * 12/2004 Gerard et al. .............. 188/72.6

FOREIGN PATENT DOCUMENTS

JP         2000-504811        4/2000

* cited by examiner

*Primary Examiner*—Devon Kramer
(74) *Attorney, Agent, or Firm*—Buchanan Ingersoll & Rooney PC

(57) ABSTRACT

A combined service and parking brake apparatus includes a piston which forms a hydraulic chamber within a cylinder portion; a brake lining which, when pressed by the piston, brakes rotation of a disc rotor; a second piston which divides the hydraulic changer into a first hydraulic chamber and a second hydraulic chamber; a friction clutch which allows rotation of the second piston when the second piston is held at its home position and which disables rotation of the second piston when the second piston moves by a predetermined distance toward the second hydraulic chamber; an adjuster including an internal-thread portion and an external-thread portion and adapted to adjust the clearance between the pistons in accordance with the amount of wear of the brake lining; and a changeover valve for establishing and shutting off the communication between the first hydraulic chamber and the second hydraulic chamber.

11 Claims, 29 Drawing Sheets

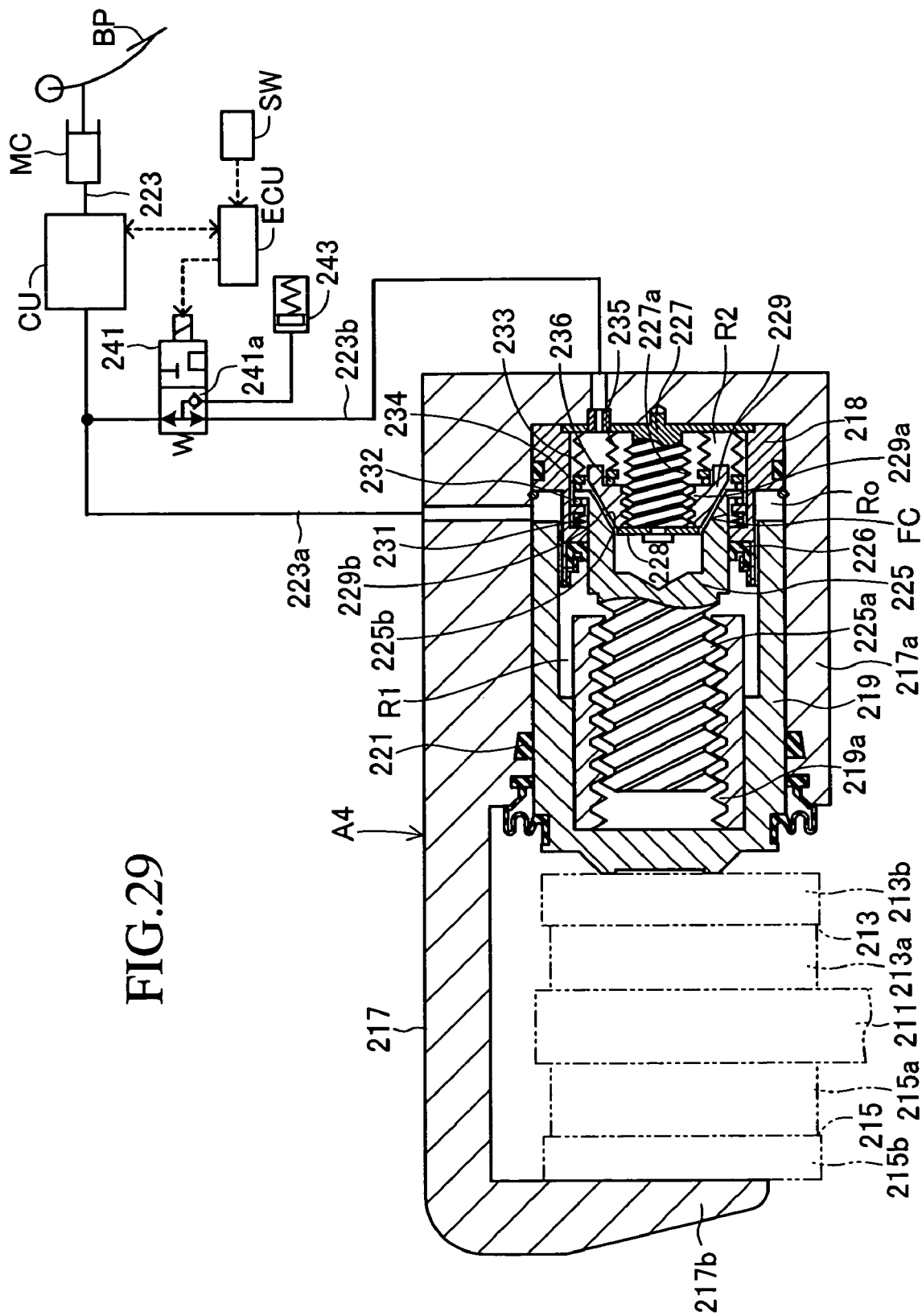

COMBINED SERVICE AND PARKING BRAKE APPARATUS

BACKGROUND OF THE INVENTION

1. Field of the Invention

The present invention relates to a combined service and parking brake apparatus capable of being used as a vehicular brake apparatus, capable of generating braking force by means of brake fluid pressure not only when the apparatus is used as a service brake but also when the apparatus is used as a parking brake, and configured such that, when the apparatus is used as a parking brake, after generation of braking force, the apparatus is mechanically locked to maintain braking force.

2. Description of the Related Art

A combined service and parking brake apparatus of this type is disclosed in, for example, Japanese Kohyo (PCT) Patent Publication No. 2000-504811. The combined service and parking brake apparatus shown in FIG. 4 of the publication includes a piston disposed in a cylinder in such a manner as to be nonrotatable about a cylinder axis and movable along the cylinder axis to thereby form a hydraulic chamber within the cylinder; a brake lining to be moved under pressure by the piston and engaged with a rotary member to be braked, when the piston is moved under the pressure of brake-fluid fed into the hydraulic chamber, thereby effecting a braking operation on the rotary member; an adjusting nut attached, within the hydraulic chamber, to the cylinder in such a manner as to be rotatable about the cylinder axis and movable along the cylinder axis; a friction clutch provided between the adjusting nut and the cylinder, allowing rotation of the adjusting nut in an unlocked condition where the adjusting nut is at its home position, and disabling rotation of the adjusting nut in a locked condition where the adjusting nut has moved along the cylinder axis by a predetermined distance from its home position; an adjuster including an external-thread portion of an adjusting spindle provided integrally with the piston and an internal-thread portion provided integrally with the adjusting nut and meshed with the external-thread portion, capable of automatically adjusting operation timing of the friction clutch through automatic adjustment of the clearance between the piston and the adjusting nut in accordance with the amount of wear of the brake lining; and an electromagnetic actuator capable of holding the friction clutch in an engaged condition while the brake lining, having moved under pressure applied by the piston, is clamping the rotary member to be braked.

In the combined service and parking brake apparatus of the above-mentioned publication, by means of deactivating (de-energizing) the electromagnetic actuator, the friction clutch can be held in a disengaged condition, thereby allowing rotation of the adjusting nut and movement, along the cylinder axis, of the piston connected to the adjusting nut via the adjuster. Accordingly, at this time, by means of feed of brake fluid into or drainage of brake fluid from the hydraulic chamber, the piston can be advanced or retreated along the cylinder axis; i.e., the apparatus can be operated as a service brake.

By means of activating (energizing) the electromagnetic actuator, the friction clutch can be held in an engaged condition, thereby preventing rotation of the adjusting nut and thus preventing movement, along the cylinder axis, of the piston connected to the adjusting nut via the adjuster. Accordingly, the combined service and parking brake apparatus can be operated as a parking brake as follows. In a condition where brake fluid is fed into the hydraulic chamber, and the piston is advanced along the cylinder axis (a braking state where the brake lining is moved under pressure applied by the piston and engaged with the rotary member to be braked), the electromagnetic actuator is activated, thereby bringing the friction clutch into an engaged condition and thus preventing rotation of the adjusting nut and movement, along the cylinder axis, of the piston connected to the adjusting nut via the adjuster. Accordingly, even when brake fluid is drained from the hydraulic chamber, the braking state can be maintained; i.e., the apparatus can operate as a parking brake.

The combined service and parking brake apparatus of the above-mentioned publication is configured in such a manner as to accommodate, within the cylinder, the friction clutch, the adjuster, the electromagnetic actuator, among other elements, thus having an advantage of compact configuration. The apparatus has the adjuster that can automatically adjust the clearance between the piston and the adjusting nut in accordance with the amount of wear of the brake lining to thereby automatically adjust operation timing of the friction clutch, thus having an advantage of consistent parking brake performance. However, accommodation of the electromagnetic actuator within the hydraulic chamber involves anxiety about reliability in terms of, for example, fluid resistance of an electromagnetic coil disposed in brake fluid, and seal integrity and heat resistance of lead wires extending through the cylinder from the electromagnetic coil disposed within the hydraulic chamber to the exterior of the apparatus.

Also, in operation of the combined service and parking brake apparatus of the above-mentioned publication as a parking brake, while brake fluid is fed under pressure into the hydraulic chamber, the electromagnetic actuator is activated, thereby bringing the friction clutch into an engaged condition. In this case, a meshed portion between the external-thread portion of the adjusting spindle and the internal-thread portion of the adjusting nut is in a stretched condition. In subsequent release of brake fluid pressure (in halt of feed of brake fluid into the hydraulic chamber), reaction force of the brake lining causes the piston to be pressed back by a thread-to-thread clearance present in the meshed portion between the external-thread portion of the adjusting spindle and the internal-thread portion of the adjusting nut. This unavoidably causes a drop in parking brake force.

SUMMARY OF THE INVENTION

An object of the present invention is to provide a combined service and parking brake apparatus having highly reliable braking performance while the above-mentioned disadvantages of the conventional combined service and parking brake apparatus are incorporated thereinto.

Another object of the present invention is to provide a combined service and parking brake apparatus capable of avoiding a drop in parking brake force in release of brake fluid pressure.

To achieve the above objects, the present invention provides a combined service and parking brake apparatus comprising a piston disposed in a cylinder in such a manner as to be nonrotatable about a cylinder axis and movable along the cylinder axis to thereby form a hydraulic chamber within the cylinder; a brake lining to be moved under pressure by the piston and engaged with a rotary member to be braked, when the piston is moved under pressure of brake fluid fed into the hydraulic chamber, thereby effecting a braking operation on the rotary member; a second piston disposed within the hydraulic chamber in such a manner as to be rotatable about the cylinder axis and movable along the cylinder axis between its home position and its non-home position to thereby divide the hydraulic chamber into a first hydraulic chamber and a second hydraulic chamber, movement of the second piston in a piston-projecting direction being restricted to the home position, and the second piston being urged, by biasing means, along the cylinder axis from the non-home position toward the home position; a first stationary screw element provided integrally with the piston within the first hydraulic chamber, extending along the cylinder axis, and having a predetermined lead; a first movable screw element having a thread surface in opposition to a thread surface of the first stationary screw element, provided integrally with the second piston, and meshed with the first stationary screw element with a predetermined thread-to-thread clearance present therebetween along the cylinder axis; a friction clutch capable of engaging the second piston and the cylinder with each other and disengaging the second piston and the cylinder from each other, the friction clutch being brought in a disengaged condition and allowing rotation of the second piston at the time of the second piston being held at the home position to thereby be disengaged from the cylinder, and the friction clutch being brought into an engaged condition and disabling rotation of the second piston at the time of the second piston moving from the home position toward the non-home position and engaging with the cylinder; and a changeover valve provided in a hydraulic branch line allowing feed and drainage of brake fluid therethrough to and from the second hydraulic chamber and branched from a hydraulic line allowing feed and drainage of brake fluid therethrough to and from the first hydraulic chamber, the changeover valve being able to establish and shut off communication between the first hydraulic chamber and the second hydraulic chamber.

In the combined service and parking brake apparatus according to the present invention, when the changeover valve establishes communication between the first hydraulic chamber and the second hydraulic chamber, brake fluid is fed into the first and second hydraulic chambers under the same pressure. Accordingly, pressing force induced by fluid pressure difference does not act on the second piston, so that the second piston can be held at its home position. Thus, the friction clutch can be held in a disengaged condition, thereby allowing rotation of the second piston and movement, along the cylinder axis, of the piston connected to the second piston via the first movable screw element and the first stationary screw element. At this time, therefore, the piston can be advanced and retreated along the cylinder axis by means of feed of brake fluid to and drainage of brake fluid from the hydraulic chamber consisting of the first hydraulic chamber and the second hydraulic chamber. In other words, the apparatus can be operated as a service brake.

When the changeover valve shuts off communication between the first hydraulic chamber and the second hydraulic chamber, brake fluid is fed under pressure only into the first hydraulic chamber. In this case, the second piston can be moved by a predetermined distance from its home position toward the second hydraulic chamber by means of fluid pressure difference between the first hydraulic chamber and the second hydraulic chamber, so that the friction clutch can be engaged, thereby disabling rotation of the second piston and movement, along the cylinder axis, of the piston connected to the second piston via the first movable screw element and the first stationary screw element.

Accordingly, in a condition where the changeover valve shuts off communication between the first hydraulic chamber and the second hydraulic chamber, feeding brake fluid under pressure to the first hydraulic chamber is accompanied by the following operations. The piston advances along the cylinder axis and causes the brake lining to be moved under pressure, and fluid pressure difference between the first hydraulic chamber and the second hydraulic chamber causes the second piston to move by a predetermined distance toward the second hydraulic chamber. Accordingly, on the piston side, the brake lining engages with the rotary member to be braked, thereby effecting a braking operation on the rotary member. On the second-piston side, the friction clutch is in an engaged condition, thereby disabling rotation of the second piston and movement, along the cylinder axis, of the piston connected to the second piston via the first movable screw element and the first stationary screw element. In this condition, relevant component members are deflected in accordance with feed of brake fluid under pressure, and the deflection can reduce and disappear in association with pressure-releasing drainage of brake fluid.

Accordingly, in this condition, when pressure-releasing drainage of brake fluid from the first hydraulic chamber is performed, axial force (compressive force along the cylinder axis) corresponding to the residue of the above-mentioned deflection remains in the first movable screw element and the first stationary screw element intervening between the piston and the second piston, whereby the above-mentioned braking action can be maintained. In other words, the apparatus can be operated as a parking brake. The parking brake can be released as follows: in a condition where the changeover valve establishes communication between the first hydraulic chamber and the second hydraulic chamber, brake fluid is fed under pressure into the first and second hydraulic chambers to thereby disengage the friction clutch, thereby allowing rotation of the second piston. In this condition, in association with pressure-releasing drainage of brake fluid from the first and second hydraulic chambers, rotation of the second piston causes the piston, which is connected to the second piston via the first movable screw element and the first stationary screw element, to move along the cylinder axis, resulting in reduction and disappearance of the above-mentioned deflection. Thus, the parking brake is released.

The combined service and parking brake apparatus according to the present invention employs such a configuration as to accommodate the friction clutch, the first movable screw element, the first stationary screw element, among other elements within the cylinder, thereby providing an advantage of compact configuration. Also, the brake apparatus has the first movable screw element and the first stationary screw element that can automatically adjust the clearance between the piston and the second piston in accordance with the amount of wear of the brake lining to thereby automatically adjust operation timing of the friction clutch, thus having an advantage of consistent parking brake performance. Since no electrical device is accommodated in the hydraulic chamber of the cylinder, the brake apparatus is free from any anxiety about the electrical device with respect to fluid resistance, seal integrity, heat resistance, and the like, thereby providing high reliability.

In the present invention, preferably, a release device for rotating the second piston from the outside of the cylinder is attached to the cylinder. When the parking brake is not released, because of, for example, malfunction of the changeover valve or defective feed of brake fluid under pressure through the hydraulic line or the hydraulic branch line, the second piston can be rotated by use of the release device. Such rotation of the second piston reduces and eliminates axial force remaining in the first movable screw element and the first stationary screw element and returns the piston to a brake release position and the second piston to its home position. Thus, the parking brake can be reliably released.

In the present invention, preferably, a reservoir is connected to the changeover valve, and the reservoir can store brake fluid drained from the second hydraulic chamber when communication between the first hydraulic chamber and the second hydraulic chamber is shut off. In a condition where the changeover valve shuts off communication between the first hydraulic chamber and the second hydraulic chamber, feed of brake fluid to the first hydraulic chamber can increase fluid pressure difference between the first hydraulic chamber and the second hydraulic chamber that acts on the second piston, whereby braking force of the parking brake can be increased.

In the present invention, preferably, the first stationary screw element is internally threaded, and the first movable screw element is externally threaded; alternatively, the first stationary screw element is externally threaded, and the first movable screw element is internally threaded.

To achieve the above objects, the present invention also provides a combined service and parking brake apparatus comprising a piston disposed in a cylinder in such a manner as to be nonrotatable about a cylinder axis and movable along the cylinder axis to thereby form a hydraulic chamber within the cylinder; a brake lining to be moved under pressure by the piston and engaged with a rotary member to be braked, when the piston is moved outward under pressure of brake fluid fed into the hydraulic chamber, thereby effecting a braking operation on the rotary member; a movable member provided within the hydraulic chamber in such a manner as to be rotatable about the cylinder axis and movable along the cylinder axis between its home position and its non-home position, movement of the movable member in a piston-projecting direction being restricted to the home position, and the movable member being urged, by first biasing means, along the cylinder axis from the home position toward the non-home position; a first stationary screw element provided integrally with the piston within the hydraulic chamber, extending along the cylinder axis, and having a predetermined lead; a first movable screw element having a thread surface in opposition to a thread surface of the first stationary screw element, provided integrally with the movable member, and meshed with the first stationary screw element with a predetermined thread-to-thread clearance present therebetween along the cylinder axis; a second stationary screw element disposed coaxially with the first stationary screw element within the hydraulic chamber, provided integrally with the cylinder, extending along the cylinder axis, and having a lead shorter than the lead of the first stationary screw element; a second movable screw element having a thread surface in opposition to a thread surface of the second stationary screw element, provided within the hydraulic chamber in such a manner as to be rotatable about the cylinder axis and movable along the cylinder axis, meshed with the second stationary screw element with a predetermined thread-to-thread clearance present therebetween along the cylinder axis, and urged along the cylinder axis against the first biasing member by second biasing means having biasing force greater than that of the first biasing means; a friction clutch capable of engaging the second movable screw element and the movable member with each other and disengaging the second movable screw element and the movable member from each other, the friction clutch being brought in a disengaged condition and allowing relative rotation between the second movable screw element and the movable member at the time of the second movable screw element moving away from the movable member against the second biasing means, and the friction clutch being brought into an engaged condition and restricting relative rotation between the second movable screw element and the movable member at the time of the second movable screw element being urged by the second biasing means and engaging with the movable member; and a drive device capable of moving the movable member and the second movable screw element along the cylinder axis against the second biasing means from their respective home positions toward their respective non-home positions.

When the combined service and parking brake apparatus according to the present invention is to be operated as a parking brake; i.e., in a condition where brake fluid is fed under pressure into the hydraulic chamber (in a condition where the brake lining is moved under pressure applied by the piston and engaged with the rotary member to be braked, thereby effecting a braking operation on the rotary member), when the drive device is activated so as to move the movable member and the second movable screw element along the cylinder axis against the second biasing means from their respective home positions toward their respective non-home positions, biasing force of the second biasing means causes the friction clutch to be maintained in an engaged condition. Accordingly, since the engaged friction clutch restricts relative rotation between the movable member and the second movable screw element, the movable member and the second movable screw element move along the cylinder axis while rotating in a unitary condition.

Meanwhile, in the brake apparatus, a lead in a meshed portion between the second stationary screw element and the second movable screw element is shorter than that in a meshed portion between the first stationary screw element and the first movable screw element. Accordingly, as the movable member and the second movable screw element move along the cylinder axis while rotating in a unitary condition via the friction clutch, the thread-to-thread clearance along the cylinder axis in the meshed portion between the second stationary screw element and the second movable screw element disappears on a side toward the moving direction of the second movable screw element, so that the thread surface of the second stationary screw element on a side opposite the moving direction and the thread surface of the second movable screw element on the side toward the moving direction contact each other. Subsequently, the thread-to-thread clearance along the cylinder axis in the meshed portion between the first stationary screw element and the first movable screw element disappears on a side opposite the moving direction of the first movable screw element, so that the thread surface of the first stationary screw element on the side toward the moving direction and the thread surface of the first movable screw element on the side opposite the moving direction contact each other. As a result, unitary rotation of the movable member and the second movable screw element stops.

In this condition, the movable member and the second movable screw element are united via the engaged friction clutch, so that a contact portion between the thread surface of the second stationary screw element and the thread surface of the second movable screw element and a contact portion between the thread surface of the first stationary screw element and the thread surface of the first movable screw element push out against each other. Accordingly, in this condition, even when fluid pressure in the hydraulic chamber drops, and consequently reaction force that the brake lining imposes on the piston is directed to pressing the piston backward, the condition where the above-mentioned both contact portions push out against each other remains unchanged. Therefore, by means of setting structural design parameters in such a manner that reaction force that the brake lining imposes on the piston does not cause slippage in the friction clutch and in the above-mentioned both contact portions, at the time of release of brake fluid pressure associated with operation of the brake apparatus as a parking brake, the piston is not pressed backward along the cylinder axis and is maintained in a mechanically locked condition. Accordingly, the brake apparatus can avoid a drop in parking brake force in release of brake fluid pressure.

In the present invention, preferably, the movable member is a second piston disposed within the hydraulic chamber in such a manner as to be rotatable about the cylinder axis and movable along the cylinder axis to thereby divide the hydraulic chamber into a first hydraulic chamber and a second hydraulic chamber; and the drive device is a changeover valve provided in a hydraulic branch line allowing feed and drainage of brake fluid therethrough to and from the second hydraulic chamber and branched from a hydraulic line allowing feed and drainage of brake fluid therethrough to and from the first hydraulic chamber, the changeover valve being able to establish and shut off communication between the first hydraulic chamber and the second hydraulic chamber. In this case, since no electrical device is accommodated in the hydraulic chamber of the cylinder, the brake apparatus is free from any anxiety about the electrical device with respect to fluid resistance, seal integrity, heat resistance, and the like, thereby providing high reliability.

In this case, preferably, a reservoir is connected to the changeover valve, and the reservoir can store brake fluid drained from the second hydraulic chamber when communication between the first hydraulic chamber and the second hydraulic chamber is shut off. Since fluid pressure difference between the first hydraulic chamber and the second hydraulic chamber that acts on the second piston can be increased, operational response of the second piston can be enhanced, and thus operational response of a parking brake can be enhanced.

To achieve the above objects, the present invention further provides a combined service and parking brake apparatus comprising a piston disposed in a cylinder in such a manner as to be nonrotatable about a cylinder axis and movable along the cylinder axis to thereby form a hydraulic chamber within the cylinder; a brake lining to be moved under pressure by the piston and engaged with a rotary member to be braked, when the piston is moved outward under pressure of brake fluid fed into the hydraulic chamber, thereby effecting a braking operation on the rotary member; a movable member provided within the hydraulic chamber in such a manner as to be rotatable about the cylinder axis and movable along the cylinder axis between its home position and its non-home position, movement of the movable member in a piston-projecting direction being restricted to the home position, the movable member being urged, by first biasing means, along the cylinder axis from the home position toward the non-home position, and the movable member being urged along the cylinder axis from the non-home position toward the home position by second biasing means having biasing force greater than that of the first biasing means; a first stationary screw element provided integrally with the piston within the hydraulic chamber, extending along the cylinder axis, and having a predetermined lead; a first movable screw element having a thread surface in opposition to a thread surface of the first stationary screw element, provided integrally with the movable member, and meshed with the first stationary screw element with a predetermined thread-to-thread clearance present therebetween along the cylinder axis; a second stationary screw element disposed coaxially with the first stationary screw element within the hydraulic chamber, provided integrally with the cylinder, extending along the cylinder axis, and having a lead shorter than the lead of the first stationary screw element; a second movable screw element having a thread surface in opposition to a thread surface of the second stationary screw element, provided within the hydraulic chamber in such a manner as to be rotatable about the cylinder axis and movable along the cylinder axis, meshed with the second stationary screw element with a predetermined thread-to-thread clearance present therebetween along the cylinder axis, movement of the second movable screw element in a piston-projecting direction being restricted to its home position, and the second movable screw element being urged toward the home position by third biasing means; a friction clutch capable of engaging the second movable screw element and the movable member with each other and disengaging the second movable screw element and the movable member from each other, the friction clutch being brought in a disengaged condition and allowing relative rotation between the second movable screw element and the movable member at the time of the movable member and the second movable screw element being held in their respective home positions to thereby be disengaged from each other, and the friction clutch being brought into an engaged condition and restricting relative rotation between the second movable screw element and the movable member at the time of the movable member moving from its home position toward its non-home position by a predetermined distance or more and engaging with the second movable screw element; and a drive device capable of moving the movable member along the cylinder axis against the second biasing means from its home position toward its non-home position at the time of the friction clutch being in a disengaged condition, and capable of moving the movable member and the second movable screw element along the cylinder axis against the second and third biasing means toward the respective non-home positions at the time of the friction clutch being in an engaged condition.

When the combined service and parking brake apparatus according to the present invention is to be operated as a parking brake; i.e., in a condition where brake fluid is fed under pressure into the hydraulic chamber (in a condition where the brake lining is moved under pressure applied by the piston and engaged with the rotary member to be braked, thereby effecting a braking operation on the rotary member), when the drive device is activated so as to move the movable member along the cylinder axis against the second biasing means from its home position toward its non-home position, the movable member moves from the home position toward the non-home position by a predetermined distance or more and engages with the second movable screw element to thereby bring the friction clutch into an engaged condition. Accordingly, when the movable member moves from the home position toward the non-home position by the predetermined distance or more, the engaged friction clutch restricts relative rotation between the movable member and the second movable screw element, and the movable member and the second movable screw element move along the cylinder axis while rotating in a unitary condition.

Meanwhile, in the brake apparatus, a lead in a meshed portion between the second stationary screw element and the second movable screw element is shorter than that in a meshed portion between the first stationary screw element and the first movable screw element. Accordingly, as the movable member and the second movable screw element move along the cylinder axis while rotating in a unitary condition via the friction clutch, the thread-to-thread clearance along the cylinder axis in the meshed portion between the second stationary screw element and the second movable screw element disappears on a side toward the moving direction of the second movable screw element, so that the thread surface of the second stationary screw element on a side opposite the moving direction and the thread surface of the second movable screw element on the side toward the moving direction contact each other. Subsequently, the thread-to-thread clearance along the cylinder axis in the meshed portion between the first stationary screw element and the first movable screw element disappears on a side opposite the moving direction of the first movable screw element, so that the thread surface of the first stationary screw element on the side toward the moving direction and the thread surface of the first movable screw element on the side opposite the moving direction contact each other. As a result, unitary rotation of the movable member and the second movable screw element stops.

In this condition, the movable member and the second movable screw element are united via the engaged friction clutch, so that a contact portion between the thread surface of the second stationary screw element and the thread surface of the second movable screw element and a contact portion between the thread surface of the first stationary screw element and the thread surface of the first movable screw element push out against each other. Accordingly, in this condition, even when fluid pressure in the hydraulic chamber drops, and consequently reaction force that the brake lining imposes on the piston is directed to pressing the piston backward, the condition where the above-mentioned both contact portions push out against each other remains unchanged. Therefore, by means of setting structural design parameters in such a manner that reaction force that the brake lining imposes on the piston does not cause slippage in the friction clutch and in the above-mentioned both contact portions, at the time of release of brake fluid pressure associated with operation of the brake apparatus as a parking brake, the piston is not pressed backward along the cylinder axis and is maintained in a mechanically locked condition. Accordingly, the brake apparatus can avoid a drop in parking brake force in release of brake fluid pressure.

In the present invention, preferably, the movable member is a second piston disposed within the hydraulic chamber in such a manner as to be rotatable about the cylinder axis and movable along the cylinder axis to thereby divide the hydraulic chamber into a first hydraulic chamber and a second hydraulic chamber; and the drive device is a changeover valve provided in a hydraulic branch line allowing feed and drainage of brake fluid therethrough to and from the second hydraulic chamber and branched from a hydraulic line allowing feed and drainage of brake fluid therethrough to and from the first hydraulic chamber, the changeover valve being able to establish and shut off communication between the first hydraulic chamber and the second hydraulic chamber. In this case, since no electrical device is accommodated in the hydraulic chamber of the cylinder, the brake apparatus is free from any anxiety about the electrical device with respect to fluid resistance, seal integrity, heat resistance, and the like, thereby providing high reliability.

In this case, preferably, a reservoir is connected to the changeover valve, and the reservoir can store brake fluid drained from the second hydraulic chamber when communication between the first hydraulic chamber and the second hydraulic chamber is shut off. Since fluid pressure difference between the first hydraulic chamber and the second hydraulic chamber that acts on the second piston can be increased, operational response of the second piston can be enhanced, and thus operational response of a parking brake can be enhanced.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 29 is a third explanatory view for explaining actions of the combined service and parking brake apparatus shown in FIG. 19 when the brake apparatus is released from use as a parking brake.

DESCRIPTION OF THE PREFERRED EMBODIMENTS

Figure 1:
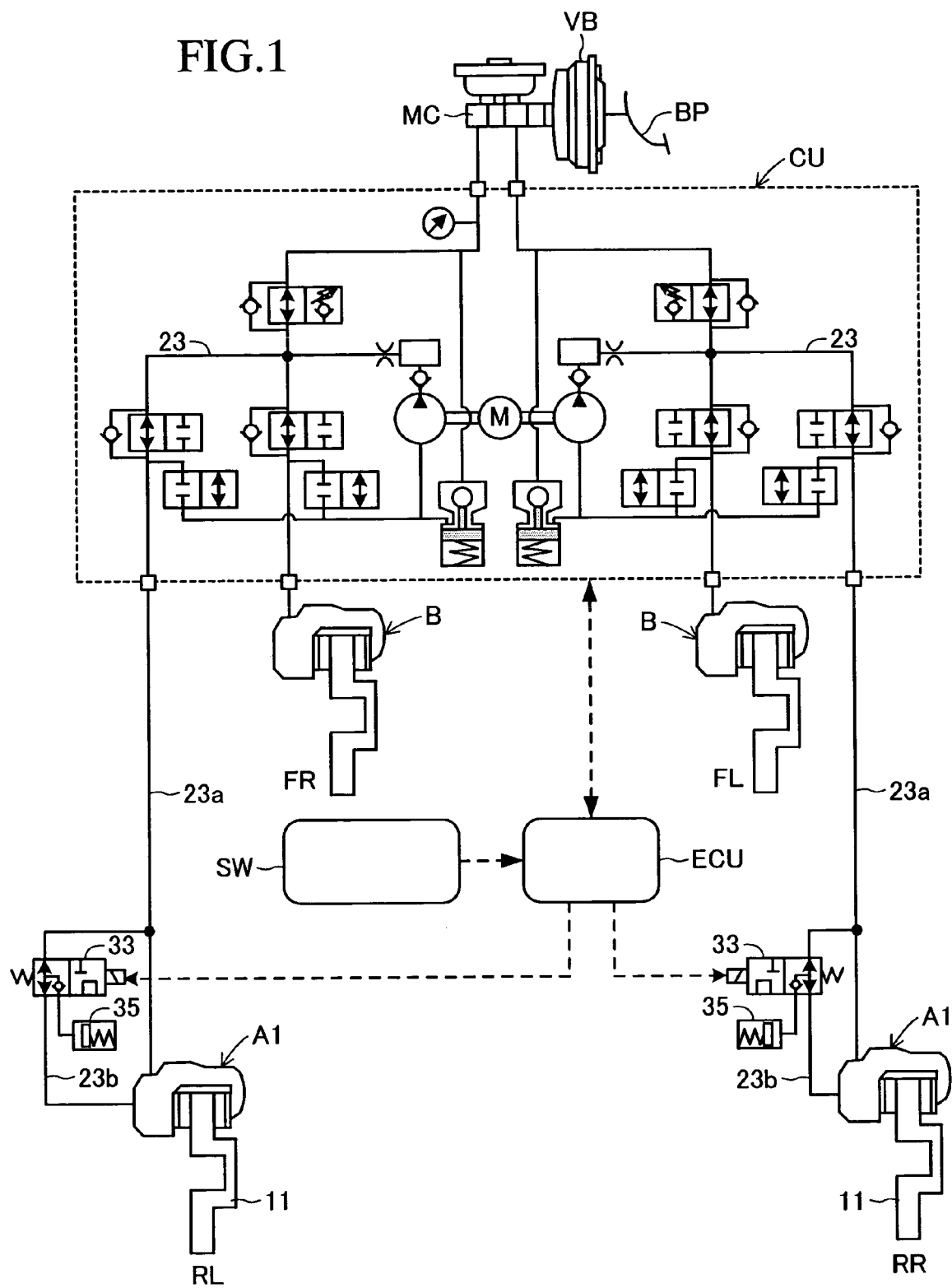
FIG. 1 is a schematic block diagram of a brake system including a first embodiment of a combined service and parking brake apparatus according to the present invention.
Figure 2:
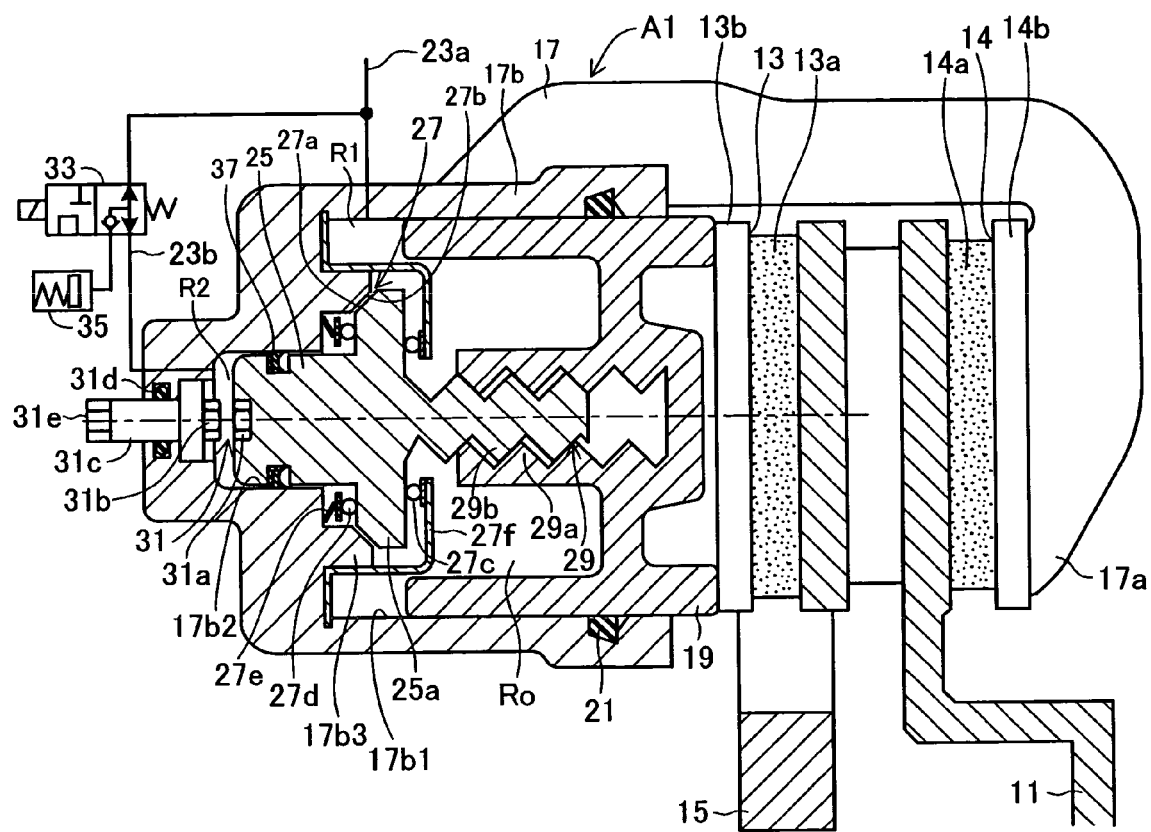
FIG. 2 is an enlarged sectional view showing essential portions of the combined service and parking brake apparatus of FIG. 1.

Embodiments of the present invention will next be described in detail with reference to the drawings. FIGS. 1 and 2 show a first embodiment of the present invention. A brake system shown in FIG. 1 includes a master cylinder MC, which is boosted by a vacuum-type booster VB in accordance with operation of a brake pedal BP, and a brake fluid pressure control unit CU, which can perform skid control and traction control. The brake system employs a combined service and parking brake apparatus A1 according to the first embodiment for each of rear left and rear right wheels RL and RR, and an ordinary disc brake apparatus B for each of front left and front right wheels FL and FR.

The combined service and parking brake apparatus A1 is a movable-caliper-type disc brake to which the present invention is applied. As shown in FIG. 2, an inner pad 13 and an outer pad 14 are mounted to a mounting 15, which is a support member, in such a manner as to be slidable along the axis of a disc rotor 11 (which rotates unitarily with an unillustrated wheel and serves as a rotary member to be braked). The inner and outer pads 13 and 14 are adapted to clamp the disc rotor 11 from opposite sides so as to effect a braking operation on the disc rotor 11. As is well known, the mounting 15 assumes such a shape as to straddle the disc rotor 11. The illustrated inboard portion of the mounting 15 located inboard of the disc rotor 11 supports the inner pad 13 in such a manner that the inner pad 13 is slidable along the rotor axis, and is attached to a vehicle body. An unillustrated outboard portion of the mounting 15 located outboard of the disc rotor 11 supports the outer pad 14 in such a manner that the outer pad 14 is slidable along the rotor axis.

The inner pad 13 includes a brake lining 13a and a backing plate 13b. The inner pad 13 can engage with and disengage from the disc rotor 11 via the brake lining 13a. A piston 19 is attached to a cylinder portion 17b of a movable caliper 17, which in turn is attached to the mounting 15 in such a manner as to be slidable along the rotor axis. The piston 19 causes the inner pad 13 to move under pressure toward the disc rotor 11. The outer pad 14 includes a brake lining 14a and a backing plate 14b and can engage with and disengage from the disc rotor 11 via the brake lining 14a. A reaction applicator portion 17a of the movable caliper 17 causes the outer pad 14 to move under pressure toward the disc rotor 11.

The piston 19 is fitted, via a piston seal 21, into a bore 17b1 formed in the cylinder portion 17b of the movable caliper 17, in such a manner as to be nonrotatable about the cylinder axis and movable along the cylinder axis (substantially in parallel with the rotor axis), thereby forming a hydraulic chamber Ro filled with brake fluid within the cylinder portion 17b. The hydraulic chamber Ro is connected to a hydraulic line 23a that partially constitutes a hydraulic brake fluid line 23 shown in FIG. 1. The piston seal 21 is designed to be deformed toward the disc rotor 11 at the time of application of brake fluid pressure when the piston 19 is moved under pressure toward the disc rotor 11. The piston seal 21 has a function of retracting the piston 19 (retractive function) by means of restoration from deformation at the time of release of brake fluid pressure.

In the first embodiment, a second piston 25, a friction clutch 27, and an adjuster 29 are installed in the cylinder portion 17b of the movable caliper 17, and a release device 31 is attached to the cylinder portion 17b. A changeover valve 33 is installed in a hydraulic branch line 23b branched from the hydraulic line 23a. A reservoir 35 is connected to the changeover valve 33.

In the hydraulic chamber Ro, the second piston 25 is attached, via a seal ring 37, to a small-diameter portion of a stepped bore 17b2 formed in the cylinder portion 17b in such a manner as to be rotatable about the cylinder axis and movable along the cylinder axis, thereby dividing the hydraulic chamber Ro into a first hydraulic chamber R1 and a second hydraulic chamber R2. The first hydraulic chamber R1 accommodates the friction clutch 27 and the adjuster 29; is connected to the hydraulic line 23a; and allows brake fluid to be fed thereinto and drained therefrom through the hydraulic line 23a. The second hydraulic chamber R2 accommodates the release device 31; is connected to the hydraulic branch line 23b; and allows brake fluid to be fed thereinto and drained therefrom through the hydraulic branch line 23b.

The friction clutch 27 is provided between the second piston 25 and the cylinder portion 17b and allows engagement and disengagement between the second piston 25 and the cylinder portion 17b. The friction clutch 27 includes a tapered friction surface 27a formed on an annular flange portion 25a of the second piston 25; a tapered friction surface 27b formed on an annular projection 17b3 of the cylinder portion 17b and capable of engaging with and disengaging from the friction surface 27a; a pair of axial bearings 27c and 27d disposed in such a manner as to sandwich the annular flange portion 25a of the second piston 25 therebetween; and a plate spring 27e intervening between the axial bearing 27d and the cylinder portion 17b and urging the friction surface 27a away from the friction surface 27b.

The friction clutch 27 functions as follows. When the second piston 25 is held at its home position by a cooperative action of the plate spring 27e and a bracket 27f, the friction surface 27a is located away from the friction surface 27b. The second piston 25 is disengaged from the cylinder portion 17b, thereby allowing rotation of the second piston 25. When the second piston 25 moves by a predetermined distance against the plate spring 27e from the home position toward the second hydraulic chamber R2, the friction surface 27a is engaged with the friction surface 27b. The second piston 25 is fixedly engaged with the cylinder portion 17b through friction, thereby disabling rotation of the second piston 25.

The adjuster 29 can automatically adjust the clearance between the piston 19 and the second piston 25 in accordance with the amount of wear of the brake linings 13a and 14a to thereby automatically adjust operation timing of the friction clutch 27. The adjuster 29 includes an internal-thread portion 29a provided integrally with the piston 19 and an external-thread portion 29b provided integrally with the second piston 25 and meshed with the internal-thread portion 29a. Notably, the internal-thread portion 29a and the external-thread portion 29b are depicted such that their thread profiles are illustrated in an exaggerated manner.

The release device 31 can rotate the second piston 25 by operation from the outside of the cylinder portion 17b of the movable caliper 17. The release device 31 includes a hexagonal hole 31a formed in an end portion of the second piston 25 in an axially extending manner, and an operation shaft 31c. The operation shaft 31c has a hexagonal projection 31b provided at its end portion located within the cylinder portion 17b and capable of being engaged with and disengaged from the hexagonal hole 31a. The operation shaft 31c is attached, via a seal ring 31d, to the cylinder portion 17b in such a manner as to be rotatable about and movable along the cylinder axis; extends through the cylinder portion 17b; and also has a hexagonal portion 31e, to which a release lever (not shown) is to be attached and which is provided at its end portion located at the outside of the cylinder portion 17b.

The changeover valve 33 is an electromagnetic 3-port 2-position changeover valve whose energization and de-energization are controlled by an electric control unit ECU. The changeover valve 33 is installed in the hydraulic branch line 23b, which allows feed and drainage of brake fluid therethrough to and from the second hydraulic chamber R2 and is branched from the hydraulic line 23a allowing feed and drainage of brake fluid therethrough to and from the first hydraulic chamber R1. The changeover valve 33 can establish and shut off communication between the first hydraulic chamber R1 and the second hydraulic chamber R2 and between the second hydraulic chamber R2 and the reservoir 35.

The reservoir 35 is connected to the changeover valve 33. When communication between the first hydraulic chamber R1 and the second hydraulic chamber R2 is shut off by the changeover valve 33, the reservoir 35 can store brake fluid drained from the second hydraulic chamber R2. When the changeover valve 33 establishes communication between the first hydraulic chamber R1 and the second hydraulic chamber R2 in a condition where brake fluid is not fed from the brake fluid pressure control unit CU to the hydraulic branch line 23b, the reservoir 35 allows drainage of brake fluid stored therein toward the hydraulic branch line 23b.

During travel of the vehicle, the brake fluid pressure control unit CU can perform skid control and traction control while being controlled in a known manner by the electric control unit ECU. During halt of the vehicle, the brake fluid pressure control unit CU can control operation of the combined service and parking brake apparatus A1 while being controlled, together with the changeover valve 33, by the electric control unit ECU on the basis of operation of a parking brake switch SW. Since the configuration of the brake fluid pressure control unit CU is known, description thereof is omitted.

Figure 3:
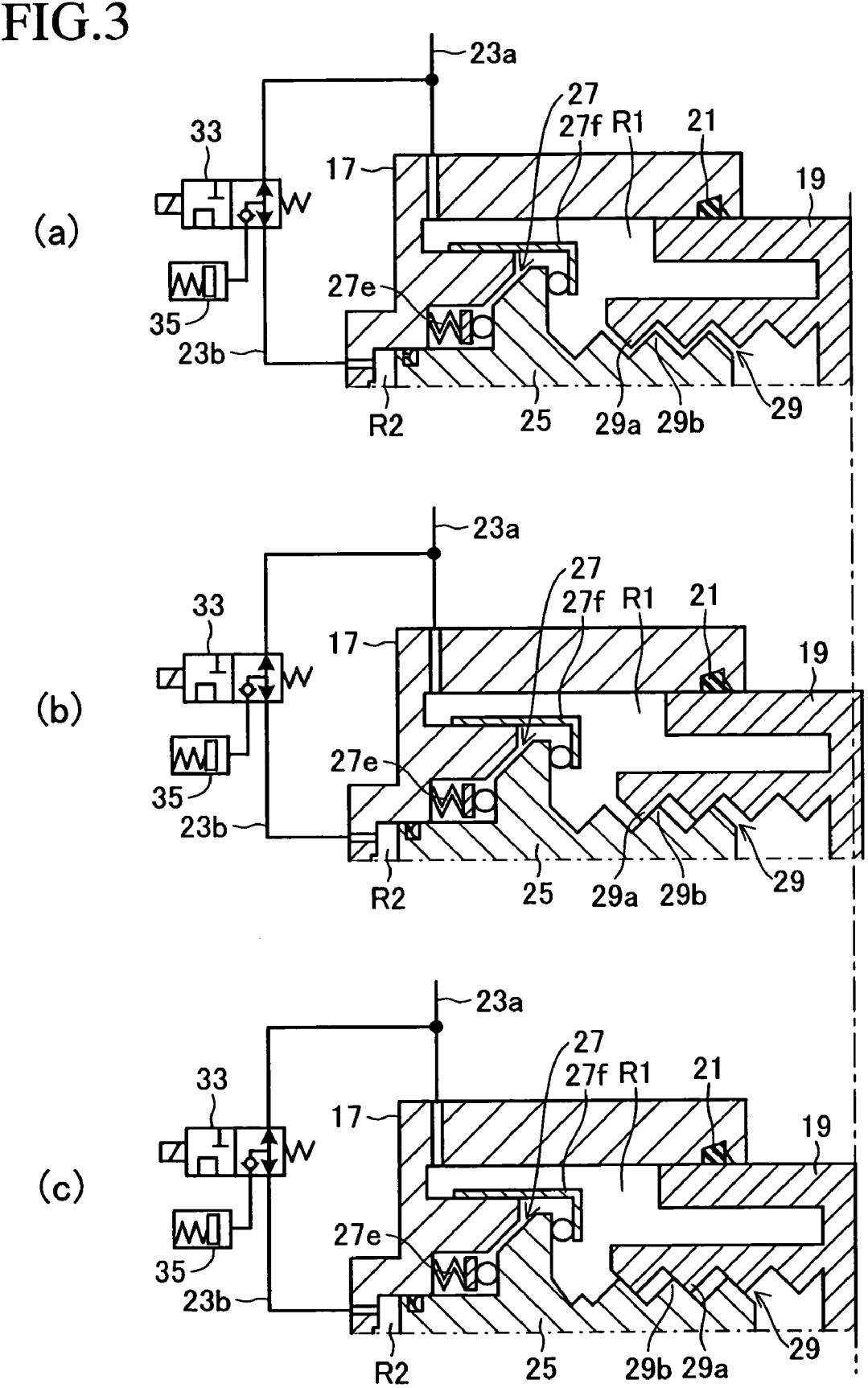
FIG. 3(a), FIG. 3(b), FIG. 3(c) are explanatory views for explaining actions of the combined service and parking brake apparatus shown in FIGS. 1 and 2 when the brake apparatus operates as a service brake.

In a case where the parking brake switch SW is turned OFF so as to use the thus-configured combined service and parking brake apparatus A1 of the first embodiment as a service brake, as shown in FIG. 3, the changeover valve 33 is de-energized, so that communication between the first hydraulic chamber R1 and the second hydraulic chamber R2 is established, and the check valve incorporated in the changeover valve 33 prevents brake fluid flow from the hydraulic branch circuit 23b to the reservoir 35. Accordingly, when brake fluid is fed under pressure from the brake fluid pressure control unit CU to the hydraulic circuit 23a, brake fluid is fed under pressure into the first hydraulic chamber R1 from the hydraulic line 23a as well as into the second hydraulic chamber R2 from the hydraulic line 23a via the hydraulic branch line 23b and the changeover valve 33.

When the changeover valve 33 establishes communication between the first hydraulic chamber R1 and the second hydraulic chamber R2, brake fluid is fed into the first and second hydraulic chambers R1 and R2 under the same pressure. Accordingly, pressing force induced by fluid pressure difference does not act on the second piston 25, so that the second piston 25 is held at its home position as a result of cooperative operation of the plate spring 27e and the bracket 27f of the friction clutch 27. Thus, the friction clutch 27 is held in a disengaged condition, thereby allowing rotation of the second piston 25 and movement, along the cylinder axis, of the piston 19 connected to the second piston 25 via the adjuster 29. At this time, therefore, the piston 19 can be advanced and retreated along the cylinder axis by means of feed of brake fluid to and drainage of brake fluid from the hydraulic chamber Ro (the first hydraulic chamber R1 and the second hydraulic chamber R2). In other words, the brake apparatus A1 can be operated as a service brake.

At this time, brake fluid fed under pressure into the first hydraulic chamber R1 causes the piston 19 to move along the cylinder axis toward the disc rotor 11 while the piston 19 causes the piston seal 21 to be deformed toward the disc rotor 11, thereby pressing the inner pad 13 against the disc rotor 11. Associated reaction force causes the movable caliper 17 to move inboard, so that the reaction applicator portion 17a of the movable caliper 17 presses the outer pad 14 against the disc rotor 11. The mounting 15, which supports the both pads 13 and 14, receives force generated as a result of the both pads 13 and 14 pressing the disc rotor 11, thereby generating braking force that prevents rotation of the disc rotor 11. In this brake-activated condition, the movable caliper 17 and other relevant component members are deflected in accordance with feed of brake fluid under pressure. In release of brake, restoration of the movable caliper 17 and other relevant component members from deflection also provides a retractive function.

In release of brake fluid pressure effected by elimination of feed of brake fluid under pressure from the brake fluid pressure control unit CU to the first and second hydraulic chambers R1 and R2, a retractive function effected by restoration of the piston seal 21 from the above-mentioned deformation and a retractive function effected by restoration of the movable caliper 17 and other relevant component members from deflection cause the piston 19 to move inboard and the movable caliper 17 to move outboard, thereby releasing the both pads 13 and 14 from a condition of being pressed against the disc rotor 11. Thus is cancelled an action of braking rotation of the disc rotor 11 effected by the both pads 13 and 14.

In some cases, the piston 19 advances or retreats along the cylinder axis by a distance equal to or longer than a thread-to-thread clearance of the adjuster 29. When the piston 19 is to advance by a distance equal to or longer than the thread-to-thread clearance of the adjuster 29 (for example, when braking at excessive pressure is performed, or the brake linings 13a and 14a are worn), a condition shown exaggeratedly in FIG. 3(b) is established through a condition shown exaggeratedly in FIG. 3(a), so that the internal-thread portion 29a of the adjuster 29 is engaged with the external-thread portion 29b of the adjuster 29 and presses the external-thread portion 29b toward the disc rotor 11. In the condition of FIG. 3(b), the second piston 25 is rotatable; thus, when the internal-thread portion 29a engages with the external-thread portion 29b and presses the external-thread portion 29b toward the disc rotor 11, the second piston 25 rotates while being held in substantially the same position (home position), thereby allowing the piston 19 to advance by a distance equal to or longer than the thread-to-thread clearance.

When the piston 19 is to retreat from the condition of FIG. 3(b) by a distance equal to or longer than the thread-to-thread clearance of the adjuster 29 (for example, in release of brake fluid pressure from a condition where braking at excessive pressure is performed), as shown in FIG. 3(c), the internal-thread portion 29a engages with the external-thread portion 29b and presses the external-thread portion 29b toward a side opposite the disc rotor 11. At this time, the second piston 25 is also rotatable; thus, when the internal-thread portion 29a engages with the external-thread portion 29b and presses the external-thread portion 29b toward the side opposite the disc rotor 11, the second piston 25 rotates while being held at substantially the same position (home position), thereby allowing the piston 19 to retreat by a distance equal to or longer than the thread-to-thread clearance.

In a case where the parking brake switch SW in the OFF condition is turned ON so as to use the combined service and parking brake apparatus A1 of the first embodiment as a parking brake, the electric control unit ECU causes the changeover valve 33 to be energized before elapse of a set time T1 after the parking brake switch SW is turned ON, and causes the brake fluid pressure control unit CU to enter a pressure application control condition before elapse of a set time T2 (T1>T2) after the parking brake switch SW is turned ON, whereby the brake fluid pressure control unit CU feeds a predetermined amount of brake fluid under pressure to the both combined service and parking brake apparatus A1.

Figure 4:
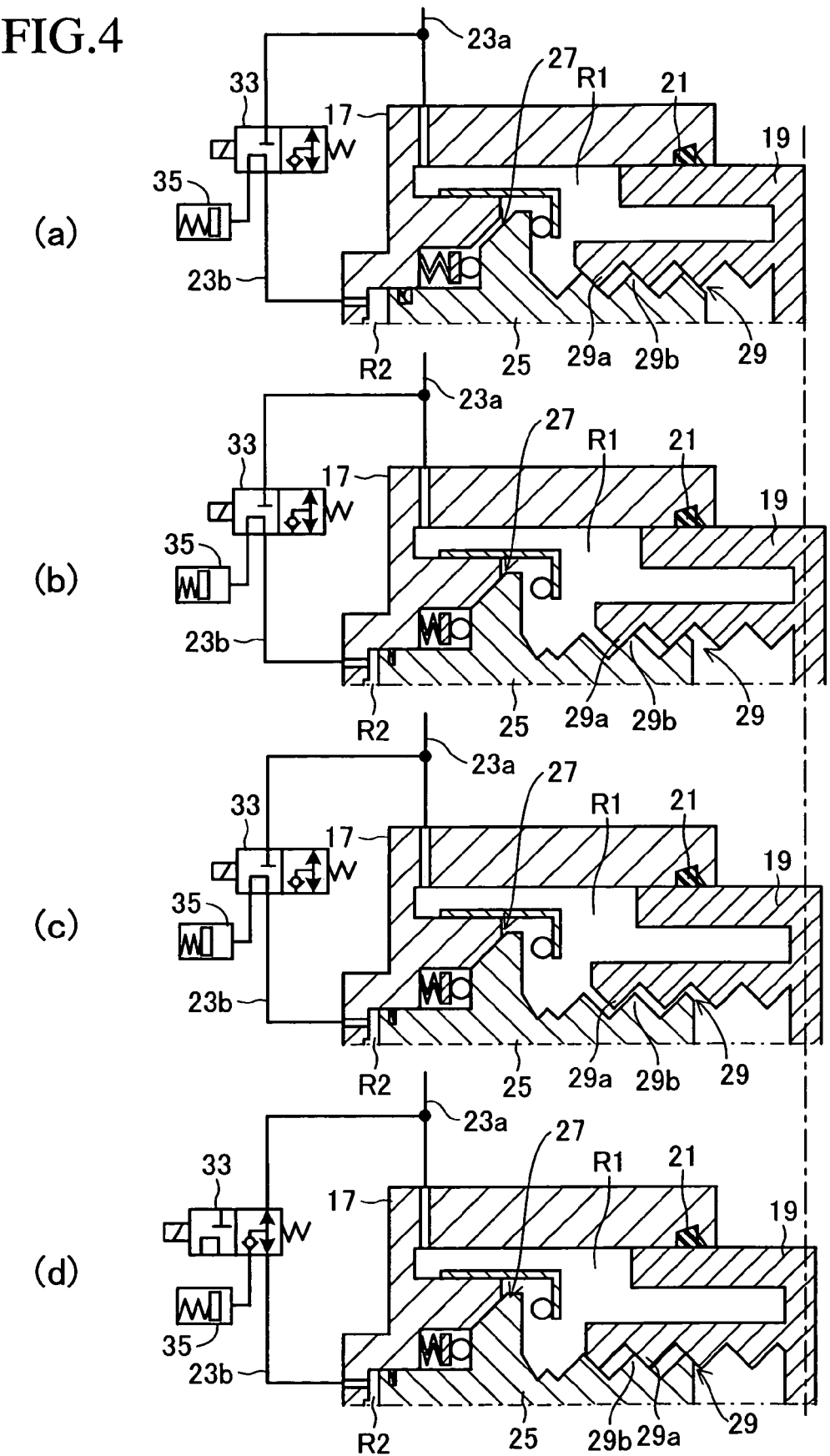
FIG. 4(a), FIG. 4(b), FIG. 4(c), FIG. 4(d) are explanatory views for explaining actions of the combined service and parking brake apparatus shown in FIGS. 1 and 2 when the brake apparatus operates as a parking brake.

At this time, before elapse of the set time T2 after the parking brake switch SW is turned ON, a condition shown exaggeratedly in FIG. 4(b) is established through a condition shown exaggeratedly in FIG. 4(a). Also, before elapse of the set time T1 after the parking brake switch SW is turned ON, a condition shown exaggeratedly in FIG. 4(c) is established through the conditions of FIGS. 4(a) and (b). Furthermore, after elapse of the set time T1, a condition shown exaggeratedly in FIG. 4(d) is established through the condition of FIG. 4(c). FIG. 4(a) shows a condition immediately after the parking brake switch SW is turned ON. In this condition, the changeover valve 33 is energized, so that communication between the first hydraulic chamber R1 and the second hydraulic chamber R2 is shut off; and brake fluid is allowed to flow into the reservoir 35 from the second hydraulic chamber R2.

FIG. 4(b) shows a condition where brake fluid is fed under pressure into the first hydraulic chamber R1 to thereby effect a parking brake operation. In this condition (pressure-applied condition), while the changeover valve 33 is held energized, brake fluid is fed under pressure only into the first hydraulic chamber R1 from the brake fluid pressure control unit CU, and brake fluid from the second hydraulic chamber R2 is stored in the reservoir 35. In this condition, the movable caliper 17 and relevant other component members are deflected to an extent equivalent to or greater than the thread-to-thread clearance of the adjuster 29. This deflection reduces in association with pressure-releasing drainage of brake fluid.

FIG. 4(c) shows a condition where brake fluid, which had been fed under pressure into the first hydraulic chamber R1, has begun to undergo pressure-releasing drainage from the first hydraulic chamber R1. In this condition (pressure reduction start condition), while the changeover valve 33 is held energized, brake fluid undergoes pressure-releasing drainage from the first hydraulic chamber R1 toward the brake fluid pressure control unit CU via the hydraulic line 23a, and brake fluid that has flowed into the reservoir 35 remains stored in the reservoir 35. In this condition, deflection of the movable caliper 17 and other relevant component members is slightly reduced.

FIG. 4(d) shows a condition where the both pistons 19 and 25 are mechanically locked to thereby maintain a parking brake operation in a mechanically locked condition. In this condition, the changeover valve 33 is de-energized, so that communication is established between the first hydraulic chamber R1 and the second hydraulic chamber R2; pressure-releasing drainage of brake fluid from the first hydraulic chamber R1 to the brake fluid pressure control unit CU is completed; and drainage of brake fluid from the reservoir 35 to the brake fluid pressure control unit CU is completed. In this condition, the above-mentioned deflection of the movable caliper 17 and other relevant component members is reduced by an extent equivalent to the thread-to-thread clearance of the adjuster 29, but still remains.

Meanwhile, in transition from the condition of FIG. 4(a) to the condition of FIG. 4(b), since brake fluid is fed under pressure only into the first hydraulic chamber R1 from the brake fluid pressure control unit CU, the piston 19 and the movable caliper 17 operate as in the case where the brake apparatus A1 operates as a service brake, thereby generating braking force to prevent rotation of the disc rotor 11. At this time, while the changeover valve 33 is held energized, brake fluid is fed under pressure only into the first hydraulic chamber R1, so that fluid pressure difference between the first hydraulic chamber R1 and the second hydraulic chamber R2 causes the second piston 25 to move by a predetermined distance toward the second hydraulic chamber R2 from its home position shown in FIG. 4A to thereby engage the friction clutch 27. Accordingly, rotation of the second piston 25 is disabled, and axial movement of the piston 19 connected to the second piston 25 via the adjuster 29 is disabled.

In transition from the condition of FIG. 4(a) to the condition of FIG. 4(b), if the friction clutch 27 is engaged in the midst of movement of the piston 19 toward the disc rotor 11, the piston 19 pulls the second piston 25 toward the disc rotor 11, so that the friction clutch 27 is temporarily disengaged. Accordingly, the second piston 25 temporarily rotates so as to temporarily allow movement of the piston 19 toward the disc rotor 11. This operation is repeated until movement of the piston 19 toward the disc rotor 11 is completed.

Accordingly, in a condition (condition of FIG. 4(b)) where the set time T2 has elapsed after the parking brake switch SW was turned ON, and the piston 19 has completed movement toward the disc rotor 11, even though brake fluid subsequently undergoes pressure-releasing drainage from the first hydraulic chamber R1 toward the brake fluid pressure control unit CU, the condition of FIG. 4(d) is established through the condition of FIG. 4(c); i.e., the both pistons 19 and 25 are mechanically locked to thereby mechanically maintain a parking brake operation. In this condition, axial force (compressive force along the cylinder axis) corresponding to the residue of the above-mentioned deflection of the movable caliper 17 and other relevant component members remains in the adjuster 29 intervening between the piston 19 and the second piston 25, whereby the above-mentioned braking action can be maintained in a mechanically locked condition. Even when the changeover valve 33 is de-energized as shown in FIG. 4(d), the brake apparatus A1 can be operated as a parking brake.

Figure 5:
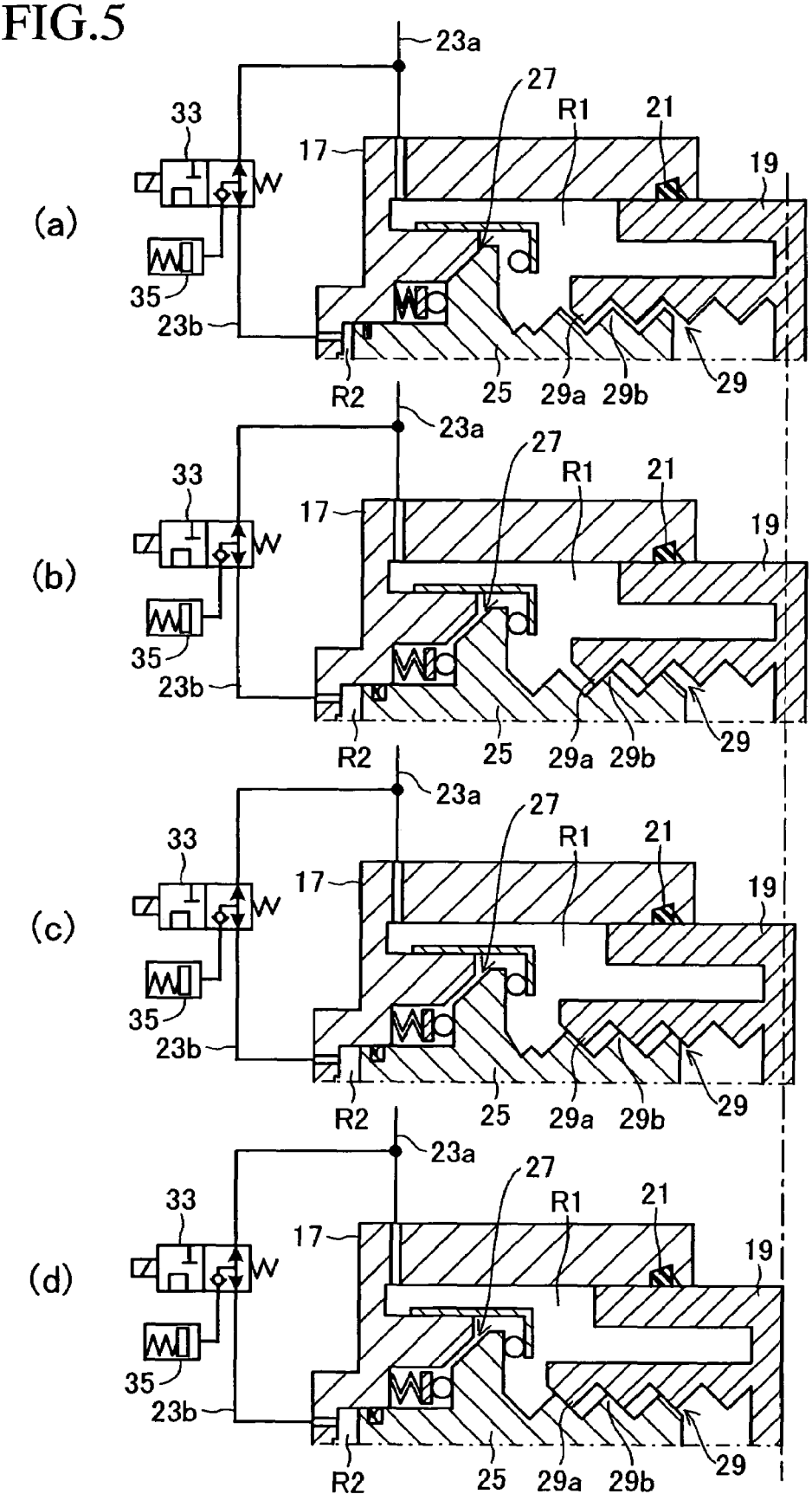
FIG. 5(a), FIG. 5(b), FIG. 5(c), FIG. 5(d) are explanatory views for explaining actions of the combined service and parking brake apparatus shown in FIGS. 1 and 2 when the brake apparatus is released from use as a parking brake.

In a case where the parking brake switch SW in the ON condition is turned OFF so as to release the combined service and parking brake apparatus A1 of the first embodiment from use as a parking brake, before elapse of set time T3 (substantially equal to the set time T2) after the parking brake switch is turned OFF, and while the changeover valve 33 is held de-energized, the electric control unit ECU instructs the brake fluid pressure control unit CU to feed under pressure a predetermined amount of brake fluid to the both combined service and parking brake apparatus A1. At this time, the condition of FIG. 4(d) shifts to the condition of FIG. 5(d) through the conditions of FIG. 5(a) to (c), whereby the parking brake is released.

In the conditions of FIGS. 5(a) and (b), while the changeover valve 33 is held de-energized, the brake fluid pressure control unit CU feeds brake fluid under pressure into the first and second hydraulic chambers R1 and R2. In the conditions of FIGS. 5(c) and (d), while the changeover switch 33 is held de-energized, brake fluid undergoes pressure-releasing drainage toward the brake fluid pressure control unit CU from the first and second hydraulic chambers R1 and R2. In transition from the condition of FIG. 5(a) to FIG. 5(b), brake fluid is fed under pressure into the second hydraulic chamber R2, so that the friction clutch 27 in an engaged condition is disengaged.

In the conditions of FIGS. 5(b) to 5(d), the friction clutch 27 is held disengaged, thereby allowing rotation of the second piston 25 and allowing the piston 19 to advance and retreat along the cylinder axis in accordance with feed of brake fluid to and drainage of brake fluid from the first hydraulic chamber R1. In the conditions of FIGS. 5(c) and (d), in association with pressure-releasing drainage of brake fluid from the first and second hydraulic chambers R1 and R2, rotation of the second piston 25 causes the piston 19, which is connected to the second piston 25 via the adjuster 29, to move along the cylinder axis, resulting in reduction and disappearance of the above-mentioned deflection of the movable caliper 17 and other relevant component members. Thus, the parking brake is released.

The combined service and parking brake apparatus A1 of the first embodiment employs such a configuration as to accommodate the friction clutch 27, the adjuster 29, among other elements within the cylinder portion 17b of the movable caliper 17, thereby providing an advantage of compact configuration. Also, the brake apparatus A1 has the adjuster 29 that can automatically adjust the clearance between the piston 19 and the second piston 25 in accordance with the amount of wear of the brake linings 13a and 14a to thereby automatically adjust operation timing of the friction clutch 27, thus having an advantage of consistent parking brake performance. Since no electrical device is accommodated in the hydraulic chamber Ro of the cylinder portion 17b of the movable caliper 17, the brake apparatus A1 is free from any anxiety about the electrical device with respect to fluid resistance, seal integrity, heat resistance, and the like, thereby providing high reliability.

In the combined service and parking brake apparatus A1 of the first embodiment, as shown in FIG. 2 (illustration omitted in FIGS. 3 to 5), the release device 31 for rotating the second piston 25 from the outside of the cylinder portion 17b is attached to the cylinder portion 17b. When the parking brake is not released, because of, for example, malfunction of the changeover valve 33 or defective feed of brake fluid under pressure through the hydraulic line 23a or the hydraulic branch line 23b, the second piston 25 can be rotated by use of the release device 31. Such rotation of the second piston 25 reduces and eliminates axial force remaining in the adjuster 29 and returns the piston 19 to a brake release position and the second piston 25 to its home position. Thus, the condition of FIG. 4(d) can be shifted to the condition of FIG. 5(d), so that the parking brake can be reliably released.

In the combined service and parking brake apparatus A1 of the first embodiment, the reservoir 35 is connected to the changeover valve 33, and the reservoir 35 can store brake fluid drained from the second hydraulic chamber R2 when communication between the first hydraulic chamber R1 and the second hydraulic chamber R2 is shut off. Accordingly, in a condition where the changeover valve 33 shuts off communication between the first hydraulic chamber R1 and the second hydraulic chamber R2, feed of brake fluid under pressure to the first hydraulic chamber R1 can increase fluid pressure difference between the first hydraulic chamber R1 and the second hydraulic chamber R2 that acts on the second piston 25, whereby braking force of the parking brake can be increased.

Figure 6:
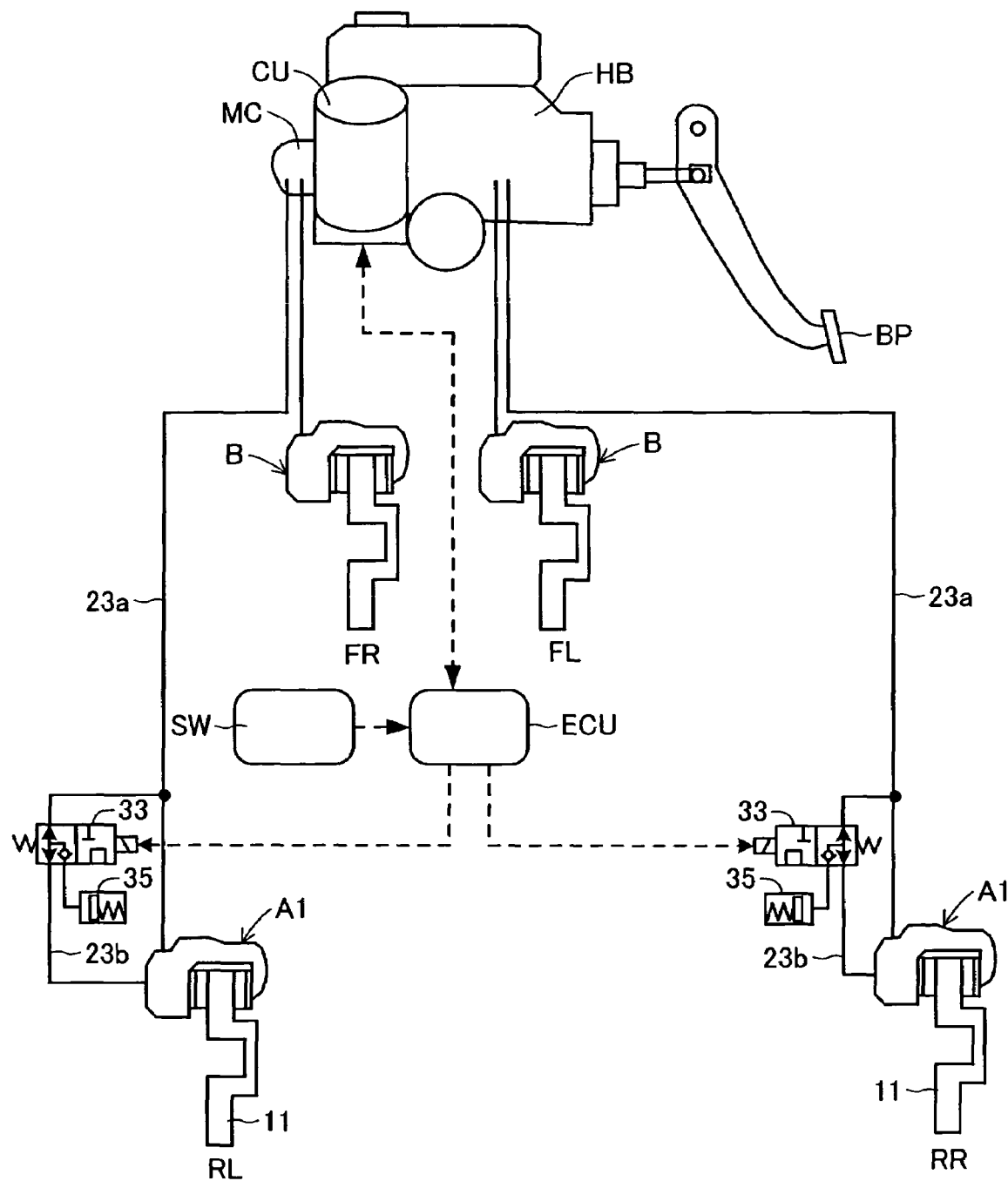
FIG. 6 is a schematic block diagram of another brake system including a combined service and parking brake apparatus according to the present invention.

According to the above-described first embodiment, as shown in FIG. 1, the present invention is embodied in the brake system that includes the master cylinder MC, which is boosted by the vacuum-type booster VB in accordance with operation of the brake pedal BP, and the brake fluid pressure control unit CU, which can perform skid control and traction control. However, as in the case of a modified embodiment shown in FIG. 6, the present invention may be embodied in a brake system that includes the master cylinder MC, which is boosted by a hydraulic booster HB in accordance with operation of the brake pedal BP, and the brake fluid pressure control unit CU, which can perform skid control and traction control.

Figure 7:
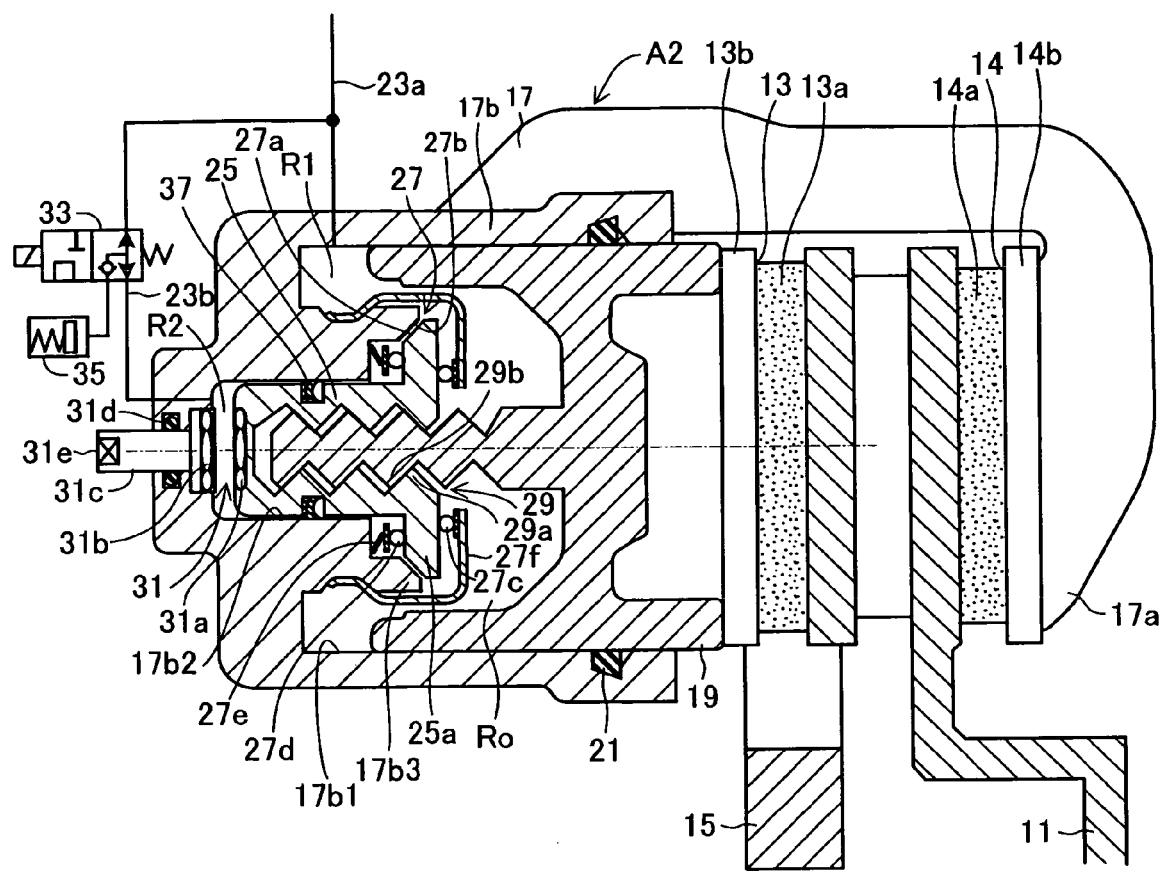
FIG. 7 is an enlarged sectional view showing essential portions of a second embodiment of a combined service and parking brake apparatus according to the present invention.

As shown in FIG. 2, the above-described first embodiment is configured such that the adjuster 29 includes the internal-thread portion 29a provided integrally with the piston 19 and the external-thread portion 29b provided integrally with the second piston 25 and meshed with the internal-thread portion 29a. However, as in the case of a combined service and parking brake apparatus A2 of a second embodiment shown in FIG. 7, the present invention may be embodied such that the adjuster 29 includes the internal-thread portion 29a provided integrally with the second piston 25 and the external-thread portion 29b provided integrally with the piston 19 and meshed with the internal-thread portion 29a. The configuration of the second embodiment shown in FIG. 7 is substantially similar to that of the first embodiment shown in FIG. 2 except that a two-opposed-face portion 31e is formed at an outer end portion of the operation shaft 31c of the release device 31. Thus, in FIG. 7, structural features similar to those in FIG. 2 are denoted by common reference numerals, and repeated description thereof is omitted.

The above-described embodiments include the release device 31 and the reservoir 35; however, the present invention may be embodied without use of the components. In an embodiment that does not use the reservoir 35, a function similar to that of the reservoir 35 is effected by means of, for example, expansion of the hydraulic branch line 23b, and the changeover valve 33 assumes the form of an electromagnetic 2-port 2-position on-off valve. The above embodiments are described while mentioning application of the present invention to a disc brake (a brake whose rotary member to be braked is a disc rotor); however, the present invention may be modified as appropriate and applied to a drum brake (a brake whose rotary member to be braked is a brake drum).

The above-described embodiments employ the changeover valve 33, which, when de-energized, establishes communication between the first hydraulic chamber R1 and the second hydraulic chamber R2, and which, when energized, shuts off communication between the first hydraulic chamber R1 and the second hydraulic chamber R2 and establishes communication between the second hydraulic chamber R2 and the reservoir 35. However, the present invention may be embodied while employing a changeover valve that, when energized, establishes communication between the first hydraulic chamber R1 and the second hydraulic chamber R2, and that, when de-energized, shuts off communication between the first hydraulic chamber R1 and the second hydraulic chamber R2 and establishes communication between the second hydraulic chamber R2 and the reservoir 35.

In the above-described embodiments, the seal ring 37 for maintaining seal at the interface between the cylinder portion 17b and the second piston 25 is provided on the second piston 25. However, the seal ring 37 may be provided on the cylinder portion 17b. In the release device 31 employed in the above embodiments, the seal ring 31d for maintaining seal at the interface between the cylinder portion 17b and the operation shaft 31c is provided on the cylinder portion 17b. However, the seal ring 31d may be provided on the operation shaft 31c.

Figure 8:
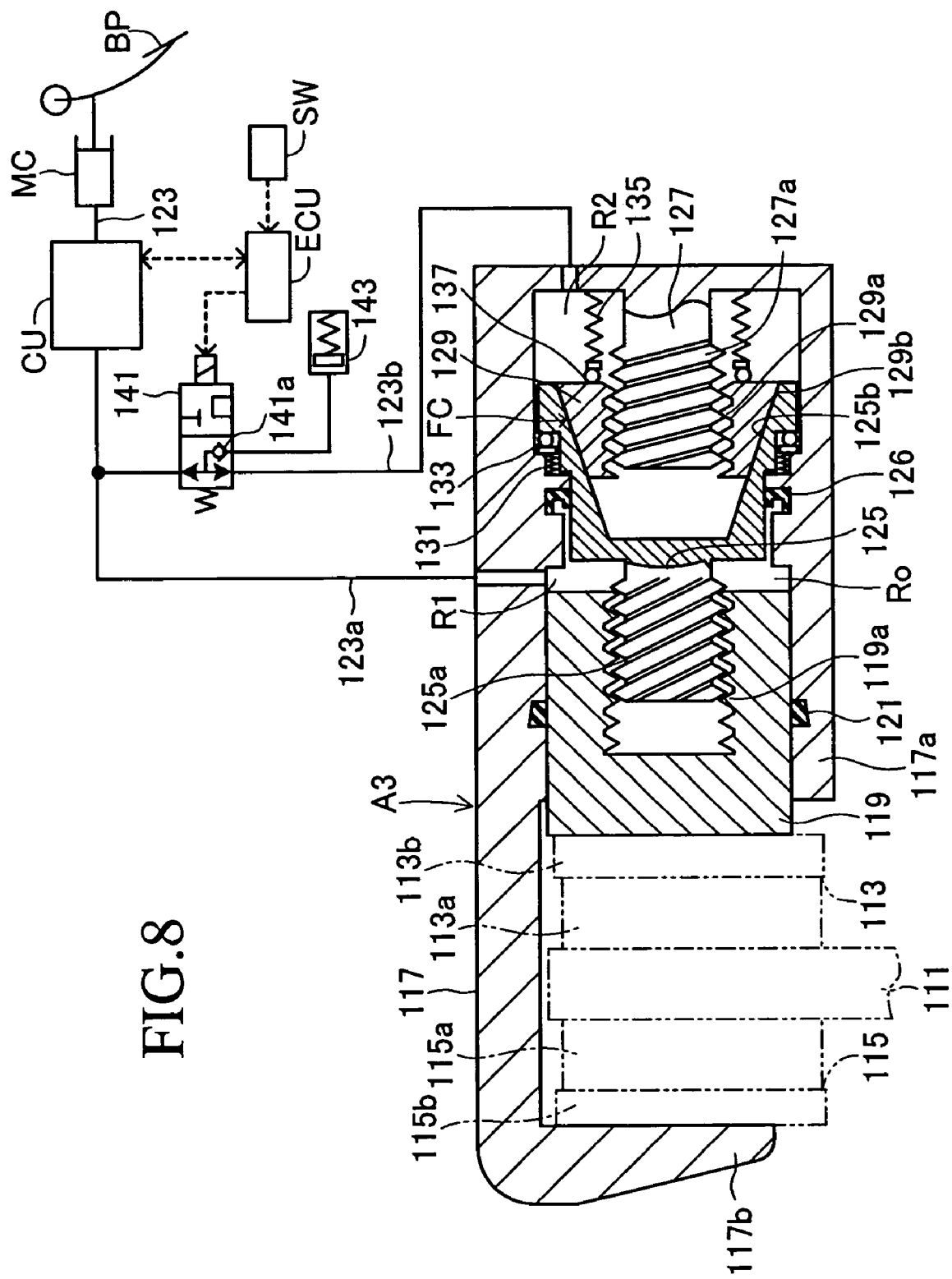
FIG. 8 is a schematic block diagram of a brake system including a third embodiment of a combined service and parking brake apparatus (in a brake-released condition) according to the present invention.

FIG. 8 schematically shows a third embodiment of the present invention. A combined service and parking brake apparatus A3 of the third embodiment is employed for each of rear left and rear right wheels (one of which is not illustrated) in a brake system of a 4-wheeled automobile. The brake system includes a master cylinder MC, which operates in accordance with operation of a brake pedal BP to be stepped on, and a brake fluid pressure control unit CU, which can perform skid control and traction control. The brake system employs an ordinary disc brake apparatus (not shown) for each of front left and front right wheels.

The combined service and parking brake apparatus A3 includes an inner pad 113 and an outer pad 115, which are adapted to clamp a disc rotor 111 (which rotates unitarily with an unillustrated wheel and serves as a rotary member to be braked) from opposite sides so as to effect a braking operation on the disc rotor 111; a movable caliper 117 for causing the both pads 113 and 115 to move under pressure toward the disc rotor 111; and a cup-like piston 119. The both pads 113 and 115 and the movable caliper 117 are attached to a mounting (not shown), which is attached to a vehicle body, in such a manner as to be slidable along the rotor axis.

The inner pad 113 includes a brake lining 113a and a backing plate 113b. The inner pad 113 can engage with and disengage from the disc rotor 111 via a brake lining 113a. The piston 119 fitted to a cylinder 117a of the movable caliper 117 causes the inner pad 113 to move under pressure toward the disc rotor 111. The outer pad 115 includes a brake lining 115a and a backing plate 115b and can engage with and disengage from the disc rotor 111 via the brake lining 115a. A reaction applicator portion 117b of the movable caliper 117 causes the outer pad 115 to move under pressure toward the disc rotor 111.

The piston 119 is fitted, via a piston seal 121, to the cylinder 117a of the movable caliper 117 in such a manner as to be nonrotatable about the cylinder axis and movable along the cylinder axis (substantially in parallel with the rotor axis), thereby forming a hydraulic chamber Ro filled with brake fluid within the cylinder 117a. The hydraulic chamber Ro is connected to a hydraulic line 123a that partially constitutes a hydraulic brake fluid line 123, and allows feed of brake fluid thereinto and drainage of brake fluid therefrom through the hydraulic line 123a. The piston seal 121 is designed to be deformed toward the disc rotor 111 at the time of application of brake fluid pressure when the piston 119 is moved under pressure toward the disc rotor 111. The piston seal 121 has a function of retracting the piston 119 (retractive function) by means of restoration from deformation at the time of release of brake fluid pressure.

In the third embodiment, a second piston 125, a threaded shaft 127, and a nut 129 are installed in the cylinder 117a of the movable caliper 117; and a first spring 131, a thrust bearing 133, a second spring 135, and a thrust bearing 137 are attached to the cylinder 117*a*. A changeover valve 141 is installed in a hydraulic branch line 123*b* branched from the hydraulic line 123*a*. A reservoir 143 is connected to the changeover valve 141.

In the hydraulic chamber Ro, the second piston 125 is attached, via a seal cup 126, to the cylinder 117*a* in such a manner as to be rotatable about the cylinder axis and movable along the cylinder axis between its home position and its non-home position, thereby dividing the hydraulic chamber Ro into a first hydraulic chamber R1 and a second hydraulic chamber R2. The first hydraulic chamber R1 is connected to the hydraulic line 123*a* and allows brake fluid to be fed thereinto and drained therefrom through the hydraulic line 123*a*. The second hydraulic chamber R2 is connected to the hydraulic branch line 123*b* and allows brake fluid to be fed thereinto and drained therefrom through the hydraulic branch line 123*b*.

The second piston 125 is urged along the cylinder axis from its home position toward its non-home position (rightward in FIG. 8) by the first spring 131 via the thrust bearing 133. As shown in FIG. 8, movement of the second piston 125 in the piston-projecting direction (leftward in FIG. 8) of the piston 119 is restricted to the home position where the thrust bearing 133 abuts a stepped portion of the cylinder 117*a*. The second piston 125 has an external-thread portion 125*a*, which is provided integrally therewith and meshed with an internal-thread portion 119*a* provided integrally with the piston 119.

The internal-thread portion 119*a* of the piston 119 is a first stationary screw element having a predetermined lead and extends along the cylinder axis while being exposed to the first hydraulic chamber R1. The external-thread portion 125*a* of the second piston 125 is a first movable screw element meshed with the internal-thread portion 119*a* of the piston 119 with a predetermined thread-to-thread clearance present therebetween along the cylinder axis and has a thread surface in opposition to a thread surface of the internal-thread portion 119*a* of the piston 119.

The threaded shaft 127 has an external-thread portion 127*a*, which serves as a second stationary screw element having a lead shorter than the lead of the first stationary screw element; is provided integrally with the cylinder 117*a* while being disposed coaxially with the internal-thread portion 119*a* of the piston 119; and extends along the cylinder axis while being exposed to the second hydraulic chamber R2.

The nut 129 has an internal-thread portion 129*a*, which serves as a second movable screw element and is urged along the cylinder axis against the first spring 131 by the second spring 135 having biasing force greater than that of the first spring 131. The nut 129 is provided within the second hydraulic chamber R2 in such a manner as to be rotatable about the cylinder axis and movable along the cylinder axis. The internal-thread portion 129*a* of the nut 129 is meshed with the external-thread portion 127*a* of the threaded shaft 127 with a predetermined thread-to-thread clearance present therebetween along the cylinder axis and has a thread surface in opposition to a thread surface of the external-thread portion 127*a*.

The nut 129 has a taper portion 129*b*, which is formed on its outer circumferential surface and whose diameter reduces toward the piston 125. The taper portion 129*b* can be engaged with and disengaged from a taper portion 125*b* formed on the second piston 125. The taper portion 129*b* of the nut 129, the taper portion 125*b* of the second piston 125, the both springs 131 and 135, and the like constitute a friction clutch FC.

The friction clutch FC allows engagement and disengagement between the second piston 125 and the nut 129. At the time of disengagement when the nut 129 moves away from the second piston 125 against the second spring 135, the friction clutch FC allows relative rotation between the second piston 125 and the nut 129. At the time of engagement when the nut 129 is urged by the second spring 135 to engage with the second piston 125, the friction clutch FC restricts relative rotation between the second piston 125 and the nut 129.

The changeover valve 141 is an electromagnetic 3-port 2-position changeover valve whose energization and de-energization are controlled by an electric control unit ECU. The changeover valve 141 is installed in the hydraulic branch line 123*b*, which allows feed and drainage of brake fluid therethrough to and from the second hydraulic chamber R2 and is branched from the hydraulic line 123*a* allowing feed and drainage of brake fluid therethrough to and from the first hydraulic chamber R1. The changeover valve 141 can establish and shut off communication between the first hydraulic chamber R1 and the second hydraulic chamber R2 and between the second hydraulic chamber R2 and the reservoir 143. When the changeover valve 141 is de-energized, the changeover valve 141 establishes communication between the first hydraulic chamber R1 and the second hydraulic chamber R2, and a check valve 141*a* incorporated in the changeover valve 141 prevents brake fluid flow to the reservoir 143. When the changeover valve 141 is energized, the changeover valve 141 shuts off communication between the first hydraulic chamber R1 and the second hydraulic chamber R2 and establishes communication between the second hydraulic chamber R2 and the reservoir 143 to thereby allow brake fluid flow from the second hydraulic chamber R2 to the reservoir 143.

The reservoir 143 is connected to the changeover valve 141. When communication between the first hydraulic chamber R1 and the second hydraulic chamber R2 is shut off by the changeover valve 141, the reservoir 143 can store brake fluid drained from the second hydraulic chamber R2. When the changeover valve 141 establishes communication between the first hydraulic chamber R1 and the second hydraulic chamber R2 in a condition where brake fluid is not fed from the brake fluid pressure control unit CU to the hydraulic branch line 123*b*, the reservoir 143 allows drainage of brake fluid stored therein toward the hydraulic branch line 123*b* through the check valve 141*a*.

During travel of the vehicle, the brake fluid pressure control unit CU can perform skid control and traction control while being controlled in a known manner by the electric control unit ECU. During halt of the vehicle, the brake fluid pressure control unit CU can control operation of the combined service and parking brake apparatus A3 while being controlled, together with the changeover valve 141, by the electric control unit ECU on the basis of operation of a parking brake switch SW. Since the configuration of the brake fluid pressure control unit CU is known, description thereof is omitted.

In a case where the parking brake switch SW is turned OFF so as to use the thus-configured combined service and parking brake apparatus A3 of the third embodiment as a service brake, the changeover valve 141 is de-energized, so that the first hydraulic chamber R1 and the second hydraulic chamber R2 always communicate with each other and have the same pressure, and the check valve 141*a* incorporated in the changeover valve 141 prevents brake fluid flow from the hydraulic branch circuit 123b to the reservoir 143.

In this condition (a service-brake-operating condition), fluid pressure difference between the first hydraulic chamber R1 and the second hydraulic chamber R2 is always zero, so that pressing force induced by fluid pressure difference does not act on the second piston 125. Accordingly, as shown in FIG. 8, the second spring 135 whose biasing force is greater than that of the first spring 131 causes the second piston 125 and the nut 129 to be held in their respective home positions, and the friction clutch FC is held engaged.

In this service-brake-operating condition, when the brake pedal BP is stepped on, the master cylinder MC feeds brake fluid under pressure to the hydraulic line 123a via the brake fluid pressure control unit CU; brake fluid is fed under pressure into the first hydraulic chamber R1 from the hydraulic line 123a; and brake fluid is fed under pressure into the second hydraulic chamber R2 from the hydraulic line 123a via the hydraulic branch line 123b and the changeover valve 141.

Figure 9:
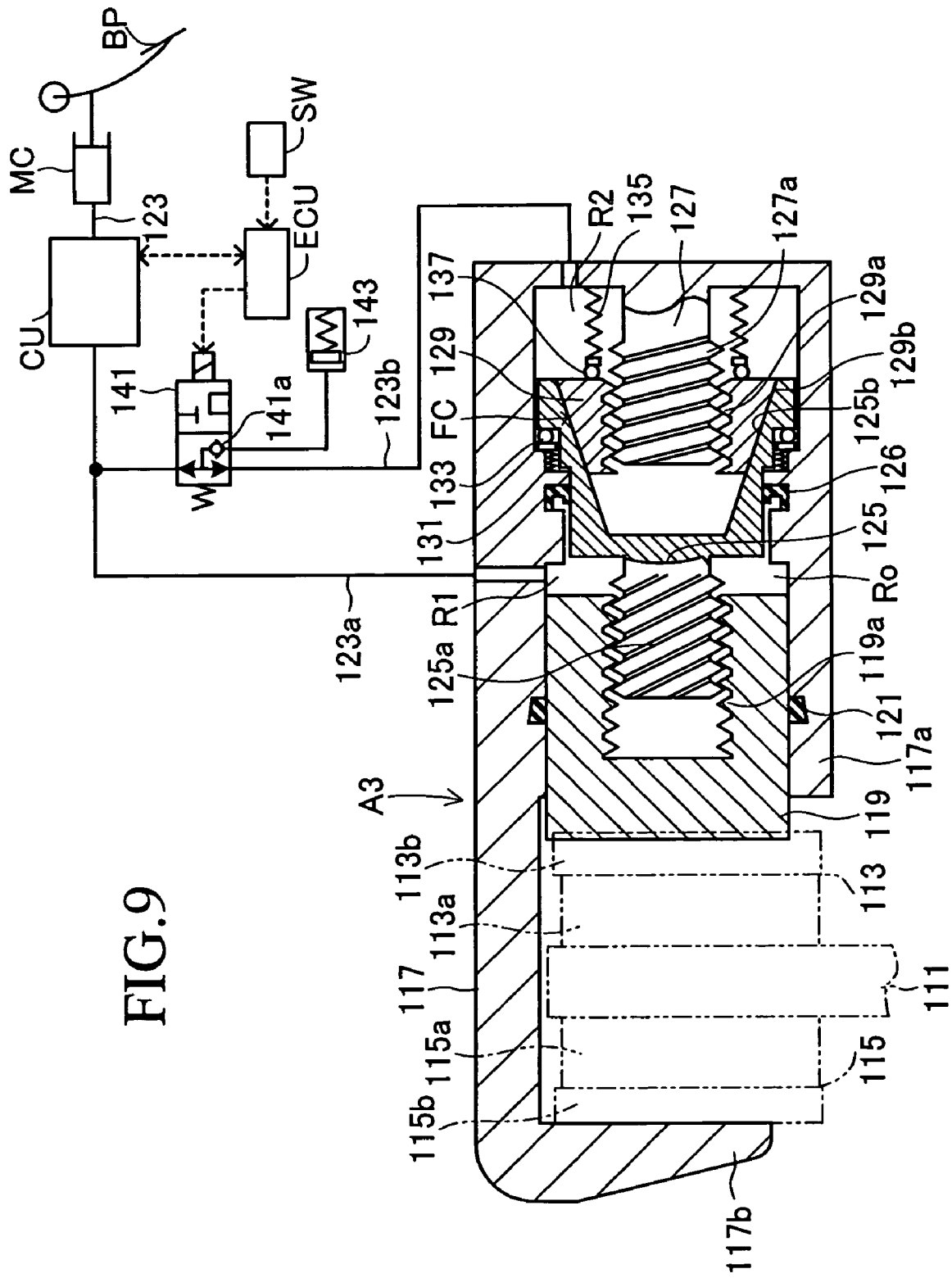
FIG. 9 is an explanatory view for explaining actions of the combined service and parking brake apparatus shown in FIG. 8 when the brake apparatus operates as a service brake.

At this time, therefore, as shown in FIG. 9, while the second piston 125 and the nut 129 stand still, the piston 119 can be advanced along the cylinder axis over a range of a thread-to-thread clearance between the internal-thread portion 119a of the piston 119 and the external-thread portion 125a of the second piston 125 by means of feed of brake fluid under pressure into the first hydraulic chamber R1 and the second hydraulic chamber R2. In other words, the brake apparatus A3 can be operated as a service brake.

At this time, brake fluid fed under pressure into the first hydraulic chamber R1 causes the piston 119 to move along the cylinder axis toward the disc rotor 111 while the piston 119 causes the piston seal 121 to be deformed toward the disc rotor 111, thereby pressing the inner pad 113 against the disc rotor 111. Associated reaction force causes the movable caliper 117 to move inboard, so that the reaction applicator portion 117b of the movable caliper 117 presses the outer pad 115 against the disc rotor 111. An unillustrated mounting, which supports the both pads 113 and 115, receives force generated as a result of the both pads 113 and 115 pressing the disc rotor 111, thereby generating braking force that prevents rotation of the disc rotor 111. In this brake-activated condition, the movable caliper 117 and other relevant component members are deflected in accordance with feed of brake fluid under pressure.

In release of brake fluid pressure effected by elimination of feed of brake fluid under pressure from the master cylinder MC into the first and second hydraulic chambers R1 and R2 as a result of release of the brake pedal BP, a retractive function effected by restoration of the piston seal 121 from the above-mentioned deformation and a retractive function effected by restoration of the movable caliper 117 and other relevant component members from deflection cause the piston 119 to move inboard and the movable caliper 117 to move outboard. Thus, the piston 119 returns to the brake-released condition of FIG. 8 from the brake-activated condition of FIG. 9, thereby releasing the both pads 113 and 115 from a condition of being pressed against the disc rotor 111. Thus is cancelled an action of braking rotation of the disc rotor 111 effected by the both pads 113 and 115.

Figure 10:
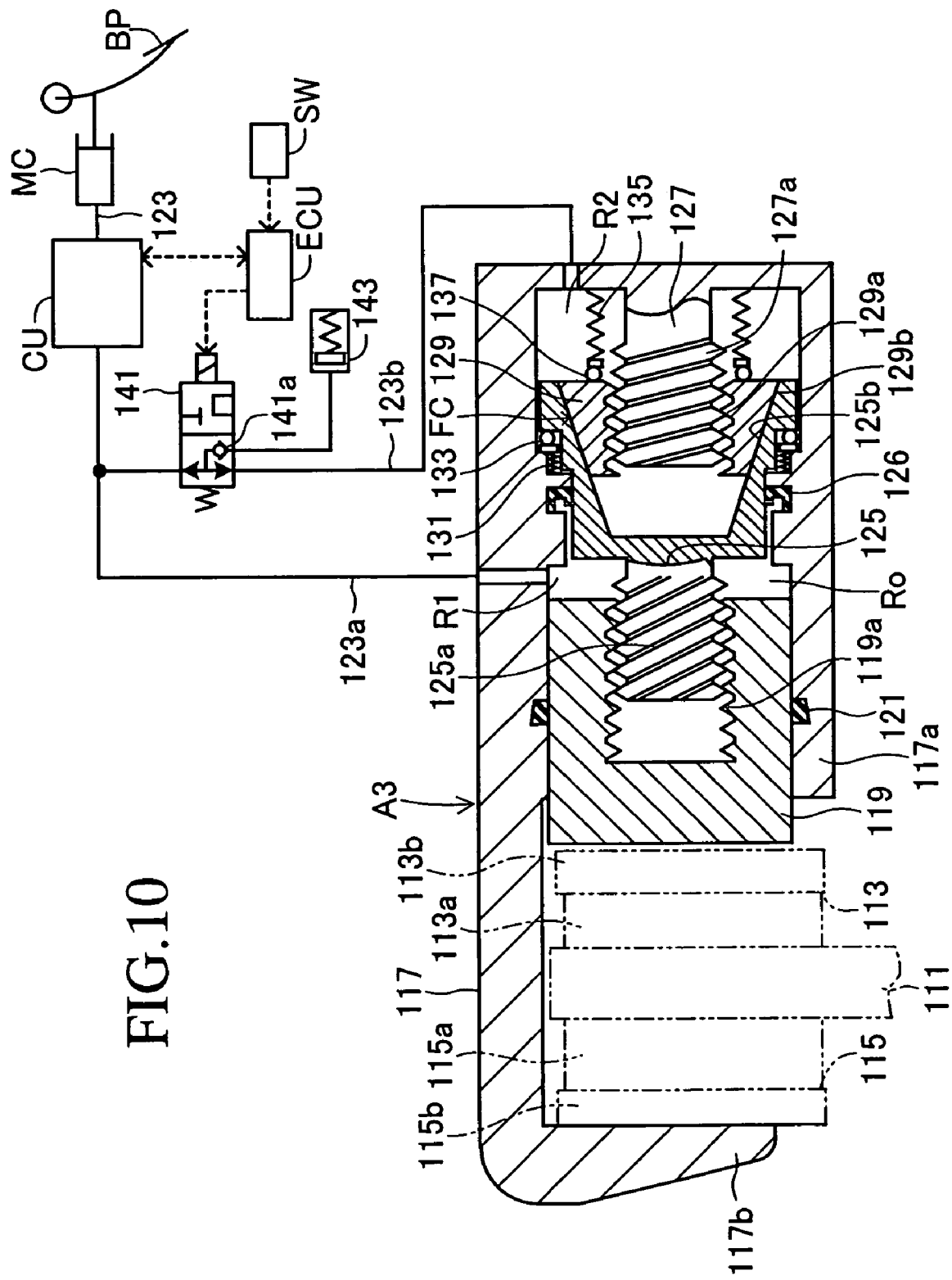
FIG. 10 is an explanatory view for explaining actions of the combined service and parking brake apparatus shown in FIG. 8 when lining is worn.
Figure 11:
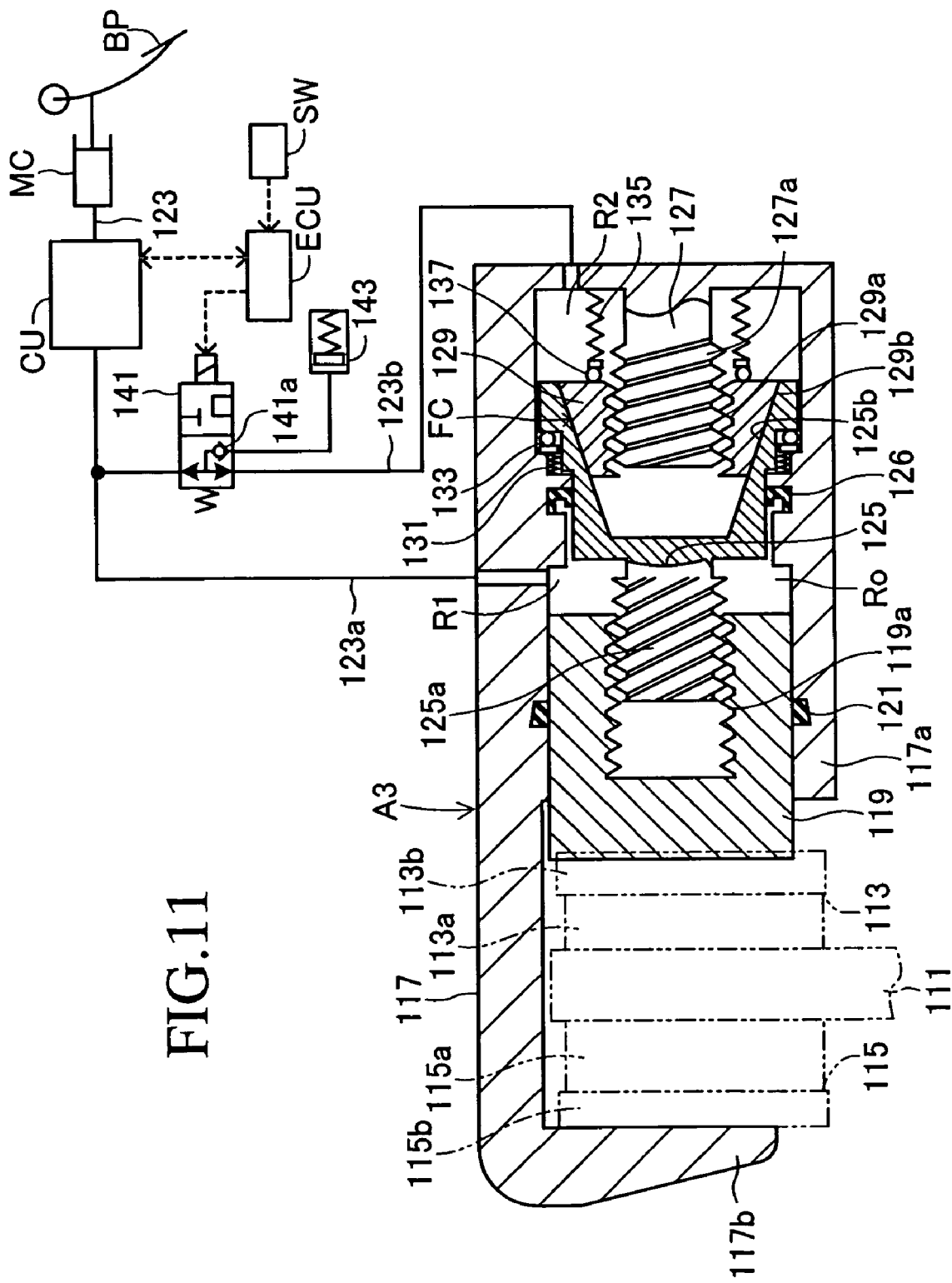
FIG. 11 is an explanatory view for explaining adjustment of the length of meshing engagement between an internal-thread portion of a piston and an external-thread portion of a second piston in the combined service and parking brake apparatus shown in FIG. 8.

In the above-mentioned service-brake-operating condition, when, for example, the piston 119 is to advance along the cylinder axis by a distance equal to or longer than the thread-to-thread clearance between the internal-thread portion 119a of the piston 119 and the external-thread portion 125a of the second piston 125 because of wear of the brake linings 113a and 115a, a condition shown in FIG. 11 is established through a condition shown in FIG. 10, and the second piston 125 rotates at its home position, which is accompanied by rotation of the nut 129.

In a condition where the second piston 125 rotates at its home position, rotation of the nut 129 is accompanied by the following: the nut 129 rotates on the external-thread portion 127a of the threaded shaft 127 and moves along the cylinder axis against the second spring 135 to thereby move away from the second piston 125. Accordingly, the friction clutch FC is disengaged. Subsequently, only the second piston 125 rotates at its home position, whereby the length of meshing engagement between the internal-thread portion 119a of the piston 119 and the external-thread portion 125a of the second piston 125 is automatically adjusted.

Figure 12:
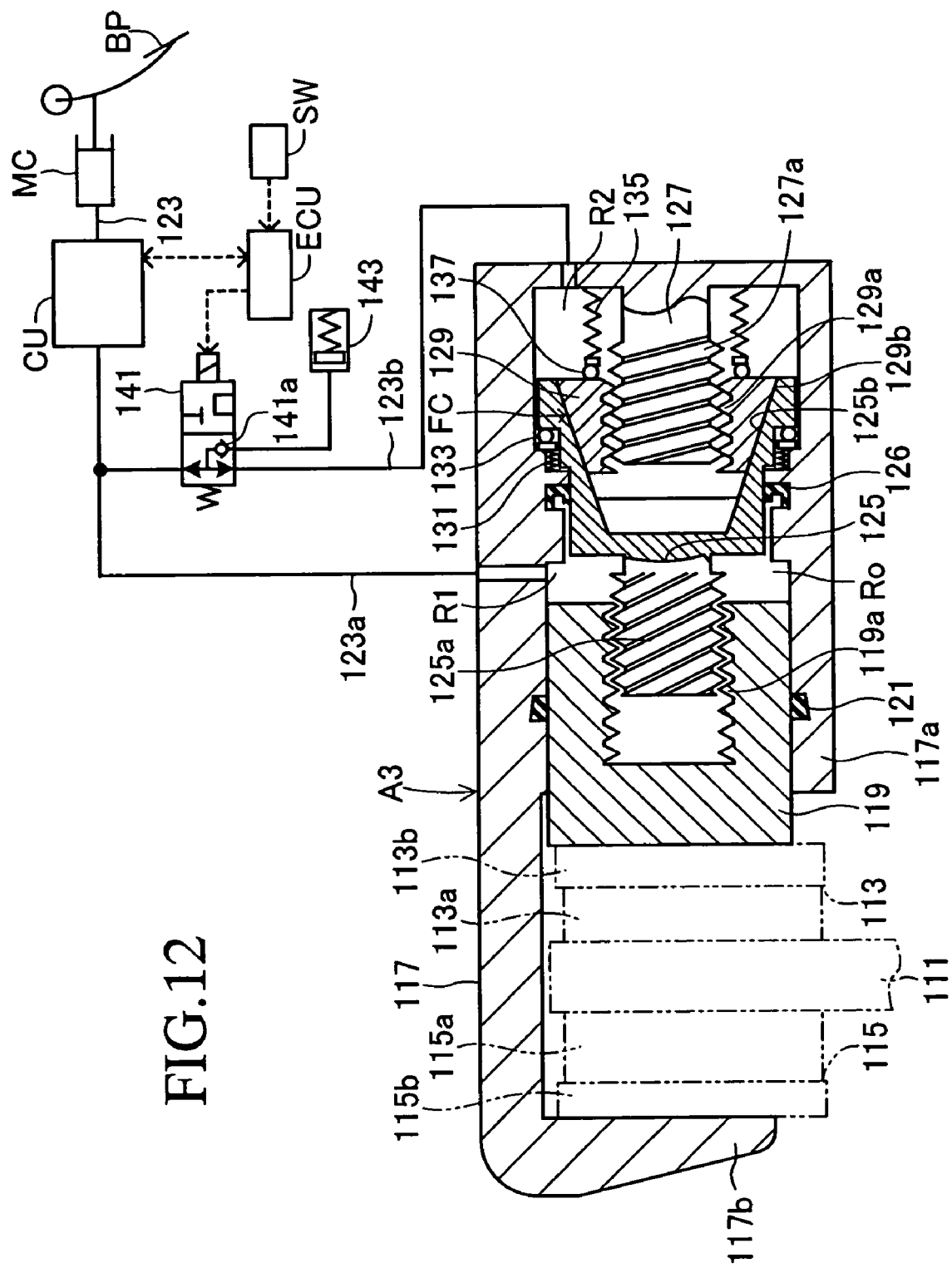
FIG. 12 is an explanatory view for explaining actions of the combined service and parking brake apparatus shown in FIG. 8 when the brake apparatus is brought into a brake-released condition after adjustment of the length of meshing engagement between the internal-thread portion of the piston and the external-thread portion of the second piston.

After the length of meshing engagement between the internal-thread portion 119a of the piston 119 and the external-thread portion 125a of the second piston 125 is adjusted, in association with release of brake fluid pressure from the first and second hydraulic chambers R1 and R2, the above-mentioned retractive functions cause the piston 119 to move inboard and the movable caliper 117 to move outboard. Thus, the brake-activated condition of FIG. 11 is restored to the brake-released condition of FIG. 12.

When the parking brake switch SW in the OFF condition is turned ON so as to use the combined service and parking brake apparatus A3 of the third embodiment as a parking brake, the parking brake operation is performed as follows: first, while the changeover valve 141 is brought into a de-energized condition by the electric control unit ECU, the electric control unit ECU causes the brake fluid pressure control unit CU to enter a pressure application control condition, whereby the brake fluid pressure control unit CU feeds a predetermined amount of brake fluid under pressure into the first and second hydraulic chambers R1 and R2 of the brake apparatus A3.

Thus is obtained an operation similar to that in the case where, in the above-described service-brake-operating condition, the brake pedal BP is stepped on. The brake apparatus A3 can be operated as a parking brake. Subsequently, in a condition where brake fluid can be fed under pressure into the first hydraulic chamber R1 of the brake apparatus A3 from the brake fluid pressure control unit CU, when the pressure of brake fluid fed to the brake apparatus A3 from the brake fluid pressure control unit CU reaches a predetermined value, as shown in FIG. 13, the electric control unit ECU causes the changeover valve 141 to be energized, thereby allowing brake fluid to flow into the reservoir 143 from the second hydraulic chamber R2.

Figure 13:
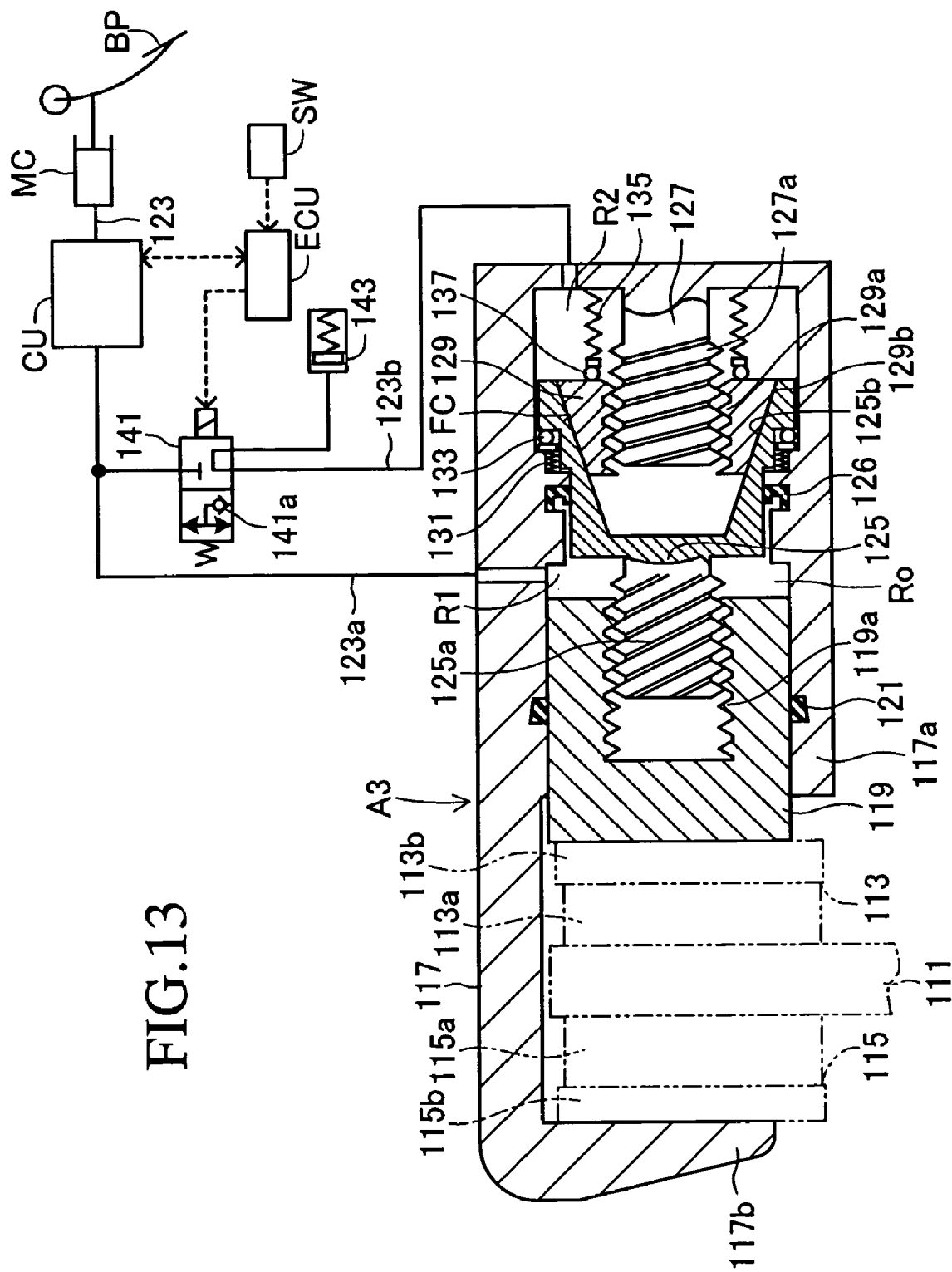
FIG. 13 is a first explanatory view for explaining actions of the combined service and parking brake apparatus shown in FIG. 8 when the brake apparatus operates as a parking brake.
Figure 15:
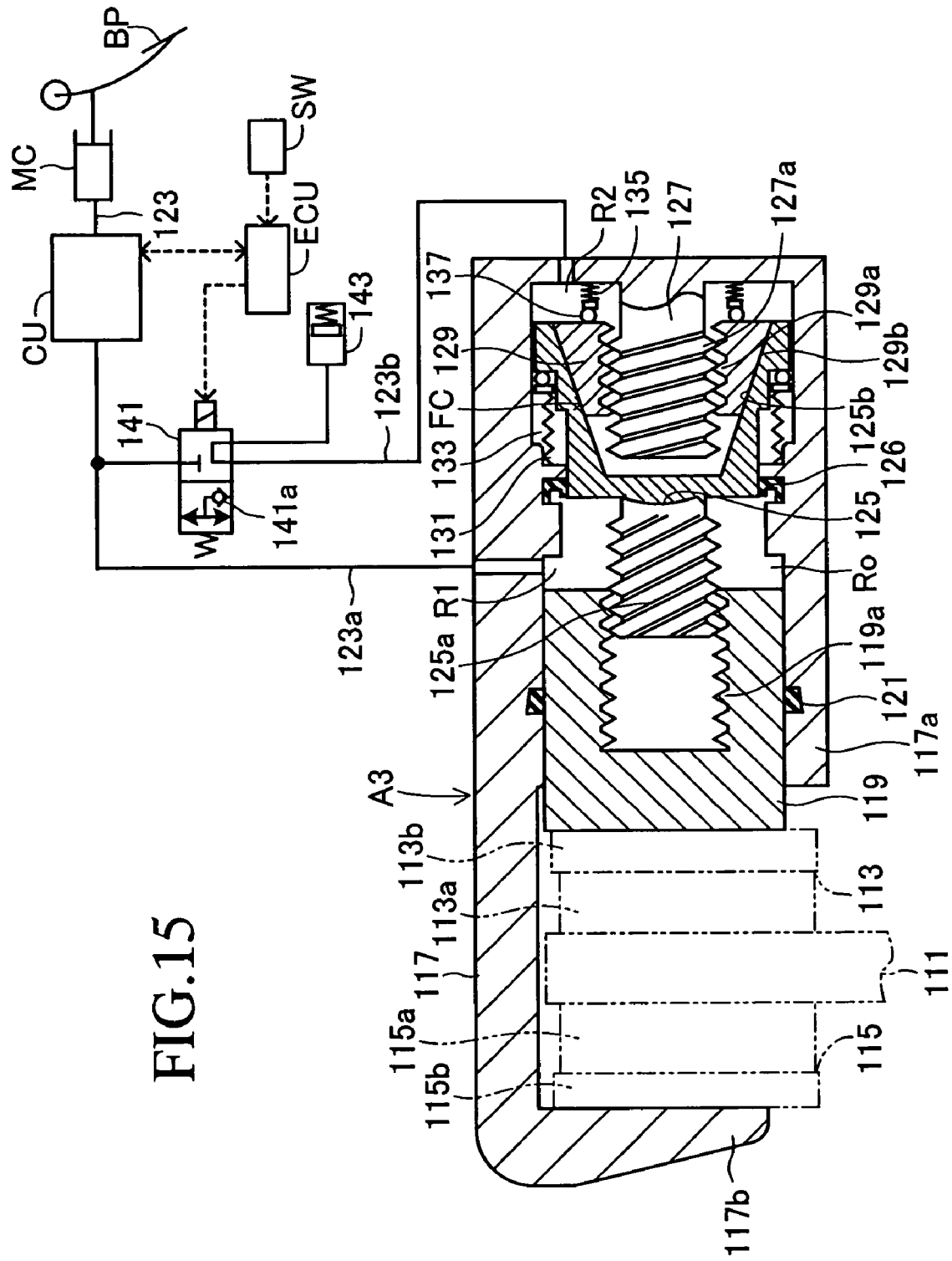
FIG. 15 is a third explanatory view for explaining actions of the combined service and parking brake apparatus shown in FIG. 8 when the brake apparatus operates as a parking brake.

In this condition, fluid pressure difference arises between the first hydraulic chamber R1 and the second hydraulic chamber R2, so that the second piston 125 moves against the second spring 135 along the cylinder axis from its home position shown in FIG. 13 toward its non-home position shown in FIG. 15. Since biasing force of the second spring 135 holds the friction clutch FC in an engaged condition, the engaged friction clutch FC restricts relative rotation between the second piston 125 and the nut 129, and the second piston 125 and the nut 129 move along the cylinder axis while rotating in a unitary condition.

Figure 14:
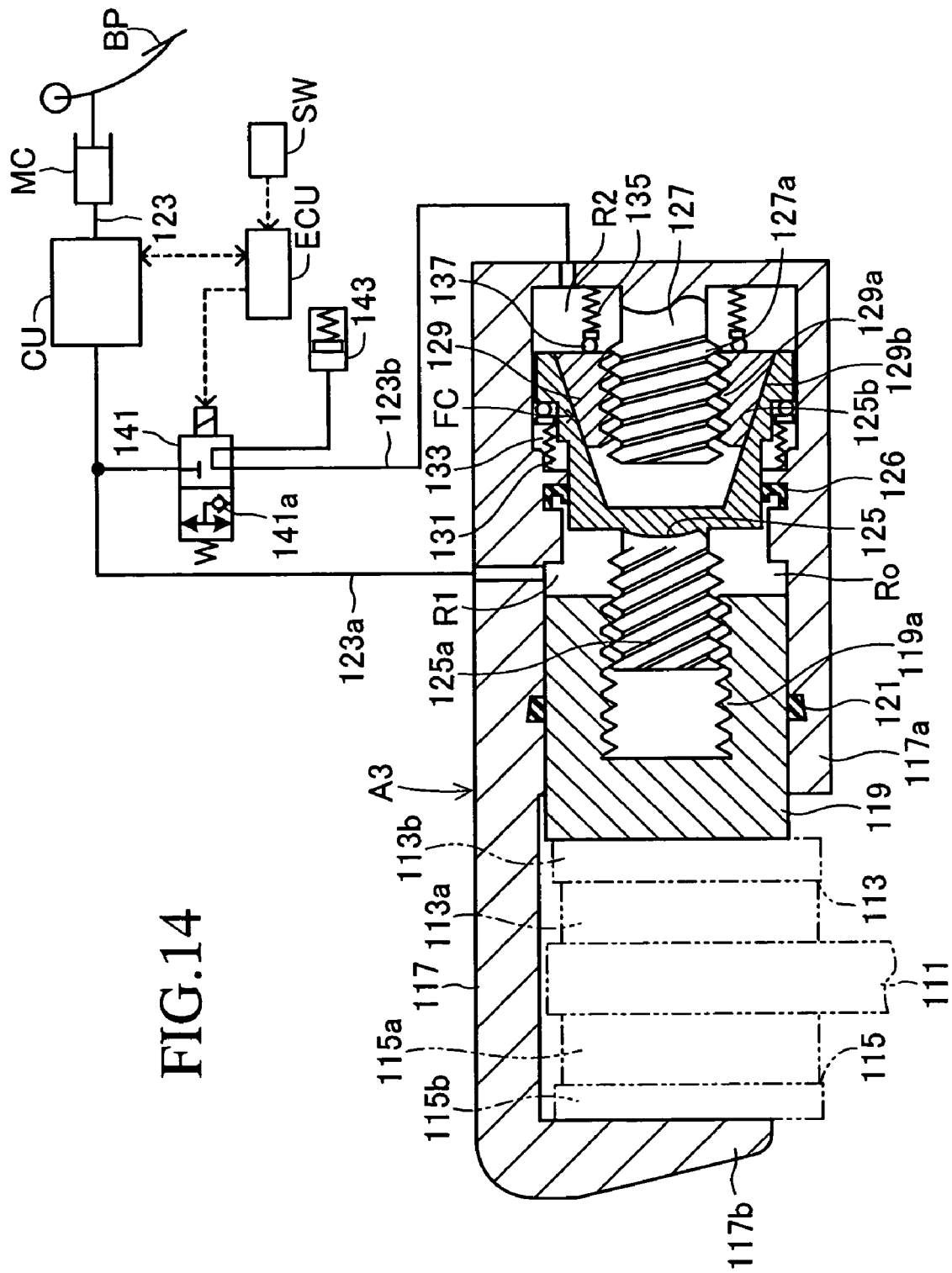
FIG. 14 is a second explanatory view for explaining actions of the combined service and parking brake apparatus shown in FIG. 8 when the brake apparatus operates as a parking brake.

Meanwhile, in the brake apparatus A3, a lead in a meshed portion between the external-thread portion 127a (second stationary screw element) of the threaded shaft 127 and the internal-thread portion 129a (second movable screw element) of the nut 129 is shorter than that in a meshed portion between the internal-thread portion 119a (first stationary screw element) of the piston 119 and the external-thread portion 125a (first movable screw element) of the second piston 125. Accordingly, as the second piston 125 and the nut 129 move along the cylinder axis while rotating in a unitary condition via the friction clutch FC, as shown in FIG. 14, the thread-to-thread clearance along the cylinder axis in the meshed portion between the external-thread portion 127a (second stationary screw element) of the threaded shaft 127 and the internal-thread portion 129a (second movable screw element) of the nut 129 disappears on a side toward the moving direction of the internal-thread portion 129a, so that the thread surface of the external-thread portion 127a (second stationary screw element) on a side opposite the moving direction and the thread surface of the internal-thread portion 129a (second movable screw element) on the side toward the moving direction contact each other. Subsequently, as shown in FIG. 15, the thread-to-thread clearance along the cylinder axis in the meshed portion between the internal-thread portion 119a (first stationary screw element) of the piston 119 and the external-thread portion 125a (first movable screw element) of the second piston 125 disappears on a side opposite the moving direction of the external-thread portion 125a, so that the thread surface of the internal-thread portion 119a (first stationary screw element) on the side toward the moving direction and the thread surface of the external-thread portion 125a (first movable screw element) on the side opposite the moving direction contact each other. As a result, unitary rotation of the second piston 125 and the nut 129 stops.

In this condition, as shown in FIG. 15, the second piston 125 and the nut 129 are united via the engaged friction clutch FC, so that a contact portion between the thread surface of the external-thread portion 127a (second stationary screw element) and the thread surface of the internal-thread portion 129a (second movable screw element) and a contact portion between the thread surface of the internal-thread portion 119a (first stationary screw element) and the thread surface of the external-thread portion 125a (first movable screw element) push out against each other. Accordingly, in this condition, even when fluid pressure in the first hydraulic chamber R1 drops as a result of the electric control unit ECU causing the brake fluid pressure control unit CU to change its condition from a pressure application control condition to a pressure release control condition, and consequently reaction force that the brake lining 113a imposes on the piston 119 is directed to pressing the piston 119 backward, the condition where the above-mentioned both contact portions push out against each other (a condition where thread surfaces are in press contact with each other in each of the contact portions) remains unchanged.

Therefore, by means of setting structural design parameters in such a manner that reaction force that the brake lining 113a imposes on the piston 119 does not cause slippage in the friction clutch FC and in the above-mentioned both contact portions, at the time of release of brake fluid pressure associated with operation of the brake apparatus A3 as a parking brake, the piston 119 is not pressed backward along the cylinder axis and is maintained in a mechanically locked condition. Accordingly, the brake apparatus A3 can avoid a drop in parking brake force in release of brake fluid pressure.

Meanwhile, when the electric control unit ECU causes the brake fluid pressure control unit CU to change its condition from the pressure application control condition to the pressure release control condition, the changeover valve 141 has been held in a de-energized condition by the electric control unit ECU. Thus, brake fluid that has flown into the reservoir 143 from the second hydraulic chamber R2 through the preceding operations (the operations shown in FIGS. 13 to 15) is drained toward the hydraulic branch line 123b through the check valve 141a.

When the parking brake switch SW in the ON condition is turned OFF so as to release the combined service and parking brake apparatus A3 of the third embodiment from use as a parking brake, the parking brake is released as described below. First, in a condition where the changeover valve 141 has been held in a de-energized condition by the electric control unit ECU, the electric control unit ECU brings the brake fluid pressure control unit CU into the pressure application control condition, so that the brake fluid pressure control unit CU feeds brake fluid under pressure into the first and second hydraulic chambers R1 and R2 of the brake apparatus A3.

When piston-projecting force induced by fluid pressure becomes greater than the above-mentioned reaction force that the brake lining 113a imposes on the piston 119, press contact between the thread surface of the internal-thread portion 119a (first stationary screw element) and the thread surface of the external-thread portion 125a (first movable screw element) is canceled, thereby canceling the condition where the contact portion between the thread surface of the external-thread portion 127a (second stationary screw element) and the thread surface of the internal-thread portion 129a (second movable screw element) and the contact portion between the thread surface of the internal-thread portion 119a (first stationary screw element) and the thread surface of the external-thread portion 125a (first movable screw element) push out against each other.

Figure 16:
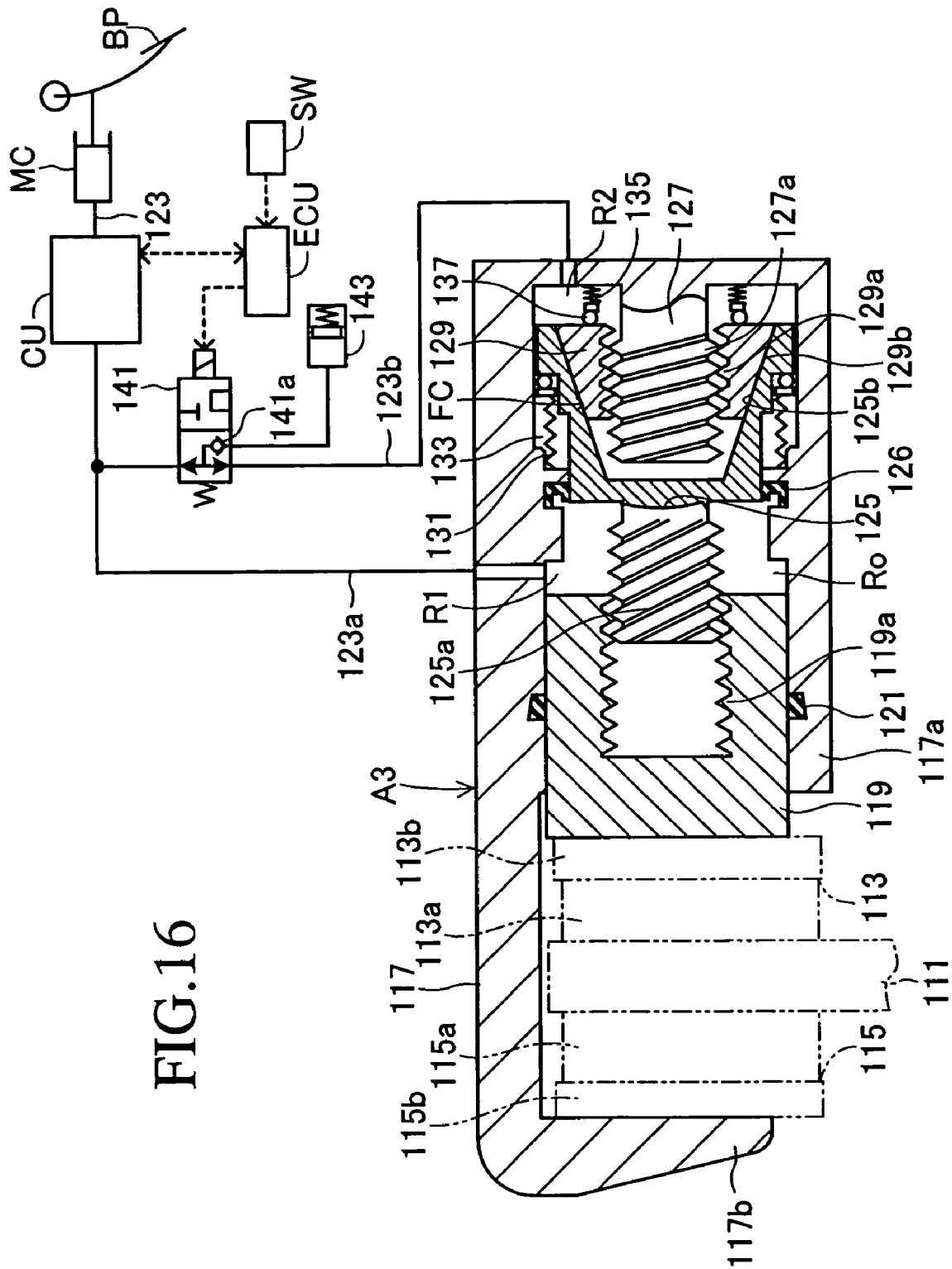
FIG. 16 is a first explanatory view for explaining actions of the combined service and parking brake apparatus shown in FIG. 8 when the brake apparatus is released from use as a parking brake.
Figure 17:
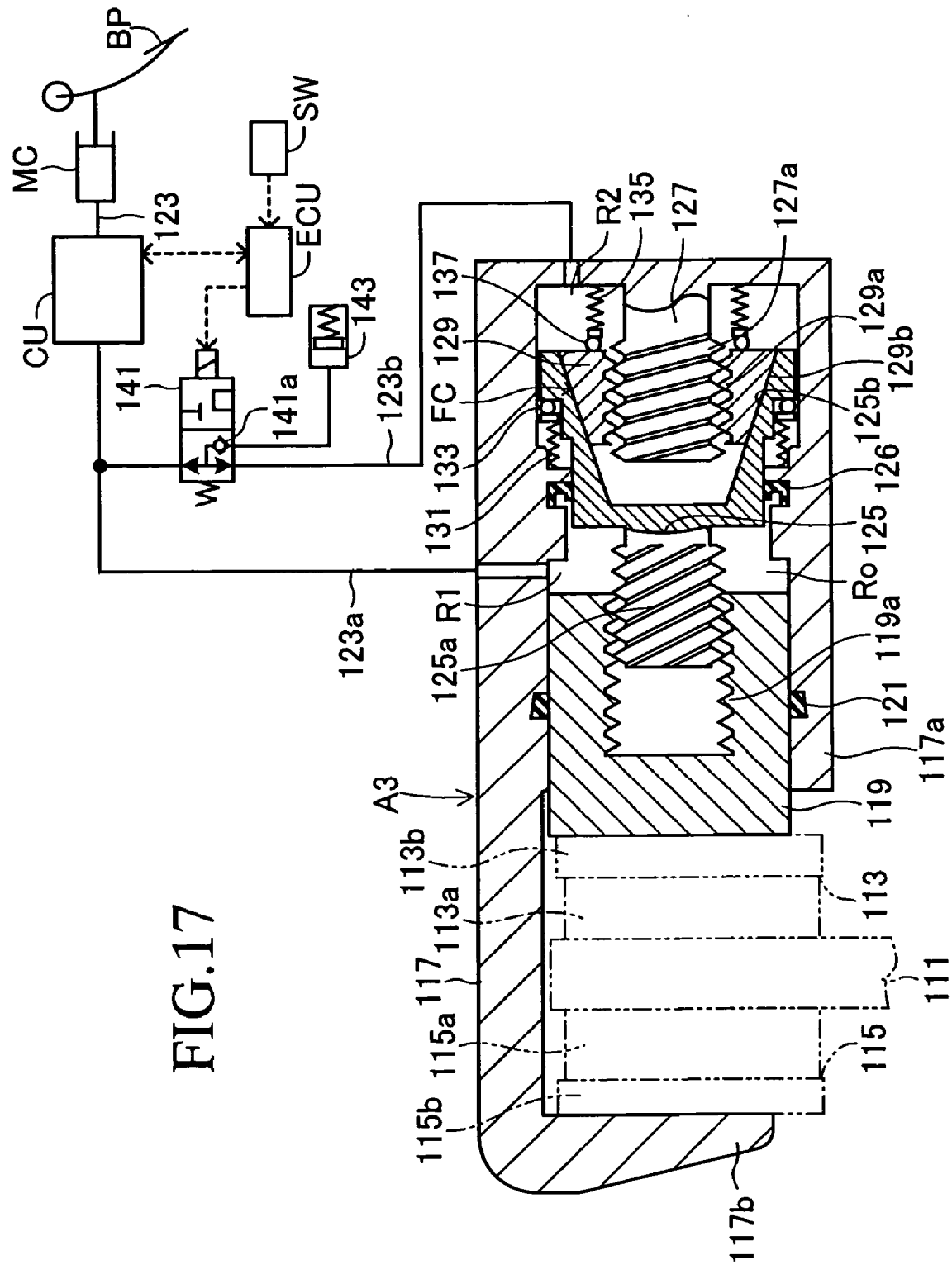
FIG. 17 is a second explanatory view for explaining actions of the combined service and parking brake apparatus shown in FIG. 8 when the brake apparatus is released from use as a parking brake.
Figure 18:
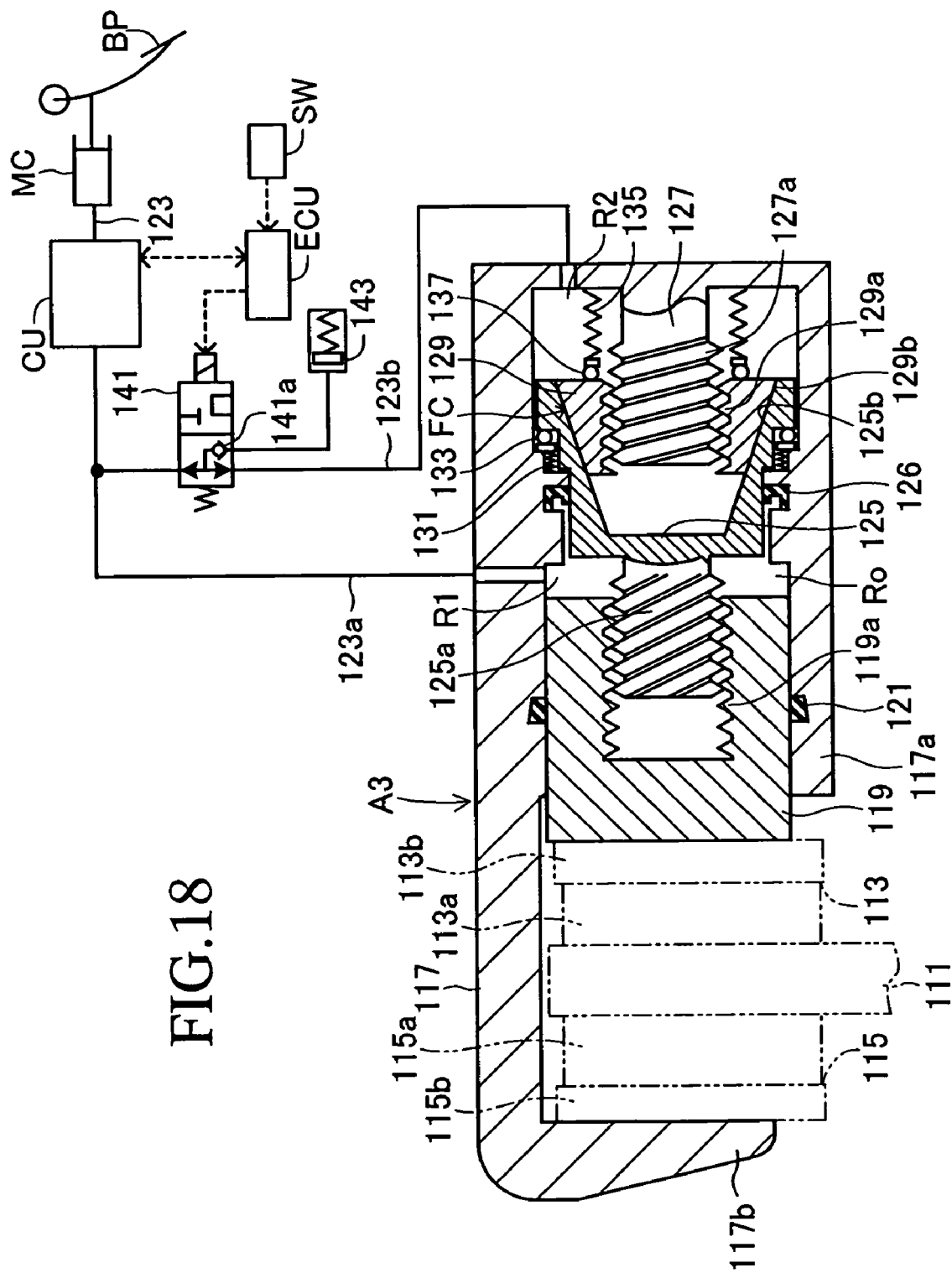
FIG. 18 is a third explanatory view for explaining actions of the combined service and parking brake apparatus shown in FIG. 8 when the brake apparatus is released from use as a parking brake.

In this condition, as shown in FIGS. 16 to 18, biasing force of the second spring 135 causes the second piston 125 and the nut 129 to move along the cylinder axis toward their respective home positions while rotating in a unitary condition via the friction clutch FC. As a result, there is re-established the same condition as that (FIG. 13) in the initial stage of the above-described parking brake operation in which pressure application is initiated. In the initial stage of movement of the second piston 125 and the nut 129 from their respective non-home positions toward their respective home positions, the second piston 125 and the nut 129 move while rotating, in accordance with the lead of the internal-thread portion 119a (first stationary screw element) and the lead of the external-thread portion 125a (first movable screw element). In the middle and latter stages of the movement, the second piston 125 and the nut 129 move while rotating, in accordance with the lead of the external-thread portion 127a (second stationary screw element) and the lead of the internal-thread portion 129a (second movable screw element).

After the second piston 125 and the nut 129 return to their respective home positions by virtue of biasing force of the second spring 135, the electric control unit ECU causes the brake fluid pressure control unit CU to change its condition from the pressure application control condition to the pressure release control condition, thereby allowing drainage of brake fluid from the first and second hydraulic chambers R1 and R2. Accordingly, by virtue of the above-mentioned retractive functions, the piston 119 and the movable caliper 117 return to the brake-released condition shown in FIG. 8 or 12, thereby releasing the parking brake.

In the combined service and parking brake apparatus A3 of the third embodiment, fluid pressure difference that arises between the first hydraulic chamber R1 and the second hydraulic chamber R2 causes the second piston 125 and the nut 129 to move against the second spring 135 along the cylinder axis from their respective home positions shown in FIG. 13 to their respective non-home positions shown in FIG. 15, so that no electrical device is accommodated in the hydraulic chamber Ro of the cylinder 117a of the movable caliper 117. Thus, the brake apparatus A3 is free from any anxiety about the electrical device with respect to fluid resistance, seal integrity, heat resistance, and the like, thereby providing high reliability.

In the combined service and parking brake apparatus A3 of the third embodiment, the reservoir 143 is connected to the changeover valve 141, and the reservoir 143 can store brake fluid drained from the second hydraulic chamber R2 when communication between the first hydraulic chamber R1 and the second hydraulic chamber R2 is shut off. Thus, in a condition where communication between the first hydraulic chamber R1 and the second hydraulic chamber R2 is shut off by the changeover valve 141, when brake fluid is fed under pressure into the first hydraulic chamber R1, fluid pressure difference between the first hydraulic chamber R1 and the second hydraulic chamber R2 that acts on the second piston 125 can be increased, so that operational response of the second piston 125 can be enhanced. Thus, operational response of the parking brake can be enhanced.

In the above-described third embodiment, the internal-thread portion 119a of the piston 119 serves as the first stationary screw element; the external-thread portion 125a of the second piston 125 serves as the first movable screw element; the external-thread portion 127a of the threaded shaft 127 serves as the second stationary screw element; and the internal-thread portion 129a of the nut 129 serves as the second movable screw element. However, the external-thread portions and the internal-thread portions can be reversed. In the third embodiment, the diameter of the first stationary screw element and the first movable screw element is substantially equal to that of the second stationary screw element and the second movable screw element. However, their diameters may differ from each other.

The above-described third embodiment includes the reservoir 143; however, the present invention may be embodied without use of the component. In an embodiment that does not use the reservoir 143, a function similar to that of the reservoir 143 is effected by means of, for example, expansion of the hydraulic branch line 123b, and the changeover valve 141 assumes the form of an electromagnetic 2-port 2-position on-off valve. The above-described third embodiment is described while mentioning application of the present invention to a disc brake (a brake whose rotary member to be braked is a disc rotor); however, the present invention may be modified as appropriate and applied to a drum brake (a brake whose rotary member to be braked is a brake drum).

The above-described third embodiment employs a single changeover valve 141, which is an electromagnetic 3-port 2-position changeover valve. The changeover valve 141, when de-energized, establishes communication between the first hydraulic chamber R1 and the second hydraulic chamber R2, and the changeover valve 141, when energized, shuts off communication between the first hydraulic chamber R1 and the second hydraulic chamber R2 and allows flow of brake fluid from the second hydraulic chamber R2 to the reservoir 143. However, the present invention may be embodied while employing a changeover valve that, when energized, establishes communication between the first hydraulic chamber R1 and the second hydraulic chamber R2, and that, when de-energized, shuts off communication between the first hydraulic chamber R1 and the second hydraulic chamber R2 and allows flow of brake fluid from the second hydraulic chamber R2 to the reservoir 143. In these cases, for example, two electromagnetic 2-port 2-position changeover valves may be employed.

In the above-described third embodiment, fluid pressure difference that arises from operation of the changeover valve 141 between the first hydraulic chamber R1 and the second hydraulic chamber R2 causes the second piston 125 to move against the second spring 135 along the cylinder axis from its home position to its non-home position. However, the present invention may be embodied such that magnetic force generated from an electromagnetic actuator attached to a cylinder (117a) is used to move a second piston (125) against a second spring (135) along the cylinder axis from its home position to its non-home position.

In the above-described third embodiment, when the brake apparatus A3 is used as a parking brake, the brake fluid pressure control unit CU feeds brake fluid under pressure into the first and second hydraulic chambers R1 and R2. However, the present invention may be embodied such that when the brake apparatus A3 is used as a parking brake, the master cylinder MC feeds brake fluid under pressure into the first and second hydraulic chambers R1 and R2.

Figure 19:
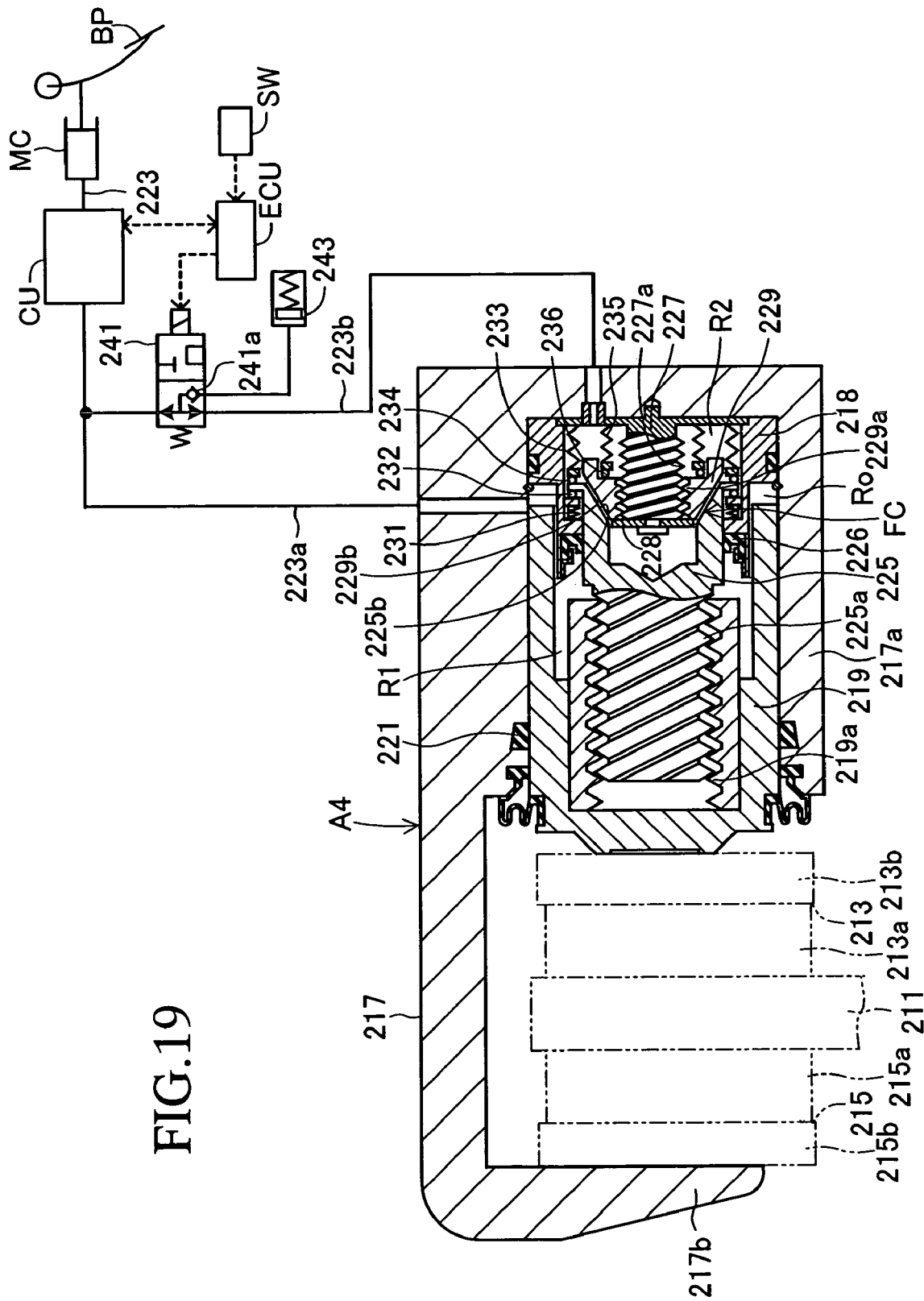
FIG. 19 is a schematic block diagram of a brake system including a fourth embodiment of a combined service and parking brake apparatus (in a brake-released condition) according to the present invention.

FIG. 19 schematically shows a fourth embodiment of the present invention. A combined service and parking brake apparatus A4 of the fourth embodiment is employed for each of rear left and rear right wheels (one of which is not illustrated) in a brake system of a 4-wheeled automobile. The brake system includes a master cylinder MC, which operates in accordance with operation of a brake pedal BP to be stepped on, and a brake fluid pressure control unit CU, which can perform skid control and traction control. The brake system employs an ordinary disc brake apparatus (not shown) for each of front left and front right wheels.

The combined service and parking brake apparatus A4 includes an inner pad 213 and an outer pad 215, which are adapted to clamp a disc rotor 211 (which rotates unitarily with an unillustrated wheel and serves as a rotary member to be braked) from opposite sides so as to effect a braking operation on the disc rotor 211; a movable caliper 217 for causing the both pads 21.3 and 215 to move under pressure toward the disc rotor 211; and a cup-like piston 219. The both pads 213 and 215 and the movable caliper 217 are attached to a mounting (not shown), which is attached to a vehicle body, in such a manner as to be slidable along the rotor axis.

The inner pad 213 includes a brake lining 213a and a backing plate 213b. The inner pad 213 can engage with and disengage from the disc rotor 211 via a brake lining 213a. The piston 219 fitted to a cylinder 217a of the movable caliper 217 causes the inner pad 213 to move under pressure toward the disc rotor 211. The outer pad 215 includes a brake lining 215a and a backing plate 215b and can engage with and disengage from the disc rotor 211 via the brake lining 215a. A reaction applicator portion 217b of the movable caliper 217 causes the outer pad 215 to move under pressure toward the disc rotor 211.

The piston 219 is fitted, via a piston seal 221, to the cylinder 217a of the movable caliper 217 in such a manner as to be nonrotatable about the cylinder axis and movable along the cylinder axis (substantially in parallel with the rotor axis), thereby forming a hydraulic chamber Ro filled with brake fluid within the cylinder 217a. The hydraulic chamber Ro is connected to a hydraulic line 223a that partially constitutes a hydraulic brake fluid line 223, and allows feed of brake fluid thereinto and drainage of brake fluid therefrom through the hydraulic line 223a. The piston seal 221 is designed to be deformed toward the disc rotor 211 at the time of application of brake fluid pressure when the piston 219 is moved under pressure toward the disc rotor 211. The piston seal 221 has a function of retracting the piston 219 (retractive function) by means of restoration from deformation at the time of release of brake fluid pressure.

In the fourth embodiment, a second piston 225, a threaded shaft 227, and a nut 229 are installed in the cylinder 217a of the movable caliper 217; and a first spring 231, a thrust bearing 232, a second spring 233, and a thrust bearing 234 are attached to the cylinder 217a. A changeover valve 241 is installed in a hydraulic branch line 223b branched from the hydraulic line 223a. A reservoir 243 is connected to the changeover valve 241.

In the hydraulic chamber Ro, the second piston 225 is attached, via a seal cup 226, to the cylinder 217a in such a manner as to be rotatable about the cylinder axis and movable along the cylinder axis between its home position and its non-home position, thereby dividing the hydraulic chamber Ro into a first hydraulic chamber R1 and a second hydraulic chamber R2. The first hydraulic chamber R1 is connected to the hydraulic line 223a and allows brake fluid to be fed thereinto and drained therefrom through the hydraulic line 223a. The second hydraulic chamber R2 is connected to the hydraulic branch line 223b and allows brake fluid to be fed thereinto and drained therefrom through the hydraulic branch line 223b.

The second piston 225 is urged along the cylinder axis from its home position toward its non-home position (rightward in FIG. 19) by the first spring 231 via the thrust bearing 232. As shown in FIG. 19, movement of the second piston 225 in the piston-projecting direction (leftward in FIG. 19) of the piston 219 is restricted to the home position where a retainer portion having an L-shaped cross section of the thrust bearing 232 abuts an annular stepped portion of a holder 218 attached fixedly and in a fluid-tight condition to the interior of the cylinder 217a. The second piston 225 has an external-thread portion 225a, which is provided integrally therewith and meshed with an internal-thread portion 219a, which is a separate member and provided integrally with the piston 219.

The internal-thread portion 219a provided in the piston 219 is a first stationary screw element having a predetermined lead and extends along the cylinder axis while being exposed to the first hydraulic chamber R1. The external-thread portion 225a of the second piston 225 is a first movable screw element meshed with the internal-thread portion 219a provided in the piston 219 with a predetermined thread-to-thread clearance present therebetween along the cylinder axis and has a thread surface in opposition to a thread surface of the internal-thread portion 219a provided in the piston 219.

The threaded shaft 227 has an external-thread portion 227a, which serves as a second stationary screw element having a lead shorter than the lead of the first stationary screw element; is provided integrally with the cylinder 217a via the holder 218 while being disposed coaxially with the internal-thread portion 219a provided in the piston 219; and extends along the cylinder axis while being exposed to the second hydraulic chamber R2.

The nut 229 is provided within the second hydraulic chamber R2 in such a manner as to be rotatable about the cylinder axis and movable along the cylinder axis. The nut 229 is urged along the cylinder axis toward its home position via a thrust bearing 236 by a third spring 235 having biasing force greater than that of the first spring 231. As shown in FIG. 19, movement of the nut 229 in the piston-projecting direction (leftward in FIG. 19) of the piston 219 is restricted to its home position where the nut 229 abuts a stopper 228 fixedly attached to an end of the threaded shaft 227.

The nut 229 has an internal-thread portion 229a, which serves as a second movable screw element. The internal-thread portion 229a of the nut 229 is meshed with the external-thread portion 227a of the threaded shaft 227 with a predetermined thread-to-thread clearance present therebetween along the cylinder axis and has a thread surface in opposition to a thread surface of the external-thread portion 227a. The nut 229 has a taper portion 229b, which is formed on its outer circumferential surface and whose diameter reduces toward the piston 225. The taper portion 229b can be engaged with and disengaged from a taper portion 225b formed on the second piston 225. The taper portion 229b of the nut 229, the taper portion 225b of the second piston 225, the springs 231, 233, and 235, and the like constitute a friction clutch FC.

The friction clutch FC allows engagement and disengagement between the second piston 225 and the nut 229. At the time of disengagement when the second piston 225 and the nut 229 are disengaged from each other while being held at their respective home positions, the friction clutch FC allows relative rotation between the second piston 225 and the nut 229. At the time of engagement when the second piston 225 moves by a predetermined distance from its home position toward its non-home position and engages with the nut 229, the friction clutch FC restricts relative rotation between the second piston 225 and the nut 229.

The changeover valve 241 is an electromagnetic 3-port 2-position changeover valve whose energization and de-energization are controlled by an electric control unit ECU. The changeover valve 241 is installed in the hydraulic branch line 223b, which allows feed and drainage of brake fluid therethrough to and from the second hydraulic chamber R2 and is branched from the hydraulic line 223a allowing feed and drainage of brake fluid therethrough to and from the first hydraulic chamber R1. The changeover valve 241 can establish and shut off communication between the first hydraulic chamber R1 and the second hydraulic chamber R2 and between the second hydraulic chamber R2 and the reservoir 243. When the changeover valve 241 is de-energized, the changeover valve 241 establishes communication between the first hydraulic chamber R1 and the second hydraulic chamber R2, and a check valve 241a incorporated in the changeover valve 241 prevents brake fluid flow to the reservoir 243. When the changeover valve 241 is energized, the changeover valve 241 shuts off communication between the first hydraulic chamber R1 and the second hydraulic chamber R2 and establishes communication between the second hydraulic chamber R2 and the reservoir 243 to thereby allow brake fluid flow from the second hydraulic chamber R2 to the reservoir 243.

The reservoir 243 is connected to the changeover valve 241. When communication between the first hydraulic chamber R1 and the second hydraulic chamber R2 is shut off by the changeover valve 241, the reservoir 243 can store brake fluid drained from the second hydraulic chamber R2. When the changeover valve 241 establishes communication between the first hydraulic chamber R1 and the second hydraulic chamber R2 in a condition where brake fluid is not fed from the brake fluid pressure control unit CU to the hydraulic branch line 223b, the reservoir 243 allows drainage of brake fluid stored therein toward the hydraulic branch line 223b through the check valve 241a.

During travel of the vehicle, the brake fluid pressure control unit CU can perform skid control and traction control while being controlled in a known manner by the electric control unit ECU. During halt of the vehicle, the brake fluid pressure control unit CU can control operation of the combined service and parking brake apparatus A4 while being controlled, together with the changeover valve 241, by the electric control unit ECU on the basis of operation of a parking brake switch SW. Since the configuration of the brake fluid pressure control unit CU is known, description thereof is omitted.

In a case where the parking brake switch SW is turned OFF so as to use the thus-configured combined service and parking brake apparatus A4 of the fourth embodiment as a service brake, the changeover valve 241 is de-energized, so that the first hydraulic chamber R1 and the second hydraulic chamber R2 always communicate with each other and have the same pressure, and the check valve 241a incorporated in the changeover valve 241 prevents brake fluid flow from the hydraulic branch circuit 223b to the reservoir 243.

In this condition (a service-brake-operating condition), fluid pressure difference between the first hydraulic chamber R1 and the second hydraulic chamber R2 is always zero, so that pressing force induced by fluid pressure difference does not act on the second piston 225. Accordingly, as shown in FIG. 19, a combined action of the springs 233 and 235 causes the second piston 225 and the nut 229 to be held in their respective home positions, and the friction clutch FC is held disengaged.

In this service-brake-operating condition, when the brake pedal BP is stepped on, the master cylinder MC feeds brake fluid under pressure to the hydraulic line 223a via the brake fluid pressure control unit CU; brake fluid is fed under pressure into the first hydraulic chamber R1 from the hydraulic line 223a; and brake fluid is fed under pressure into the second hydraulic chamber R2 from the hydraulic line 223a via the hydraulic branch line 223b and the changeover valve 241.

Figure 20:
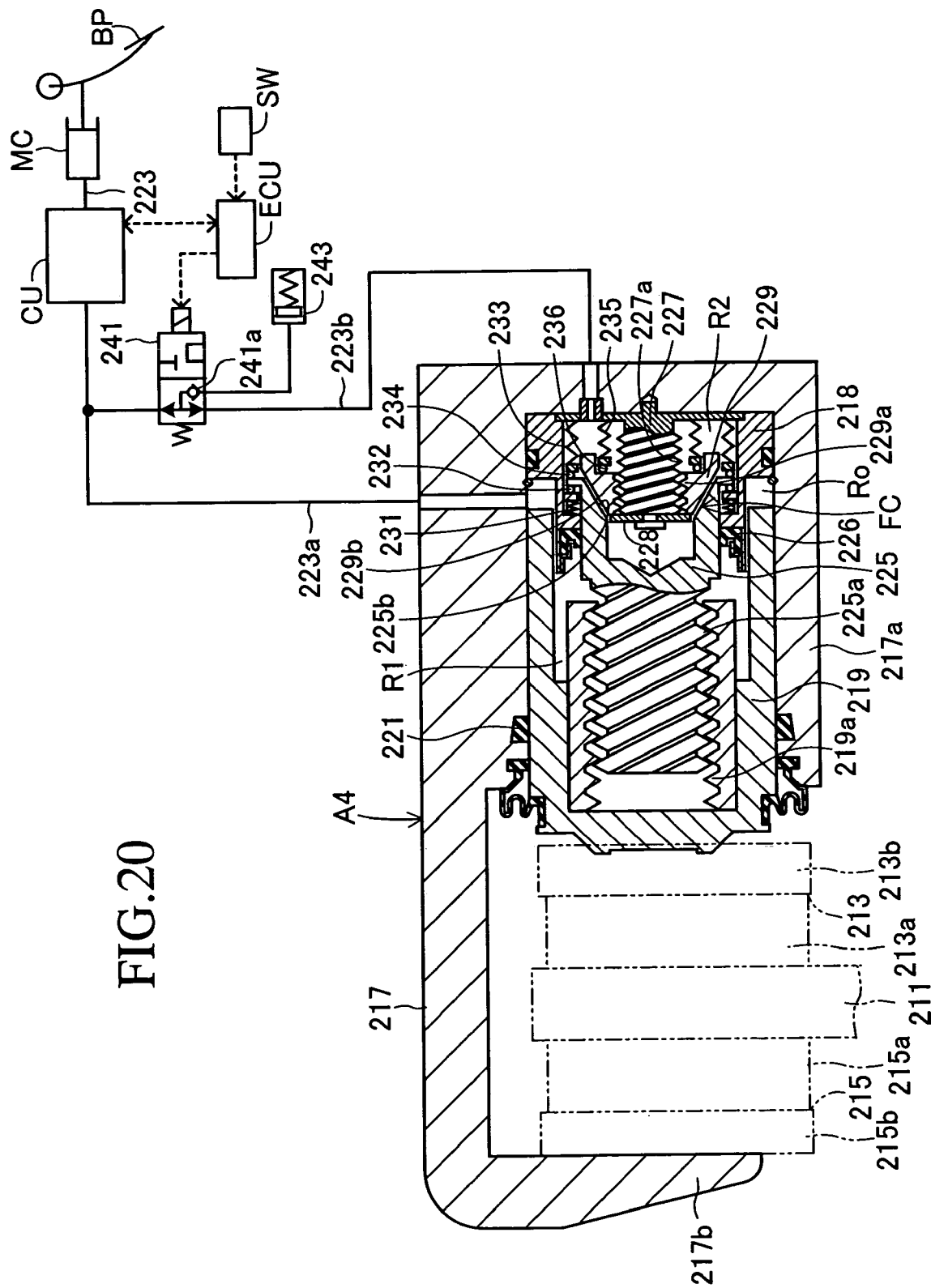
FIG. 20 is an explanatory view for explaining actions of the combined service and parking brake apparatus shown in FIG. 19 when the brake apparatus operates as a service brake.

At this time, therefore, as shown in FIG. 20, while the second piston 225 and the nut 229 stand still, the piston 219 can be advanced along the cylinder axis over a range of a thread-to-thread clearance between the internal-thread portion 219a provided in the piston 219 and the external-thread portion 225a of the second piston 225 by means of feed of brake fluid under pressure into the first hydraulic chamber R1 and the second hydraulic chamber R2. In other words, the brake apparatus A4 can be operated as a service brake.

At this time, brake fluid fed under pressure into the first hydraulic chamber R1 causes the piston 219 to move along the cylinder axis toward the disc rotor 211 while the piston 219 causes the piston seal 221 to be deformed toward the disc rotor 211, thereby pressing the inner pad 213 against the disc rotor 211. Associated reaction force causes the movable caliper 217 to move inboard, so that the reaction applicator portion 217b of the movable caliper 217 presses the outer pad 215 against the disc rotor 211. An unillustrated mounting, which supports the both pads 213 and 215, receives force generated as a result of the both pads 213 and 215 pressing the disc rotor 211, thereby generating braking force that prevents rotation of the disc rotor 211. In this brake-activated condition, the movable caliper 217 and other relevant component members are deflected in accordance with feed of brake fluid under pressure.

In release of brake fluid pressure effected by elimination of feed of brake fluid under pressure from the master cylinder MC into the first and second hydraulic chambers R1 and R2 as a result of release of the brake pedal BP, a retractive function effected by restoration of the piston seal 221 from the above-mentioned deformation and a retractive function effected by restoration of the movable caliper 217 and other relevant component members from deflection cause the piston 219 to move inboard and the movable caliper 217 to move outboard. Thus, the brake-activated condition of FIG. 20 is restored to the brake-released condition of FIG. 19, thereby releasing the both pads 213 and 215 from a condition of being pressed against the disc rotor 211. Thus is cancelled an action of braking rotation of the disc rotor 211 effected by the both pads 213 and 215.

Figure 21:
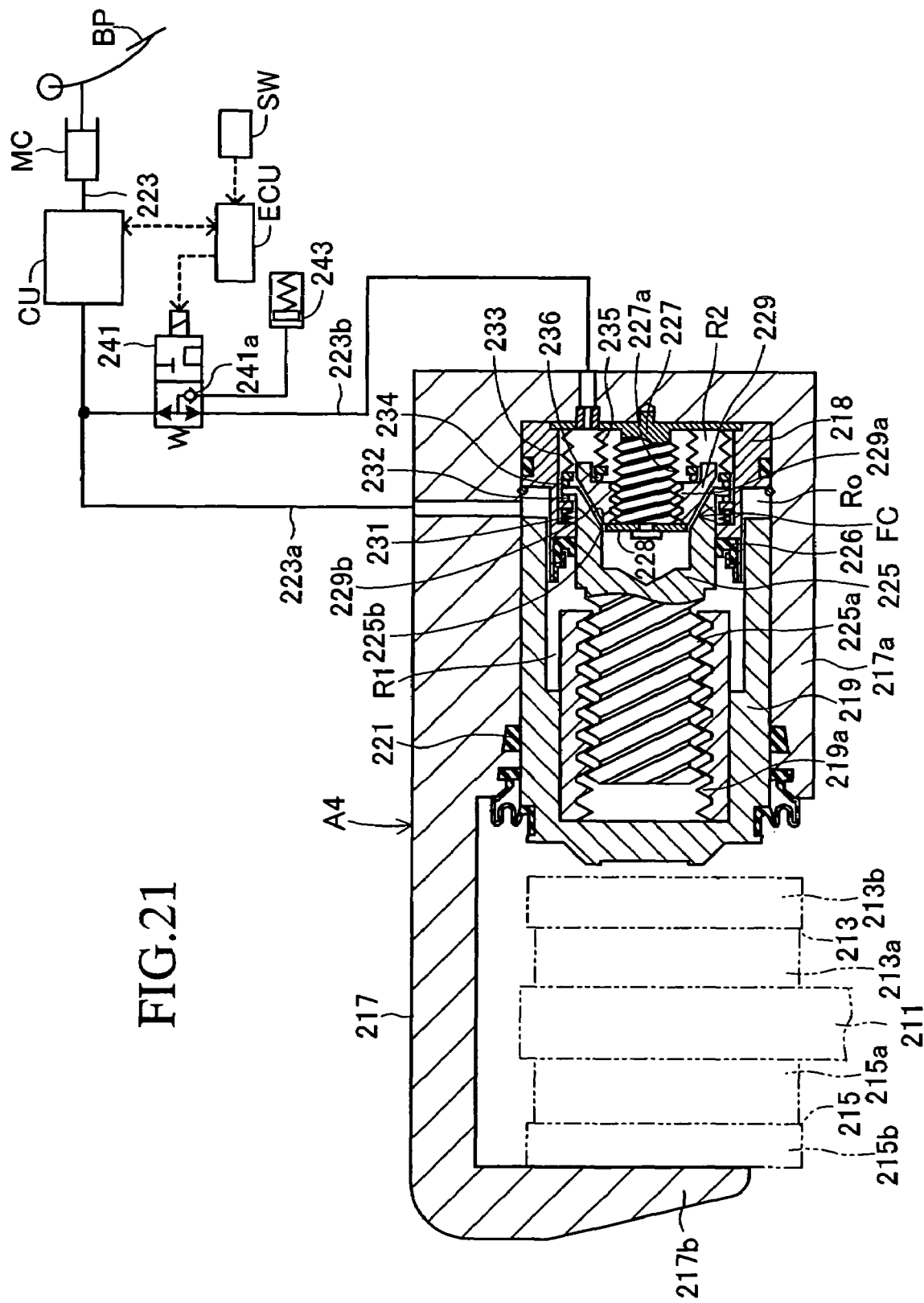
FIG. 21 is an explanatory view for explaining actions of the combined service and parking brake apparatus shown in FIG. 19 when lining is worn.
Figure 22:
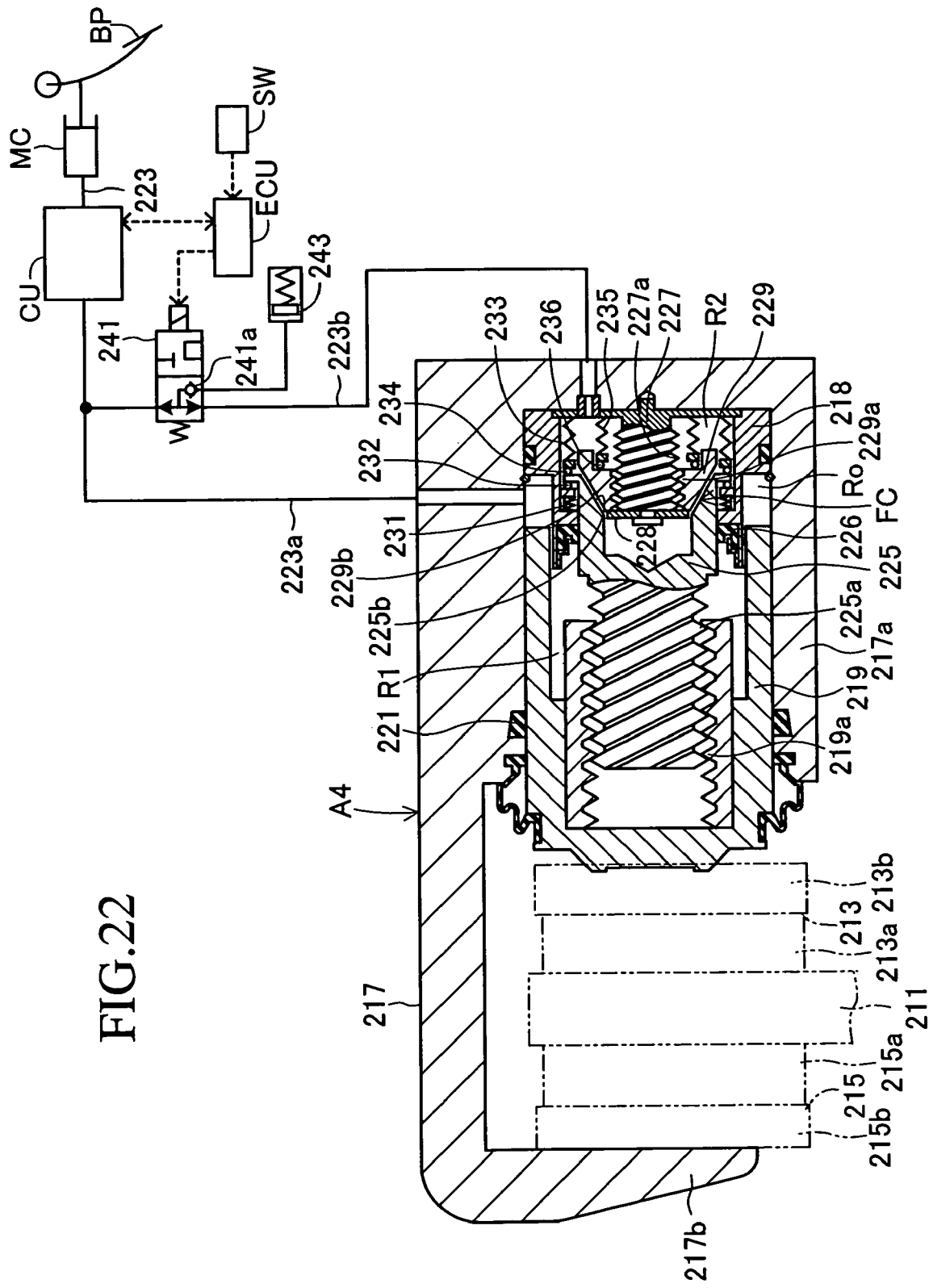
FIG. 22 is an explanatory view for explaining adjustment of the length of meshing engagement between an internal-thread portion of a piston and an external-thread portion of a second piston in the combined service and parking brake apparatus shown in FIG. 19.

In the above-mentioned service-brake-operating condition, when, for example, the piston 219 is to advance along the cylinder axis by a distance equal to or longer than the thread-to-thread clearance between the internal-thread portion 219a provided in the piston 219 and the external-thread portion 225a of the second piston 225 because of wear of the brake linings 213a and 215a, a condition shown in FIG. 22 is established through a condition shown in FIG. 21, and the second piston 225 rotates at its home position, thereby automatically adjusting the length of meshing engagement between the internal-thread portion 219a provided in the piston 219 and the external-thread portion 225a of the second piston 225.

Figure 23:
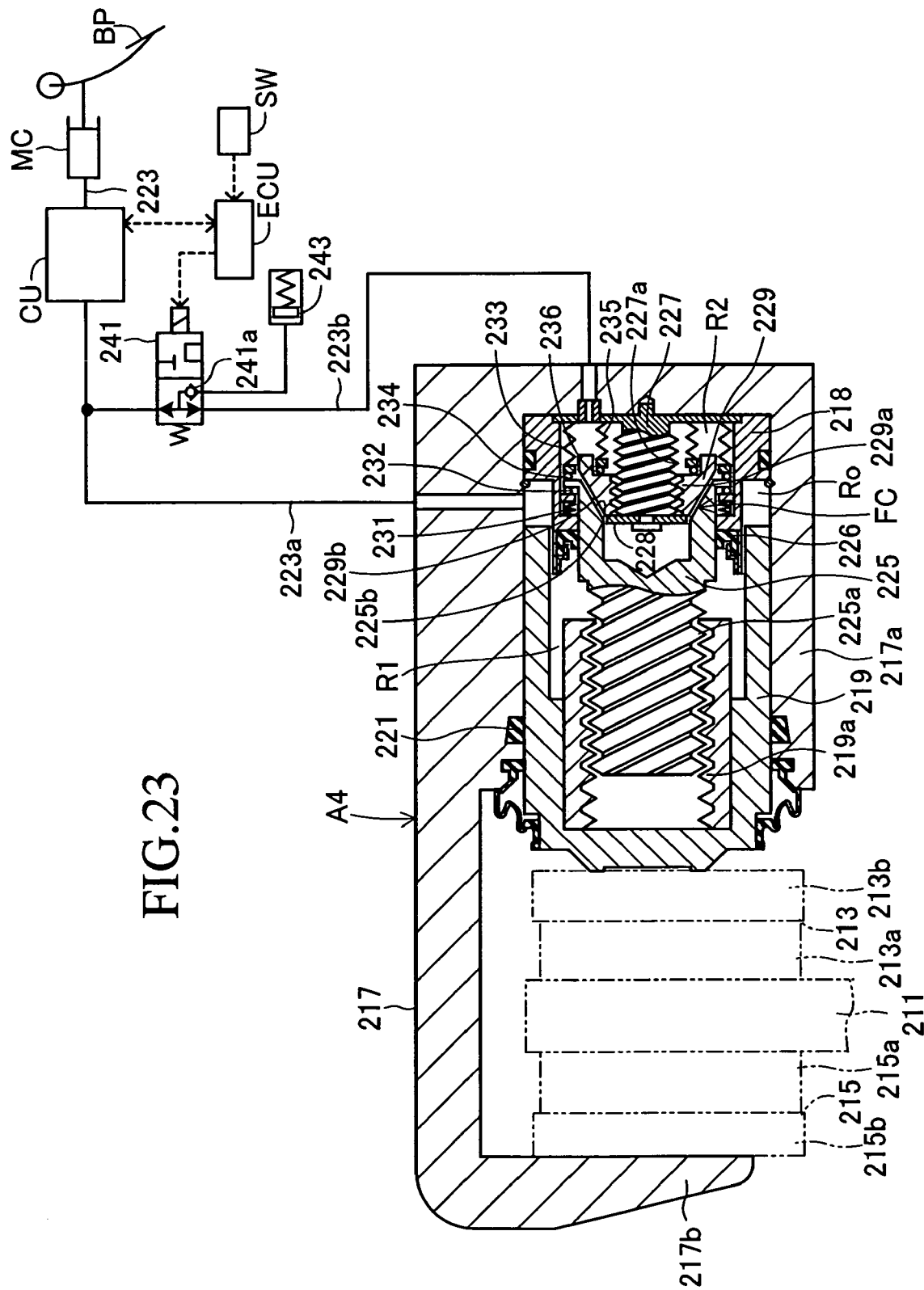
FIG. 23 is an explanatory view for explaining actions of the combined service and parking brake apparatus shown in FIG. 19 when the brake apparatus is brought into a brake-released condition after adjustment of the length of meshing engagement between the internal-thread portion of the piston and the external-thread portion of the second piston.

After the length of meshing engagement between the internal-thread portion 219a provided in the piston 219 and the external-thread portion 225a of the second piston 225 is adjusted, in association with release of brake fluid pressure from the first and second hydraulic chambers R1 and R2, the above-mentioned retractive functions cause the piston 219 to move inboard and the movable caliper 217 to move outboard. Thus, the brake-activated condition of FIG. 22 is restored to the brake-released condition of FIG. 23.

When the parking brake switch SW in the OFF condition is turned ON so as to use the combined service and parking brake apparatus A4 of the fourth embodiment as a parking brake, the parking brake operation is performed as follows: first, while the changeover valve 241 is brought into a de-energized condition by the electric control unit ECU, the electric control unit ECU causes the brake fluid pressure control unit CU to enter a pressure application control condition, whereby the brake fluid pressure control unit CU feeds a predetermined amount of brake fluid under pressure into the first and second hydraulic chambers R1 and R2 of the brake apparatus A4.

Thus is obtained an operation similar to that in the case where, in the above-described service-brake-operating condition, the brake pedal BP is stepped on. The brake apparatus A4 can be operated as a parking brake. Subsequently, in a condition where brake fluid can be fed under pressure into the first hydraulic chamber R1 of the brake apparatus A4 from the brake fluid pressure control unit CU, when the pressure of brake fluid fed to the brake apparatus A4 from the brake fluid pressure control unit CU reaches a predetermined value, as shown in FIG. 24, the electric control unit ECU causes the changeover valve 241 to be energized, thereby allowing brake fluid to flow into the reservoir 243 from the second hydraulic chamber R2.

Figure 24:
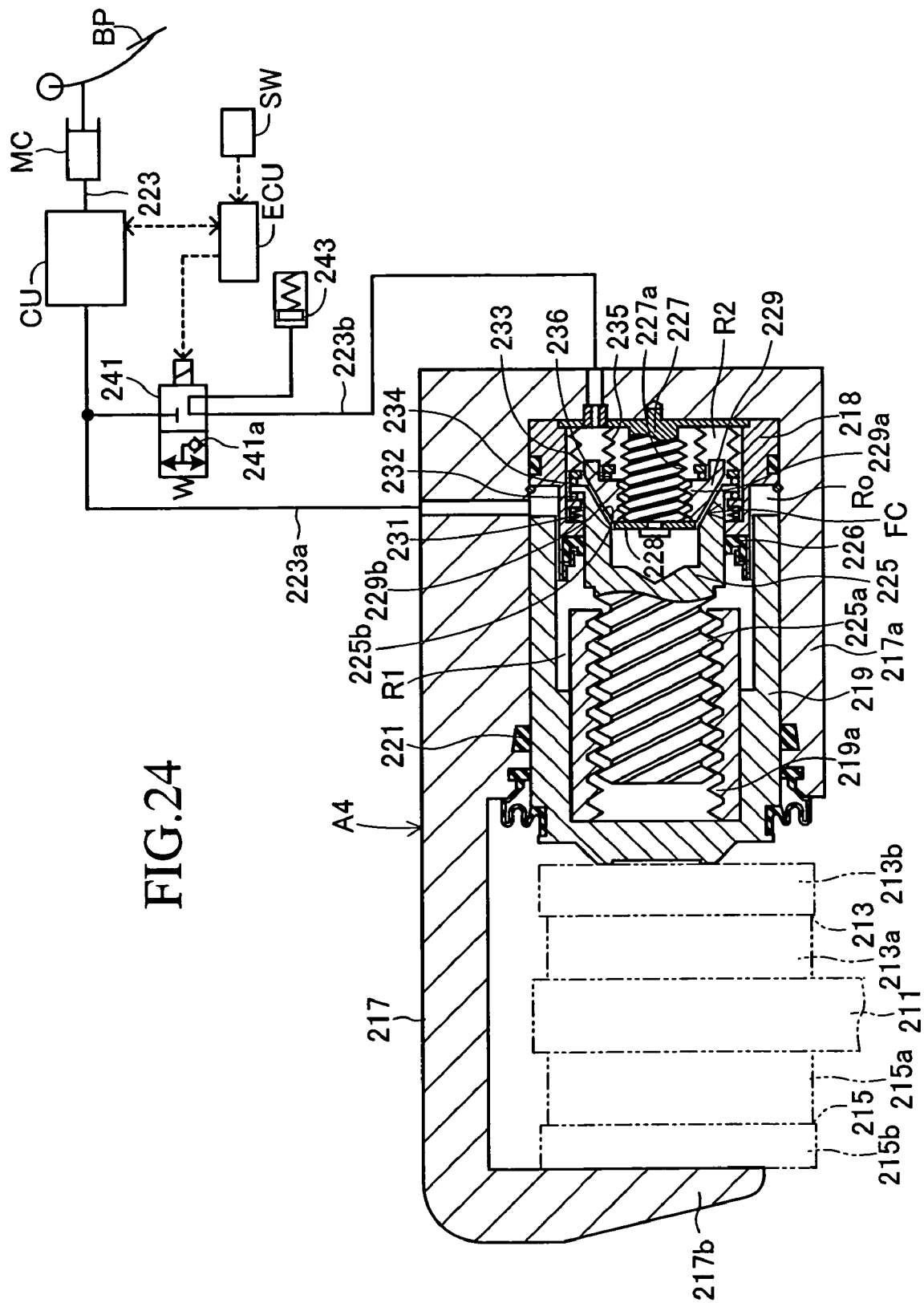
FIG. 24 is a first explanatory view for explaining actions of the combined service and parking brake apparatus shown in FIG. 19 when the brake apparatus operates as a parking brake.
Figure 26:
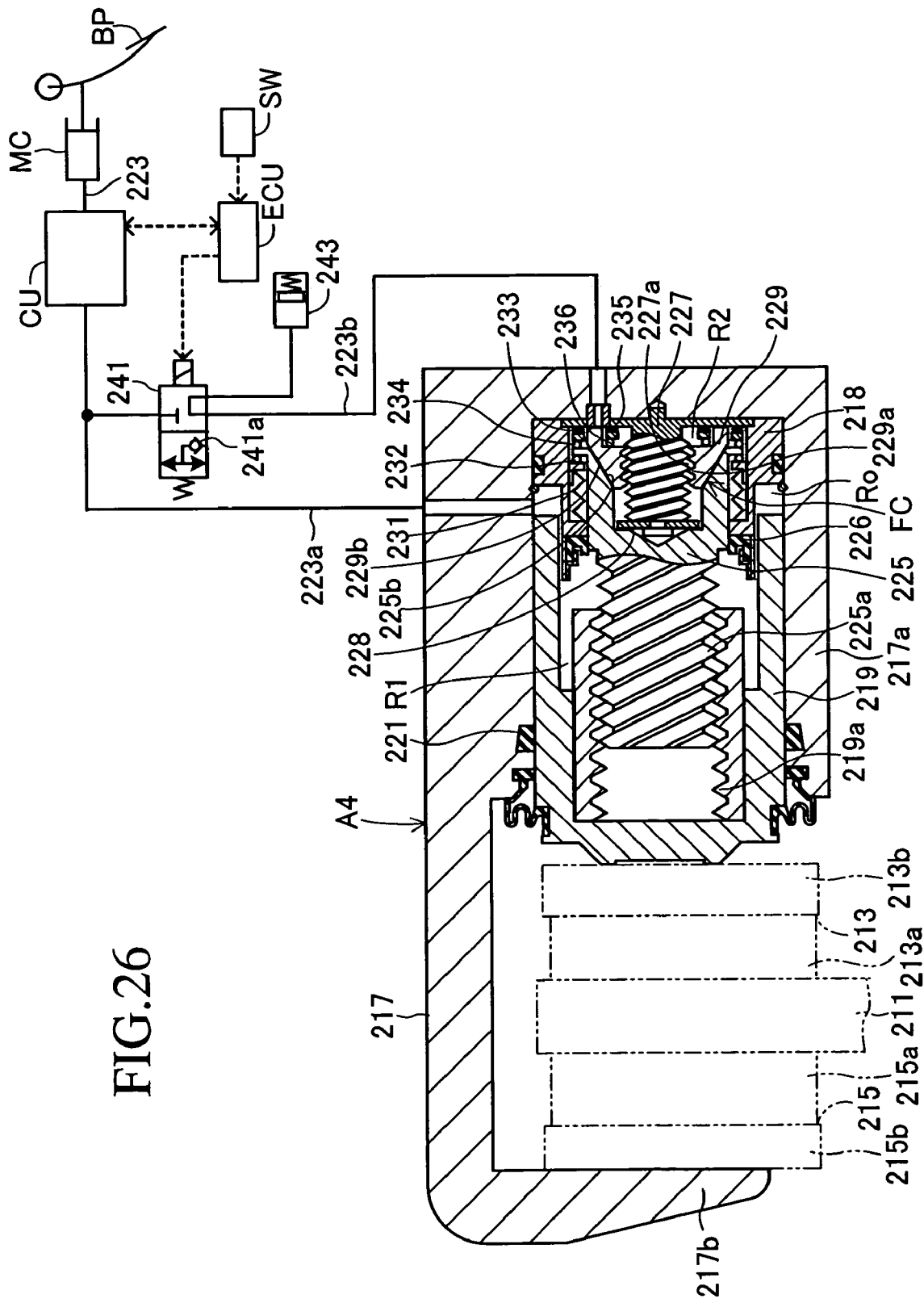
FIG. 26 is a third explanatory view for explaining actions of the combined service and parking brake apparatus shown in FIG. 19 when the brake apparatus operates as a parking brake.

In this condition, fluid pressure difference arises between the first hydraulic chamber R1 and the second hydraulic chamber R2, so that the second piston 225 moves against the second spring 233 along the cylinder axis from its home position shown in FIG. 24 toward its non-home position shown in FIG. 26. When the second piston 225 moves from its home position toward its non-home position by a predetermined distance or more, the second piston 225 engages with the nut 229, so that the friction clutch FC is engaged. Subsequently, biasing force of the third spring 235 holds the friction clutch FC in an engaged condition. Accordingly, the engaged friction clutch FC restricts relative rotation between the second piston 225 and the nut 229, and the second piston 225 and the nut 229 move along the cylinder axis while rotating in a unitary condition.

Figure 25:
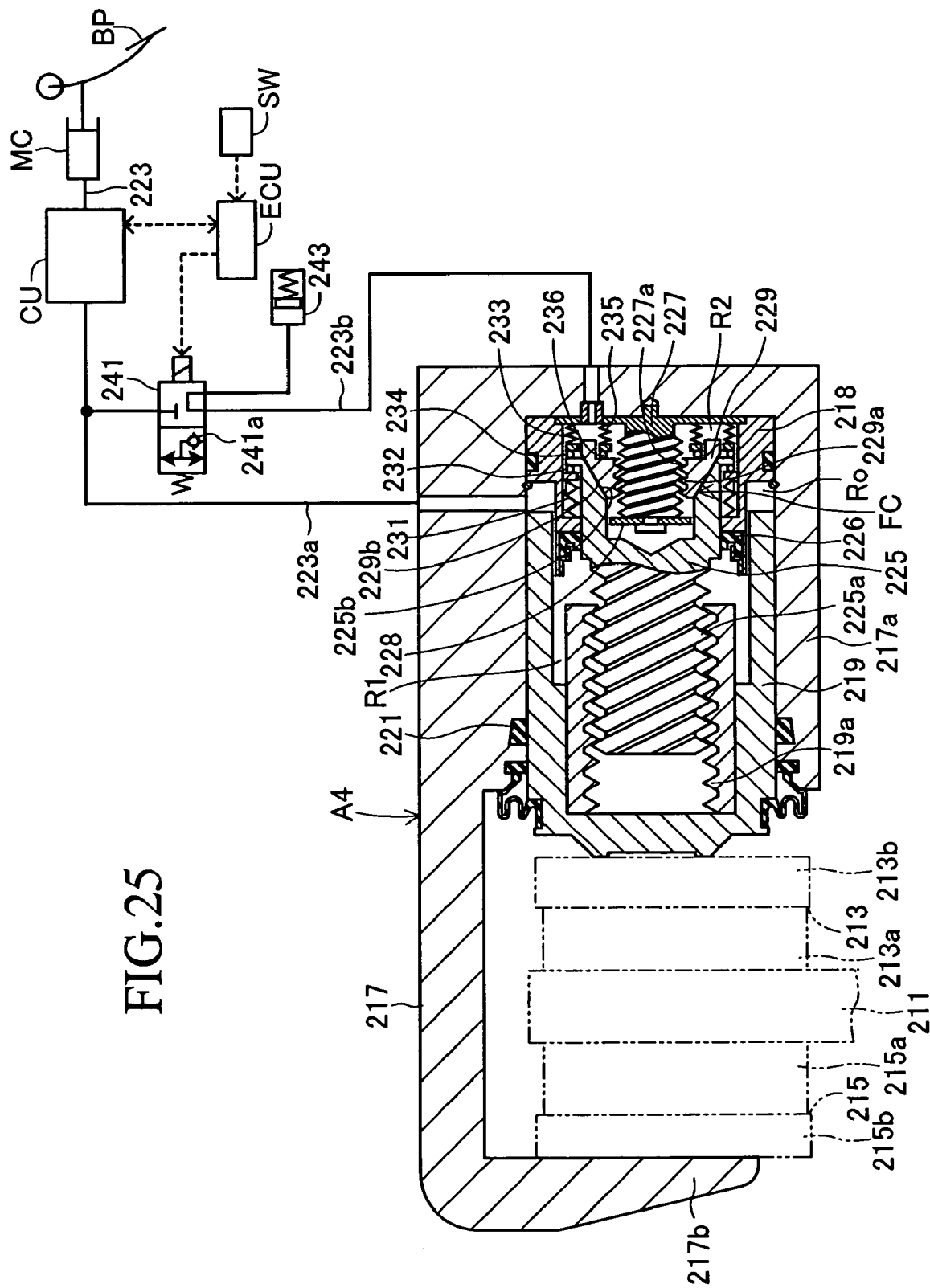
FIG. 25 is a second explanatory view for explaining actions of the combined service and parking brake apparatus shown in FIG. 19 when the brake apparatus operates as a parking brake.

Meanwhile, in the brake apparatus A4, a lead in a meshed portion between the external-thread portion 227a (second stationary screw element) of the threaded shaft 227 and the internal-thread portion 229a (second movable screw element) of the nut 229 is shorter than that in a meshed portion between the internal-thread portion 219a (first stationary screw element) provided in the piston 219 and the external-thread portion 225a (first movable screw element) of the second piston 225. Accordingly, as the second piston 225 and the nut 229 move along the cylinder axis while rotating in a unitary condition via the friction clutch FC, as shown in FIG. 25, the thread-to-thread clearance along the cylinder axis in the meshed portion between the external-thread portion 227a (second stationary screw element) of the threaded shaft 227 and the internal-thread portion 229a (second movable screw element) of the nut 229 disappears on a side toward the moving direction of the internal-thread portion 229a, so that the thread surface of the external-thread portion 227a (second stationary screw element) on a side opposite the moving direction and the thread surface of the internal-thread portion 229a (second movable screw element) on the side toward the moving direction contact each other. Subsequently, as shown in FIG. 26, the thread-to-thread clearance along the cylinder axis in the meshed portion between the internal-thread portion 219a (first stationary screw element) of the piston 219 and the external-thread portion 225a (first movable screw element) of the second piston 225 disappears on a side opposite the moving direction of the external-thread portion 225a, so that the thread surface of the internal-thread portion 219a (first stationary screw element) on the side toward the moving direction and the thread surface of the external-thread portion 225a (first movable screw element) on the side opposite the moving direction contact each other. As a result, unitary rotation of the second piston 225 and the nut 229 stops.

In this condition, as shown in FIG. 26, the second piston 225 and the nut 229 are united via the engaged friction clutch FC, so that a contact portion between the thread surface of the external-thread portion 227a (second stationary screw element) and the thread surface of the internal-thread portion 229a (second movable screw element) and a contact portion between the thread surface of the internal-thread portion 219a (first stationary screw element) and the thread surface of the external-thread portion 225a (first movable screw element) push out against each other. Accordingly, in this condition, even when fluid pressure in the first hydraulic chamber R1 drops as a result of the electric control unit ECU causing the brake fluid pressure control unit CU to change its condition from a pressure application control condition to a pressure release control condition, and consequently reaction force that the brake lining 213a imposes on the piston 219 is directed to pressing the piston 219 backward, the condition where the above-mentioned both contact portions push out against each other (a condition where thread surfaces are in press contact with each other in each of the contact portions) remains unchanged.

Therefore, by means of setting structural design parameters in such a manner that reaction force that the brake lining 213a imposes on the piston 219 does not cause slippage in the friction clutch FC and in the above-mentioned both contact portions, at the time of release of brake fluid pressure associated with operation of the brake apparatus A4 as a parking brake, the piston 219 is not pressed backward along the cylinder axis and is maintained in a mechanically locked condition. Accordingly, the brake apparatus A4 can avoid a drop in parking brake force in release of brake fluid pressure.

Meanwhile, when the electric control unit ECU causes the brake fluid pressure control unit CU to change its condition from the pressure application control condition to the pressure release control condition, the changeover valve 241 has been held in a de-energized condition by the electric control unit ECU. Thus, brake fluid that has flown into the reservoir 243 from the second hydraulic chamber R2 through the preceding operations (the operations shown in FIGS. 24 to 26) is drained toward the hydraulic branch line 223b through the check valve 241a.

When the parking brake switch SW in the ON condition is turned OFF so as to release the combined service and parking brake apparatus A4 of the fourth embodiment from use as a parking brake, the parking brake is released as described below. First, in a condition where the changeover valve 241 has been held in a de-energized condition by the electric control unit ECU, the electric control unit ECU brings the brake fluid pressure control unit CU into the pressure application control condition, so that the brake fluid pressure control unit CU feeds brake fluid under pressure into the first and second hydraulic chambers R1 and R2 of the brake apparatus A4.

When piston-projecting force induced by fluid pressure becomes greater than the above-mentioned reaction force that the brake lining 213a imposes on the piston 219, press contact between the thread surface of the internal-thread portion 219a (first stationary screw element) and the thread surface of the external-thread portion 225a (first movable screw element) is canceled, thereby canceling the condition where the contact portion between the thread surface of the external-thread portion 227a (second stationary screw element) and the thread surface of the internal-thread portion 229a (second movable screw element) and the contact portion between the thread surface of the internal-thread portion 219a (first stationary screw element) and the thread surface of the external-thread portion 225a (first movable screw element) push out against each other.

Figure 27:
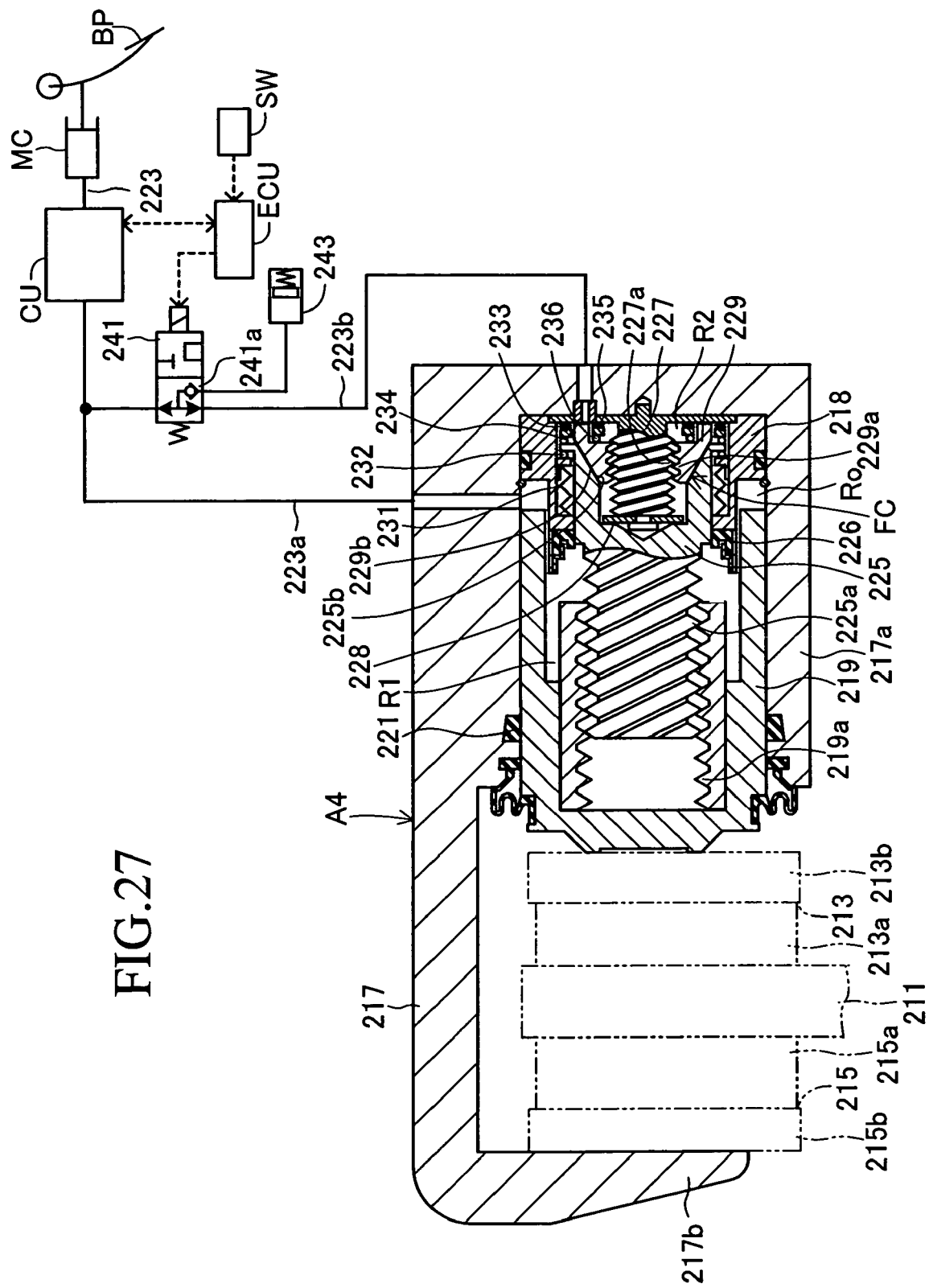
FIG. 27 is a first explanatory view for explaining actions of the combined service and parking brake apparatus shown in FIG. 19 when the brake apparatus is released from use as a parking brake.
Figure 28:
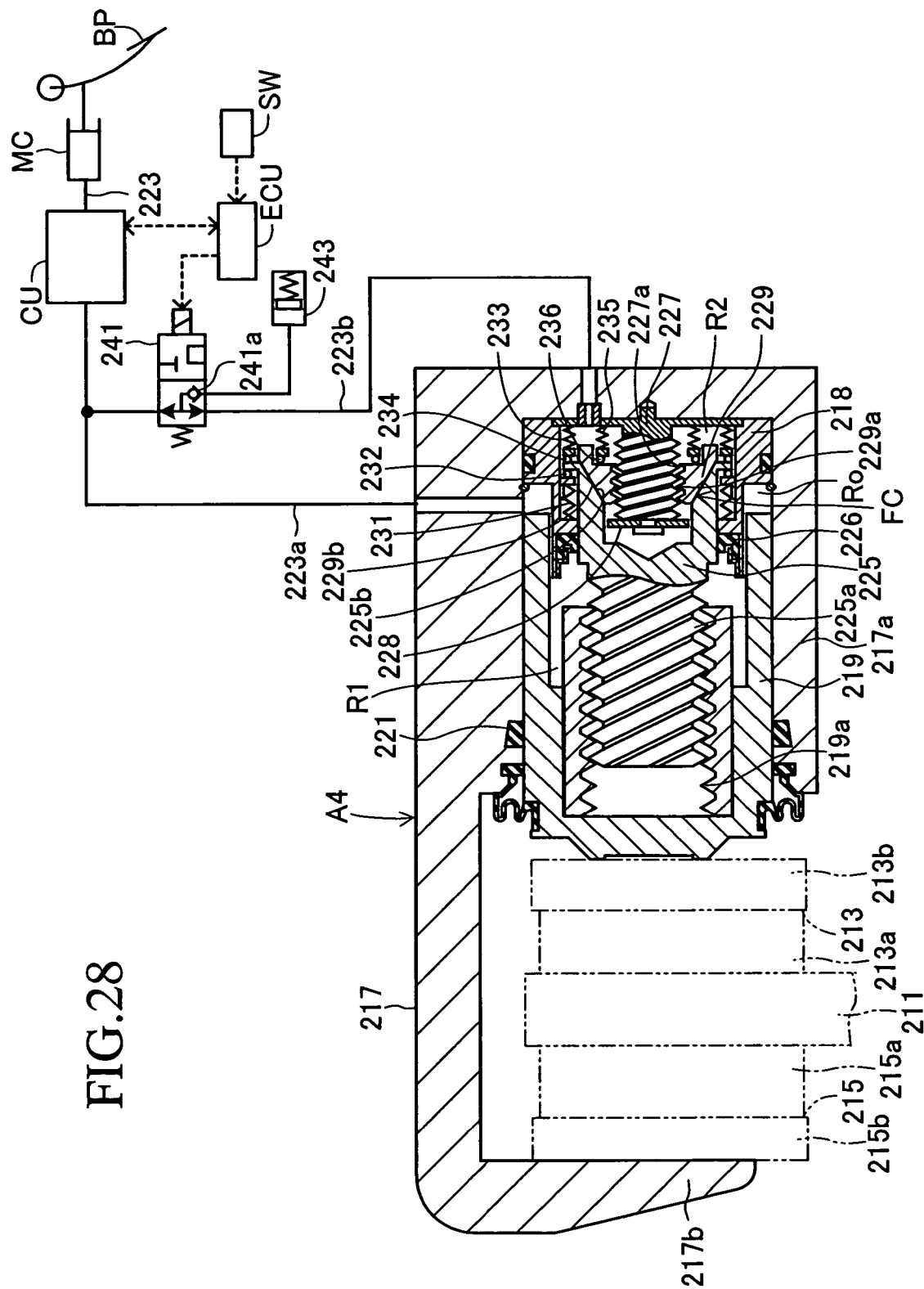
FIG. 28 is a second explanatory view for explaining actions of the combined service and parking brake apparatus shown in FIG. 19 when the brake apparatus is released from use as a parking brake.

In this condition, as shown in FIGS. 27 to 29, biasing force of the springs 233 and 235 causes the second piston 225 and the nut 229 to move along the cylinder axis toward their respective home positions while rotating in a unitary condition via the friction clutch FC. As a result, there is re-established the same condition as that (FIG. 24) in the initial stage of the above-described parking brake operation in which pressure application is initiated. In the initial stage of movement of the second piston 225 and the nut 229 from their respective non-home positions toward their respective home positions, the second piston 225 and the nut 229 move while rotating, in accordance with the lead of the internal-thread portion 219a (first stationary screw element) and the lead of the external-thread portion 225a (first movable screw element). In the middle and latter stages of the movement, the second piston 225 and the nut 229 move while rotating, in accordance with the lead of the external-thread portion 227a (second stationary screw element) and the lead of the internal-thread portion 229a (second movable screw element). After the nut 229 reaches its home position, the friction clutch FC becomes disengaged, and only the second piston 225 moves along the cylinder axis toward its home position by virtue of biasing force of the second spring 233.

After the second piston 225 and the nut 229 return to their respective home positions by virtue of biasing force of the springs 233 and 235, the electric control unit ECU causes the brake fluid pressure control unit CU to change its condition from the pressure application control condition to the pressure release control condition, thereby allowing drainage of brake fluid from the first and second hydraulic chambers R1 and R2. Accordingly, by virtue of the above-mentioned retractive functions, the piston 219 and the movable caliper 217 return to the brake-released condition shown in FIG. 19 or 23, thereby releasing the parking brake.

In the combined service and parking brake apparatus A4 of the fourth embodiment, fluid pressure difference that arises between the first hydraulic chamber R1 and the second hydraulic chamber R2 causes the second piston 225 and the nut 229 to move against the springs 233 and 235 along the cylinder axis from their respective home positions shown in FIG. 24 to their respective non-home positions shown in FIG. 26, so that no electrical device is accommodated in the hydraulic chamber Ro of the cylinder 217a of the movable caliper 217. Thus, the brake apparatus A4 is free from any anxiety about the electrical device with respect to fluid resistance, seal integrity, heat resistance, and the like, thereby providing high reliability.

In the combined service and parking brake apparatus A4 of the fourth embodiment, the reservoir 243 is connected to the changeover valve 241, and the reservoir 243 can store brake fluid drained from the second hydraulic chamber R2 when communication between the first hydraulic chamber R1 and the second hydraulic chamber R2 is shut off. Thus, in a condition where communication between the first hydraulic chamber R1 and the second hydraulic chamber R2 is shut off by the changeover valve 241, when brake fluid is fed under pressure into the first hydraulic chamber R1, fluid pressure difference between the first hydraulic chamber R1 and the second hydraulic chamber R2 that acts on the second piston 225 can be increased, so that operational response of the second piston 225 can be enhanced. Thus, operational response of the parking brake can be enhanced.

In the case where the combined service and parking brake apparatus A4 of the fourth embodiment is used as a service brake, even at the time of adjustment, the second piston 225 and the nut 229 are held in their respective home positions, so that the friction clutch FC is held disengaged. Accordingly, by means of the pressure of brake fluid fed under pressure into the first hydraulic chamber R1, the piston 219 can be efficiently moved under pressure.

In the above-described fourth embodiment, the internal-thread portion 219a of the piston 219 serves as the first stationary screw element; the external-thread portion 225a of the second piston 225 serves as the first movable screw element; the external-thread portion 227a of the threaded shaft 227 serves as the second stationary screw element; and the internal-thread portion 229a of the nut 229 serves as the second movable screw element. However, the external-thread portions and the internal-thread portions can be reversed. In the fourth embodiment, the diameter of the first stationary screw element and the first movable screw element is substantially equal to that of the second stationary screw element and the second movable screw element. However, their diameters may differ from each other.

The above-described fourth embodiment includes the reservoir 243; however, the present invention may be embodied without use of the component. In an embodiment that does not use the reservoir 243, a function similar to that of the reservoir 243 is effected by means of, for example, expansion of the hydraulic branch line 223b, and the changeover valve 241 assumes the form of an electromagnetic 2-port 2-position on-off valve. The above-described fourth embodiment is described while mentioning application of the present invention to a disc brake (a brake whose rotary member to be braked is a disc rotor); however, the present invention may be modified as appropriate and applied to a drum brake (a brake whose rotary member to be braked is a brake drum).

The above-described fourth embodiment employs a single changeover valve 241, which is an electromagnetic 3-port 2-position changeover valve. The changeover valve 241, when de-energized, establishes communication between the first hydraulic chamber R1 and the second hydraulic chamber R2, and the changeover valve 241, when energized, shuts off communication between the first hydraulic chamber R1 and the second hydraulic chamber R2 and allows flow of brake fluid from the second hydraulic chamber R2 to the reservoir 243. However, the present invention may be embodied while employing a changeover valve that, when energized, establishes communication between the first hydraulic chamber R1 and the second hydraulic chamber R2, and that, when de-energized, shuts off communication between the first hydraulic chamber R1 and the second hydraulic chamber R2 and allows flow of brake fluid from the second hydraulic chamber R2 to the reservoir 243. In these cases, for example, two electromagnetic 2-port 2-position changeover valves may be employed.

In the above-described fourth embodiment, fluid pressure difference that arises from operation of the changeover valve 241 between the first hydraulic chamber R1 and the second hydraulic chamber R2 causes the second piston 225 to move against the second spring 235 along the cylinder axis from its home position to its non-home position. However, the present invention may be embodied such that magnetic force generated from an electromagnetic actuator attached to a cylinder (217a) is used to move a second piston (225) against a second spring (235) along the cylinder axis from its home position to its non-home position.

In the above-described fourth embodiment, when the brake apparatus A4 is used as a parking brake, the brake fluid pressure control unit CU feeds brake fluid under pressure into the first and second hydraulic chambers R1 and R2. However, the present invention may be embodied such that when the brake apparatus A4 is used as a parking brake, the master cylinder MC feeds brake fluid under pressure into the first and second hydraulic chambers R1 and R2.

What is claimed is:

1. A combined service and parking brake apparatus comprising:
    a piston disposed in a cylinder in such a manner as to be nonrotatable about a cylinder axis and movable along the cylinder axis to thereby form a hydraulic chamber within the cylinder;
    a brake lining to be moved under pressure by the piston and engaged with a rotary member to be braked, when the piston is moved under pressure of brake fluid fed into the hydraulic chamber, thereby effecting a braking operation on the rotary member;
    a second piston disposed within the hydraulic chamber in such a manner as to be rotatable about the cylinder axis and movable along the cylinder axis between its home position and its non-home position to thereby divide the hydraulic chamber into a first hydraulic chamber and a second hydraulic chamber, movement of the second piston in a piston-projecting direction being restricted to the home position, and the second piston being urged, by biasing means, along the cylinder axis from the non-home position toward the home position;

a first stationary screw element provided integrally with the piston within the first hydraulic chamber, extending along the cylinder axis, and having a predetermined lead;

a first movable screw element having a thread surface in opposition to a thread surface of the first stationary screw element, provided integrally with the second piston, and meshed with the first stationary screw element with a predetermined thread-to-thread clearance present therebetween along the cylinder axis;

a friction clutch capable of engaging the second piston and the cylinder with each other and disengaging the second piston and the cylinder from each other, the friction clutch being brought in a disengaged condition and allowing rotation of the second piston at the time of the second piston being held at the home position to thereby be disengaged from the cylinder, and the friction clutch being brought into an engaged condition and disabling rotation of the second piston at the time of the second piston moving from the home position toward the non-home position and engaging with the cylinder; and a changeover valve provided in a hydraulic branch line allowing feed and drainage of brake fluid therethrough to and from the second hydraulic chamber and branched from a hydraulic line allowing feed and drainage of brake fluid therethrough to and from the first hydraulic chamber, the changeover valve being able to establish and shut off communication between the first hydraulic chamber and the second hydraulic chamber.

2. A combined service and parking brake apparatus according to claim 1, wherein a release device for rotating the second piston from the outside of the cylinder is attached to the cylinder.

3. A combined service and parking brake apparatus according to claim 1, wherein a reservoir is connected to the changeover valve, and the reservoir can store brake fluid drained from the second hydraulic chamber when communication between the first hydraulic chamber and the second hydraulic chamber is shut off.

4. A combined service and parking brake apparatus according to claim 1, wherein the first stationary screw element is internally threaded, and the first movable screw element is externally threaded.

5. A combined service and parking brake apparatus according to claim 1, wherein the first stationary screw element is externally threaded, and the first movable screw element is internally threaded.

6. A combined service and parking brake apparatus comprising:

a piston disposed in a cylinder in such a manner as to be nonrotatable about a cylinder axis and movable along the cylinder axis to thereby form a hydraulic chamber within the cylinder;

a brake lining to be moved under pressure by the piston and engaged with a rotary member to be braked, when the piston is moved outward under pressure of brake fluid fed into the hydraulic chamber, thereby effecting a braking operation on the rotary member;

a movable member provided within the hydraulic chamber in such a manner as to be rotatable about the cylinder axis and movable along the cylinder axis between its home position and its non-home position, movement of the movable member in a piston-projecting direction being restricted to the home position, and the movable member being urged, by first biasing means, along the cylinder axis from the home position toward the non-home position;

a first stationary screw element provided integrally with the piston within the hydraulic chamber, extending along the cylinder axis, and having a predetermined lead;

a first movable screw element having a thread surface in opposition to a thread surface of the first stationary screw element, provided integrally with the movable member, and meshed with the first stationary screw element with a predetermined thread-to-thread clearance present therebetween along the cylinder axis;

a second stationary screw element disposed coaxially with the first stationary screw element within the hydraulic chamber, provided integrally with the cylinder, extending along the cylinder axis, and having a lead shorter than the lead of the first stationary screw element;

a second movable screw element having a thread surface in opposition to a thread surface of the second stationary screw element, provided within the hydraulic chamber in such a manner as to be rotatable about the cylinder axis and movable along the cylinder axis, meshed with the second stationary screw element with a predetermined thread-to-thread clearance present therebetween along the cylinder axis, and urged along the cylinder axis against the first biasing means by second biasing means having biasing force greater than that of the first biasing means;

a friction clutch capable of engaging the second movable screw element and the movable member with each other and disengaging the second movable screw element and the movable member from each other, the friction clutch being brought in a disengaged condition and allowing relative rotation between the second movable screw element and the movable member at the time of the second movable screw element moving away from the movable member against the second biasing means, and the friction clutch being brought into an engaged condition and restricting relative rotation between the second movable screw element and the movable member at the time of the second movable screw element being urged by the second biasing means and engaging with the movable member; and a drive device capable of moving the movable member and the second movable screw element along the cylinder axis against the second biasing means from their respective home positions toward their respective non-home positions.

7. A combined service and parking brake apparatus according to claim 6, wherein the movable member is a second piston disposed within the hydraulic chamber in such a manner as to be rotatable about the cylinder axis and movable along the cylinder axis to thereby divide the hydraulic chamber into a first hydraulic chamber and a second hydraulic chamber; and the drive device is a changeover valve provided in a hydraulic branch line allowing feed and drainage of brake fluid therethrough to and from the second hydraulic chamber and branched from a hydraulic line allowing feed and drainage of brake fluid therethrough to and from the first hydraulic chamber, the changeover valve being able to establish and shut off communication between the first hydraulic chamber and the second hydraulic chamber.

8. A combined service and parking brake apparatus according to claim 7, wherein a reservoir is connected to the changeover valve, and the reservoir can store brake fluid drained from the second hydraulic chamber when communication between the first hydraulic chamber and the second hydraulic chamber is shut off.

9. A combined service and parking brake apparatus comprising:

a piston disposed in a cylinder in such a manner as to be nonrotatable about a cylinder axis and movable along the cylinder axis to thereby form a hydraulic chamber within the cylinder;

a brake lining to be moved under pressure by the piston and engaged with a rotary member to be braked, when the piston is moved outward under pressure of brake fluid fed into the hydraulic chamber, thereby effecting a braking operation on the rotary member;

a movable member provided within the hydraulic chamber in such a manner as to be rotatable about the cylinder axis and movable along the cylinder axis between its home position and its non-home position, movement of the movable member in a piston-projecting direction being restricted to the home position, the movable member being urged, by first biasing means, along the cylinder axis from the home position toward the non-home position, and the movable member being urged along the cylinder axis from the non-home position toward the home position by second biasing means having biasing force greater than that of the first biasing means;

a first stationary screw element provided integrally with the piston within the hydraulic chamber, extending along the cylinder axis, and having a predetermined lead;

a first movable screw element having a thread surface in opposition to a thread surface of the first stationary screw element, provided integrally with the movable member, and meshed with the first stationary screw element with a predetermined thread-to-thread clearance present therebetween along the cylinder axis;

a second stationary screw element disposed coaxially with the first stationary screw element within the hydraulic chamber, provided integrally with the cylinder, extending along the cylinder axis, and having a lead shorter than the lead of the first stationary screw element;

a second movable screw element having a thread surface in opposition to a thread surface of the second stationary screw element, provided within the hydraulic chamber in such a manner as to be rotatable about the cylinder axis and movable along the cylinder axis, meshed with the second stationary screw element with a predetermined thread-to-thread clearance present therebetween along the cylinder axis, movement of the second movable screw element in a piston-projecting direction being restricted to its home position, and the second movable screw element being urged toward the home position by third biasing means;

a friction clutch capable of engaging the second movable screw element and the movable member with each other and disengaging the second movable screw element and the movable member from each other, the friction clutch being brought in a disengaged condition and allowing relative rotation between the second movable screw element and the movable member at the time of the movable member and the second movable screw element being held in their respective home positions to thereby be disengaged from each other, and the friction clutch being brought into an engaged condition and restricting relative rotation between the second movable screw element and the movable member at the time of the movable member moving from its home position toward its non-home position by a predetermined distance or more and engaging with the second movable screw element; and a drive device capable of moving the movable member along the cylinder axis against the second biasing means from its home position toward its non-home position at the time of the friction clutch being in a disengaged condition, and capable of moving the movable member and the second movable screw element along the cylinder axis against the second and third biasing means toward the respective non-home positions at the time of the friction clutch being in an engaged condition.

10. A combined service and parking brake apparatus according to claim 9, wherein the movable member is a second piston disposed within the hydraulic chamber in such a manner as to be rotatable about the cylinder axis and movable along the cylinder axis to thereby divide the hydraulic chamber into a first hydraulic chamber and a second hydraulic chamber; and the drive device is a changeover valve provided in a hydraulic branch line allowing feed and drainage of brake fluid therethrough to and from the second hydraulic chamber and branched from a hydraulic line allowing feed and drainage of brake fluid therethrough to and from the first hydraulic chamber, the changeover valve being able to establish and shut off communication between the first hydraulic chamber and the second hydraulic chamber.

11. A combined service and parking brake apparatus according to claim 10, wherein a reservoir is connected to the changeover valve, and the reservoir can store brake fluid drained from the second hydraulic chamber when communication between the first hydraulic chamber and the second hydraulic chamber is shut off.

* * * * *